United States Patent
Wolf

(10) Patent No.: US 12,504,429 B2
(45) Date of Patent: Dec. 23, 2025

(54) DIAGNOSIS OF CONGENITAL CYTOMEGALOVIRUS INFECTION

(71) Applicant: HADASIT MEDICAL RESEARCH SERVICES AND DEVELOPMENT LTD., Jerusalem (IL)

(72) Inventor: Dana Wolf, Mevaseret Zion (IL)

(73) Assignee: Hadasit Medical Research Services and Development Ltd., Jerusalem (IL)

( * ) Notice: Subject to any disclaimer, the term of this patent is extended or adjusted under 35 U.S.C. 154(b) by 661 days.

(21) Appl. No.: 17/816,060

(22) Filed: Jul. 29, 2022

(65) Prior Publication Data

US 2023/0038224 A1 Feb. 9, 2023

Related U.S. Application Data

(63) Continuation-in-part of application No. PCT/IL2021/050125, filed on Feb. 3, 2021.

(60) Provisional application No. 63/284,323, filed on Nov. 30, 2021, provisional application No. 62/969,176, filed on Feb. 3, 2020.

(51) Int. Cl.
G01N 33/569 (2006.01)

(52) U.S. Cl.
CPC ... G01N 33/56994 (2013.01); *G01N 2800/52* (2013.01); *G01N 2800/60* (2013.01)

(58) Field of Classification Search
CPC ......... G01N 33/56994; G01N 2800/52; G01N 2800/60; G01N 2333/045
See application file for complete search history.

(56) References Cited

U.S. PATENT DOCUMENTS

| | | |
|---|---|---|
| 9,261,505 B2 | 2/2016 | Pereira |
| 2014/0186332 A1 | 7/2014 | Ezrin |
| 2016/0091497 A1 | 3/2016 | Goix |

FOREIGN PATENT DOCUMENTS

| | | |
|---|---|---|
| EP | 2212693 B1 | 4/2015 |
| WO | 2021156860 A1 | 8/2021 |

OTHER PUBLICATIONS

Sahab ZJ, Semaan SM, Sang QX. Methodology and applications of disease biomarker identification in human serum. Biomark Insights. Feb. 14, 2007;2:21-43. (Year: 2007).*
Martinelli A. "How to Identify Biomarkers: Definition, Examples, and Algorithms for Detection." BigOmics Analytics. https://bigomics.ch/blog/how-to-find-biomarkers-biomarker-analysis-methods-and-practical-examples/. Accessed Mar. 22, 2025. (Year: 2025).*
Villarroya et al., (2019) Secretory Proteome of Brown Adipocytes in Response to cAMP-Mediated Thermogenic Activation. Front Physiol 10: 67.
Cetin et al., (2017) Chemerin level in pregnancies complicated by preeclampsia and its relation with disease severity and neonatal outcomes. J Obstet Gynaecol 37(2): 195-199.
Desveaux et al., (2016) Identification of Symptomatic Fetuses Infected with Cytomegalovirus Using Amniotic Fluid Peptide Biomarkers. PLoS Pathog 12(1): e1005395.
Eventov-Friedman et al., (2019) Saliva Real-Time Polymerase Chain Reaction for Targeted Screening of Congenital Cytomegalovirus Infection. J Infect Dis 220(11): 1790-1796.
Fabbri et al., (2011) Prognostic markers of symptomatic congenital human cytomegalovirus infection in fetal blood. BJOG 118(4): 448-456.
Fowler and Boppana (2018) Congenital cytomegalovirus infection. Article in press. Published in final edited version as: Semin Perinatol 42(3): 149-154.
Gabrielli et al., (2009) Histological findings in foetuses congenitally infected by cytomegalovirus. J Clin Virol 46 Suppl 4: S16-S21.
Graham et al., (2009) Chemokine-like receptor-1 expression by central nervous system-infiltrating leukocytes and involvement in a model of autoimmune demyelinating disease. J Immunol 183(10): 6717-6723.
Kagan et al., (2018) Antenatal treatment options for primary cytomegalovirus infections. Curr Opin Obstet Gynecol 30(6): 355-360.
Kagan et al., (2021) Outcome of pregnancies with recent primary cytomegalovirus infection in first trimester treated with hyperimmunoglobulin: observational study. Ultrasound Obstet Gynecol 57(4): 560-567.
Kennedy and Davenport (2018) International Union of Basic and Clinical Pharmacology CIII: Chemerin Receptors CMKLR1 (Chemerin1) and GPR1 (Chemerin2) Nomenclature, Pharmacology, and Function. Pharmacol Rev 70(1):174-196.
Khalil et al., (2020) ISUOG Practice Guidelines: role of ultrasound in congenital infection. Ultrasound Obstet Gynecol 56(1): 128-151.
Kukla et al., (2011) Potential role of leptin, adiponectin and three novel adipokines—visfatin, chemerin and vaspin—in chronic hepatitis. Mol Med 17(11-12): 1397-1410.
Lazzarotto et al., (2011) Update on the prevention, diagnosis and management of cytomegalovirus infection during pregnancy. Clin Microbiol Infect 17(9): 1285-1293.
Leruez-Ville and Ville (2017) Fetal cytomegalovirus infection. Best Pract Res Clin Obstet Gynaecol 38: 97-107.
Leruez-Ville et al., (2016) In utero treatment of congenital cytomegalovirus infection with valacyclovir in a multicenter, open-label, phase II study. Am J Obstet Gynecol 215(4): 462.e1-462.e10.
Leruez-Ville et al., (2020) Cytomegalovirus infection during pregnancy: state of the science. Am J Obstet Gynecol 223(3): 330-349.
Liang et al., (2019) Chemerin-induced macrophages pyroptosis in fetal brain tissue leads to cognitive disorder in offspring of diabetic dams. J Neuroinflammation 16(1): 226.
Liu et al., (2017) Discovering potential serological biomarker for chronic Hepatitis B Virus-related hepatocellular carcinoma in Chinese population by MAL-associated serum glycoproteomics analysis. Sci Rep 7: 38918.

(Continued)

Primary Examiner — Rachel B Gill
(74) Attorney, Agent, or Firm — Polsinelli PC; Ron Galant

(57) ABSTRACT

The present invention provides biomarkers allowing the diagnosis of symptomatic congenital cytomegalovirus (CMV) infection and in particular to differentiate between symptomatic and asymptomatic infected fetuses, methods of diagnosis of CMV using said biomarkers, diagnostic kits comprising thereof, and use of the kits and methods of diagnosing fetuses infected with a symptomatic congenital cytomegalovirus (CMV).

21 Claims, 16 Drawing Sheets

(56) References Cited

OTHER PUBLICATIONS

Loimaranta et al., (2018) Galectin-3-binding protein: A multitask glycoprotein with innate immunity functions in viral and bacterial infections. J Leukoc Biol 104(4): 777-786.

Nigro et al., (2005) Passive immunization during pregnancy for congenital cytomegalovirus infection. N Engl J Med 353(13): 1350-1362.

Nigro et al., (2020) High-Dose Cytomegalovirus (CMV) Hyperimmune Globulin and Maternal CMV DNAemia Independently Predict Infant Outcome in Pregnant Women With a Primary CMV Infection. Clin Infect Dis 71(6):1491-1498.

Rawlinson et al., (2017) Congenital cytomegalovirus infection in pregnancy and the neonate: consensus recommendations for prevention, diagnosis, and therapy. Lancet Infect Dis 17(6): e177-e188.

Razonable et al., (2020) Clinical Diagnostic Testing for Human Cytomegalovirus Infections. J Infect Dis 221(Suppl 1): S74-S85.

Revello et al., (2004) A randomized trial of hyperimmune globulin to prevent congenital cytomegalovirus. N Engl J Med 370(14): 1316-1326.

Rizzo et al., (2016) Study of Soluble HLA-G in Congenital Human Cytomegalovirus Infection. J Immunol Res 2016: 3890306.

Rodriguez-Gallego et al., (2019) HIV-1 Elite Controllers Study Group (ECRIS), Spanish AIDS Research Network. Proteomic Profile Associated With Loss of Spontaneous Human Immunodeficiency Virus Type 1 Elite Control. J Infect Dis 219(6): 867-876.

Schleiss (2020) The Value of Hyperimmune Globulin in Pregnancies Complicated by Cytomegalovirus Infection: A Continuing Saga. Clin Infect Dis 71(6): 1499-1501.

Scott et al., (2012) Cytomegalovirus infection during pregnancy with maternofetal transmission induces a proinflammatory cytokine bias in placenta and amniotic fluid. J Infect Dis 205(8): 1305-1310.

Sellier et al., (2020) Adaptive and Innate Immune Cells in Fetal Human Cytomegalovirus-Infected Brains. Microorganisms 8(2): 176.

Shahar-Nissan et al., (2020) Valaciclovir to prevent vertical transmission of cytomegalovirus after maternal primary infection during pregnancy: a randomised, double-blind, placebo-controlled trial. Lancet 396(10253): 779-785.

Tanimura and Yamada (2018) Potential Biomarkers for Predicting Congenital Cytomegalovirus Infection. Int J Mol Sci 19(12): 3760.

Visentin et al., (2012) Early primary cytomegalovirus infection in pregnancy: maternal hyperimmunoglobulin therapy improves outcomes among infants at 1 year of age. Clin Infect Dis 55(4): 497-503.

Vorontsov et al., (2022) Amniotic fluid biomarkers predict the severity of congenital cytomegalovirus infection. J Clin Invest 132(11): e157415.

Weisblum et al., (2015) Human cytomegalovirus induces a distinct innate immune response in the maternal-fetal interface. Virology 485: 289-296.

Weisblum et al., (2017) Zika Virus Infects Early- and Midgestation Human Maternal Decidual Tissues, Inducing Distinct Innate Tissue Responses in the Maternal-Fetal Interface. J Virol 91(4): e01905-16.

Zabel et al., (2005) Chemerin activation by serine proteases of the coagulation, fibrinolytic, and inflammatory cascades. J Biol Chem 280(41): 34661-34666.

Zhou et al., (2018) Circulating chemerin levels and gestational diabetes mellitus: a systematic review and meta-analysis. Lipids Health Dis 17(1): 169.

Quantikine® ELISA; Human Chemerin Immunoassay. Catalog No. DCHM00. © 2019 R&D Systems®, Inc. 12 pages.

Quantikine™ ELISA; Human Galectin-3BP/MAC-2BP Immunoassay. Catalog No. DGBP30B. © 2021 R&D Systems®, Inc. 16 pages.

* cited by examiner

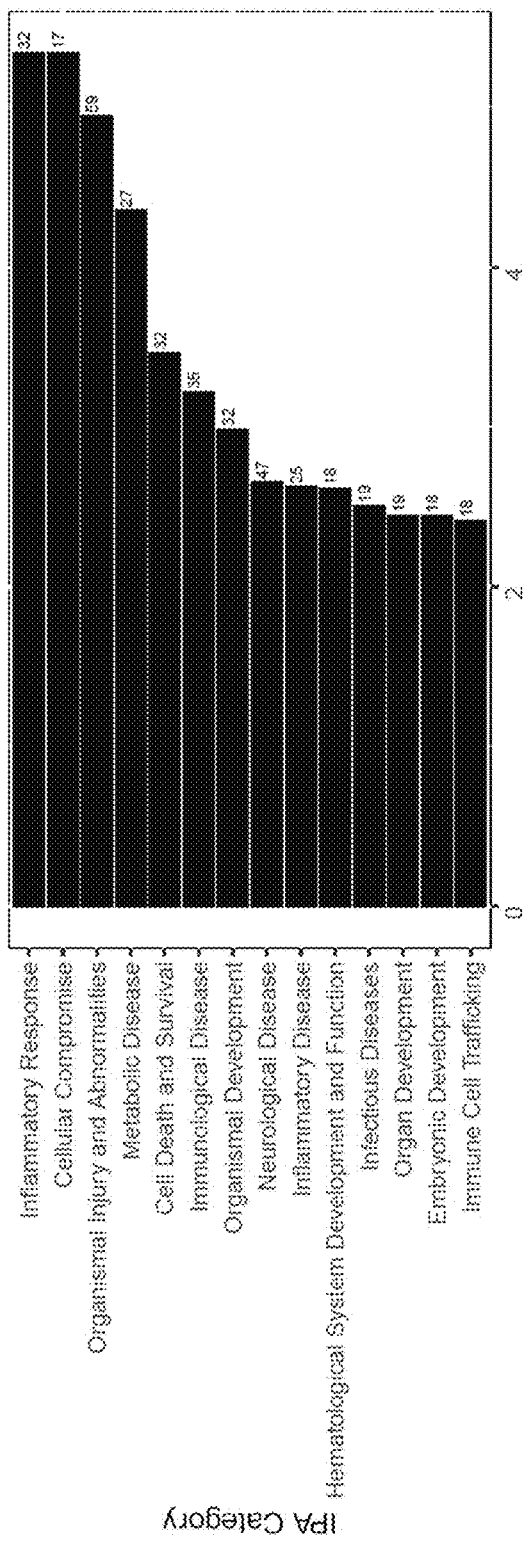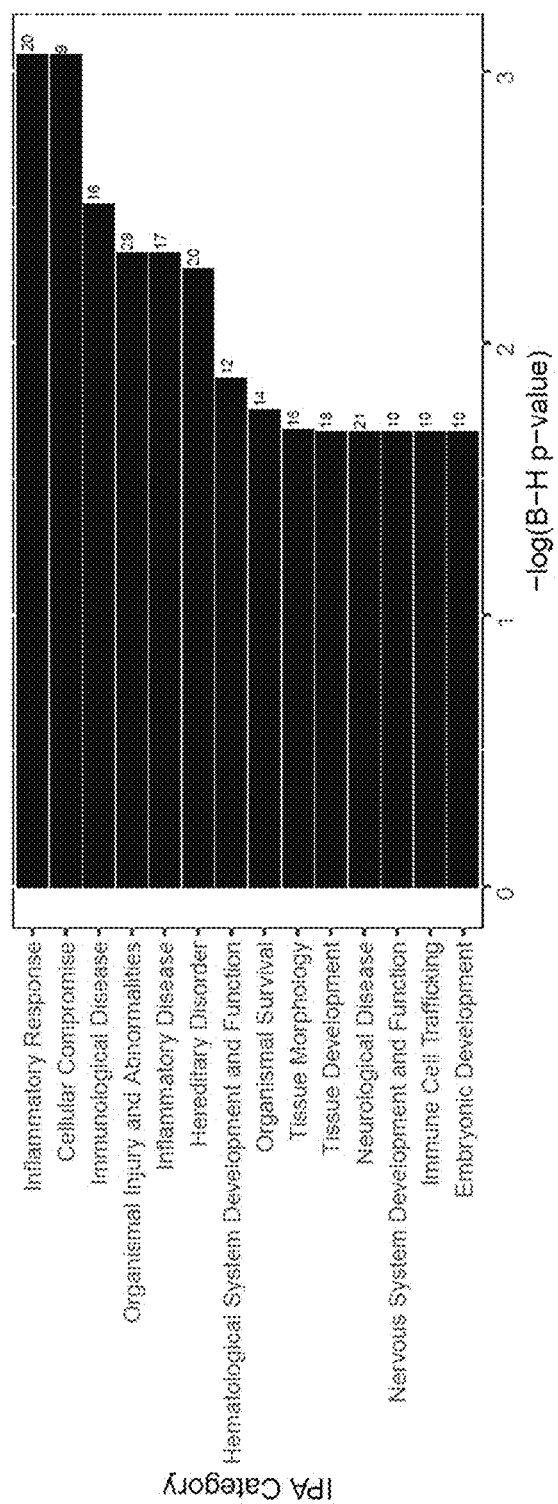
Fig. 7A
Fig. 7B

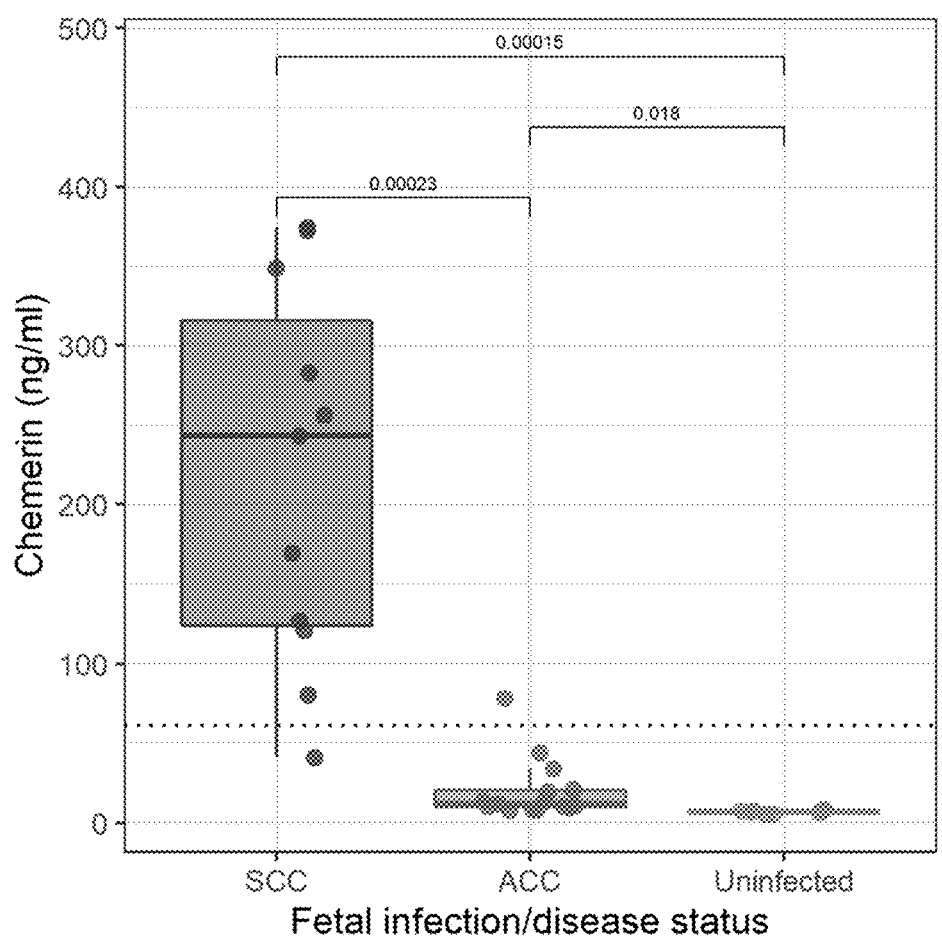

DIAGNOSIS OF CONGENITAL CYTOMEGALOVIRUS INFECTION

FIELD OF THE INVENTION

The present invention relates to biomarkers allowing the diagnosis of symptomatic congenital cytomegalovirus (CMV) infection and in particular to differentiate between symptomatic and asymptomatic infected fetuses, to methods of diagnosis of CMV using said biomarkers, diagnostic kits comprising thereof and use of the kits.

BACKGROUND OF THE INVENTION

Congenital cytomegalovirus (cCMV) infection, resulting from intrauterine transmission, is the most common congenital infection, affecting an average of 0.64% of live births worldwide. Primary human CMV infection during gestation poses ~30-40% risk of intrauterine transmission, whereas recurrent infection is associated with a lower transmission rate. Once fetal/congenital infection occurs, cCMV disease develops in ~25% of the infected children, and can present as sensorineural hearing loss (SNHL) and a wide range of neurodevelopmental disabilities, brain anomalies, and intrauterine growth restriction. About 10% of congenitally infected newborns are already symptomatic at birth, and 10-15% of initially-asymptomatic neonates with cCMV will develop delayed permanent sequelae, usually hearing loss and psychomotor delay, later in life. Despite the immense clinical and sociological burden of cCMV, no licensed vaccines are available. Moreover, no established prenatal antiviral treatments and prenatal biomarkers for fetal/neonatal disease have been identified thus far.

Recent prenatal treatment trials with HCMV-specific hyperimmune globulins (e.g. Nigro et al., N Engl J Med. 2005; 353(13):1350-62; Revello et al., N Engl J Med. 2014; 370(14):1316-26) yielded ambiguous results. Prenatal treatment with valacyclovir showed promising results in fetuses with non-severe ultrasound symptoms. These studies have stirred great interest in prenatal diagnosis and prevention of cCMV infection and disease. The growing awareness of cCMV in recent years has triggered widespread CMV serological screening in pregnant women in several countries, further underscoring the need to identify reliable prenatal markers for fetal infection and disease. Once the maternal infection is diagnosed, amniocentesis with CMV qPCR testing in amniotic fluid is now routinely utilized for the prenatal diagnosis of fetal infection, typically after the 20$^{th}$ week of pregnancy. However, while positive results in amniotic fluid reliably identify fetal infection, they do not distinguish between symptomatic and asymptomatic fetuses/neonate. Prenatal prediction of fetal disease is currently limited, being mostly based on fetal imaging (by ultrasound or MRI) which is compromised by suboptimal predictive values, especially during early- and mid-gestation, when timely decisions about medical intervention are highly needed.

The search for prenatal predictors of fetal disease has been ongoing. In this regard, the correlation of CMV DNA load in amniotic fluid with the congenital disease has been extensively studied. Although higher median viral loads were generally shown to be associated with symptomatic congenital infections, high viral load—a common finding in CMV-infected amniotic fluids—is not predictive of fetal disease (e.g. in Gibson L., Lancet Infect Dis 2017; 17:e177-e188). The prognostic value of fetal blood parameters, including platelet counts, IgM levels, CMV DNA levels, and beta-2-microglobulin has been advocated. However, the procedure of fetal blood sampling by cordocentesis is invasive and associated with 1-3% risk of fetal loss, and thus not routinely utilized. Recently, examination of the amniotic fluid peptidome, analyzed by capillary electrophoresis coupled to mass spectrometry, has identified a 34-peptide combination classifier in a discovery cohort of 13 symptomatic and 13 asymptomatic neonates. (Desveaux C. et al., PLoS Pathog. 2016; 12(1):e1005395).

Another study has proposed that high level of amniotic fluid soluble HLA-G in maternal serum and amniotic fluid could potentially serve as predictive biomarkers for cCMV disease, with a PPV of 100% and NPV of 71.4%-83.3%, identified in a small cohort of 12 symptomatic and 5 asymptomatic fetuses with cCMV (Rizzo et al., J Immunol Res. 2016; 2016:3890306.). These markers have not demonstrated a clear advantage over currently available measures or introduced into clinical use. It was concluded that larger studies are required to verify their clinical efficacy in predicting clinical outcomes of a CMV-infected fetuses. There is an unsolved need for safe and robust methods for determining fetal CMV infection, predicting symptomatic CMV infection, and in particular for distinguishing between symptomatic and asymptomatic CMV subjects

SUMMARY OF THE INVENTION

The present invention provides that based on the measurement of concentration(s) of one or more biomarkers as defined in the present application, it is possible to unambiguously diagnose fetus infected with cytomegalovirus and even more, distinguishing between symptomatic and asymptomatic infected fetuses.

According to one aspect, the present invention provides a method of diagnosing a congenital cytomegalovirus (cCMV) infection, wherein the method comprises (i) determining a level of at least one biomarker in a biological sample; and (ii) comparing the level of the at least one biomarker from the biological sample to its level in a control, wherein a difference in the level of the biomarker in the biological sample and in the control is indicative of a congenital CMV infection, wherein the at least one biomarker is selected from a biomarker of group A, Group B, Group C and Group D, wherein:

Group A comprises biomarkers: Cathepsin B (CTSB), Signal-regulatory protein beta-1 (SIRPB1), Galectin-3-binding protein (LGALS3BP), Agrin (AGRN), Vascular cell adhesion protein 1 (VCAM1), Coactosin-like protein (COTL1), CD5 antigen-like (CD5L), ATP synthase subunit beta, mitochondrial (ATPSB), Keratin, type II cytoskeletal 6A (KRT6A), Secreted and transmembrane protein 1 (SECTM1), Fatty acid-binding protein, heart (FABP3), Calcyclin (S100A6), (SH3 domain-binding glutamic acid-rich-like protein (SH3BGRL), Interferon-stimulated gene 15 (ISG15), Cartilage acidic protein 1 (CRTAC1), Retinoic acid receptor responder protein 2 (RARRES2), Bone marrow stromal antigen 2 (BST2), Beta-2-microglobulin (B2M), Epiphycan (EPYC), Dickkopf-related protein 1 (DKK1), Major Histocompatibility Complex, Class I, C (HLA-C), Carboxypeptidase Q (CPQ), Coagulation factor V (F5), Transmembrane glycoprotein NMB (GPNMB), Laminin subunit alpha-5 (LAMA5), Carbonic anhydrase 3 (CA3), Desmin (DES), Chitotriosidase-1 (CHIT1); Transmembrane emp24 domain-containing protein 7 (TMED7); Serine protease 23 (PRSS23); Alpha-1,6-mannosylglycoprotein 6-beta-N- acetylglucosaminyltransferase A (MGAT5); and Amiloride-sensitive amine oxidase [copper-containing] (AOC1);

Group B comprises biomarker: Multiple epidermal growth factor-like domains protein 8 (MEGF8), N-acetylgalactosaminyltransferase 7 (GALNT7), Protocadherin Fat 4 (FAT4), (Latrophilin-2 (LPHN2), (Afamin (AFM), Mannan-binding lectin serine protease 1 (MASP1), Extracellular superoxide dismutase [Cu—Zn] (SOD3), Polypeptide N-acetylgalactosaminyltransferase 2 (GALNT2), Lipolysis-stimulated lipoprotein receptor (LSR), Hepatocyte growth factor (HGF), Bone marrow proteoglycan (PRG2), Sulfhydryl oxidase 1 (QSOX1), Endogenous retrovirus group MER34 member 1 Env polyprotein (ERVMER34-1), Pappalysin-2 (PAPPA2), Aspartate aminotransferase, cytoplasmic (GOT1), Radixin (RDX), Insulin-like growth factor-binding protein 5 (IGFBP5), Desmoyokin (AHNAK), Disintegrin and metalloproteinase domain-containing protein 9 (ADAM9), Lysosome-associated membrane glycoprotein 2 (LAMP2), Carboxypeptidase M (CPM), Suprabasin (SBSN), Calpastatin (CAST), Serine protease inhibitor Kazal-type 5 (SPINK5), Tenomodulin (TNMD), Cadherin-15 (CDH15), Plasma kallikrein (KLKB1), Prostasin (PRSS8), Collagen alpha-1 (III) chain (COL3A1), Collagen alpha-2 (I) chain (COL1A2), and Immunoglobulin superfamily member 1 (IGSF1);

Group C comprises biomarkers Nesprin-1 (SYNE1), Myosin-14 (MYH14), GPNMB, LGALS3BP, Carboxypeptidase A2 (CPA2), RARRES2, Secretoglobin family 3A member 2 (SCGB3A2), C-reactive protein (CRP), and Glutathione S-transferase theta-1 (GSTT1); Carboxypeptidase Q Protein (CPQ); Family with sequence similarity 3 member D (FAM3D); Keratin 17 (KRT17); and Group D comprises biomarkers CPM, Platelet-derived growth factor receptor beta (PDGFRB), Angiopoietin-related protein 6 (ANGPTL6), Dermokine (DMKN), Secretogranin-1 (CHGB), ADAM9, Growth arrest-specific protein 1 (GAS1), Platelet basic protein (PPBP), Platelet glycoprotein Ib alpha chain (GP1BA), LAMP2, Neurofascin (NFASC), Alcohol dehydrogenase [NADP(+)] (AKR1A1), Heat shock protein beta-1 (HSPB1), Maltase-glucoamylase (MGAM), LAMP2, Actin alpha 1, skeletal muscle (ACTA1), Mesothelin (MSLN); Sarcoglycan epsilon (SGCE); Cell growth regulator with EF hand domain protein 1 (CGREF1), and Endoplasmic reticulum aminopeptidase 1 (ERAP1). According to one embodiment, the biomarkers are protein biomarkers. According to some embodiments, the biological sample is obtained from a subject selected from a fetus, pregnant woman and neonate. According to some embodiments, the biological sample is selected from an amniotic fluid, fetal blood, fetal blood from the umbilical cord, placental biopsy, neonate blood and maternal blood or serum. According to some embodiments, an increase in the level of at least one biomarker of Group A or C, and/or a decrease in the level of at least one biomarker of Group B or D in the biological sample in comparison to their levels in the control or in comparison to a predefined cutoff level is indicative of cCMV infection.

According to some embodiments, the present invention provides a method for diagnosing a symptomatic cCMV. According to some embodiments, the method of diagnosing according to the present invention allows differentiating between symptomatic and asymptomatic cCMV infected subjects, such as symptomatic and asymptomatic fetuses and/or neonates. According to some embodiments, an increase in the level of at least one biomarker of Group C and/or a decrease in the level of at least one biomarker of Group D in the biological sample in comparison to their levels in the control or in comparison to a predefined threshold level is indicative of a symptomatic cCMV infection. Thus, according to some embodiments, the present invention provides a method of diagnosing a symptomatic congenital cytomegalovirus (symptomatic cCMV) in a fetus, wherein the method comprises (i) determining a level of at least one biomarker in a biological sample; and (ii) comparing the level of the at least one biomarker from the biological sample to its level in a control, wherein a difference in the level of the biomarker in the biological sample and in the control is indicative of presence of the symptomatic cCMV infection, wherein the at least one biomarker is selected from the biomarkers of group Group C and Group D, wherein: Group C comprises biomarkers RARRES2, LGALS3BP, GPNMB, Nesprin-1 (SYNE1), Myosin-14 (MYH14), Carboxypeptidase A2 (CPA2), Secretoglobin family 3A member 2 (SCGB3A2) CRP, GSTT1, CPQ, FAM3D, and KRT17; and Group D comprises biomarkers CPM, Platelet-derived growth factor receptor beta (PDGFRB), Angiopoietin-related protein 6 (ANGPTL6), Dermokine (DMKN), Secretogranin-1 (CHGB), ADAMS, Growth arrest-specific protein 1 (GAS1), Platelet basic protein (PPBP), Platelet glycoprotein Ib alpha chain (GP1BA), LAMP2, NFASC, AKR1A1, HSPB1, MGAM, ACTA1, MSLN, SGCE, CGREF1, and ERAP1. According to some embodiments, the biomarkers are protein biomarkers. According to some embodiments, the wherein the biological sample is obtained from a subject selected from a fetus and pregnant woman. According to other embodiments, the biological sample is selected from an amniotic fluid, fetal blood, plasma or serum, fetal blood, plasma or serum from the umbilical cord, placental biopsy, and maternal blood or serum. According to a certain embodiment, the biological sample is an amniotic fluid.

According to some embodiments, an increase in the level of at least one biomarker of Group C in the biological sample in comparison to their levels in the control; (ii) a decrease in the level of at least one biomarker of Group D in the biological sample in comparison to their levels in the control; or (iii) both (i) and (ii) is indicative of a symptomatic cCMV infection. According to some embodiments, an increase in the level of RARRES2 in the biological sample in comparison to its level in the control or in comparison to a predefined threshold level is indicative of symptomatic cCMV infection. According to some embodiments, an increase in the level of LGALS3BP in the biological sample in comparison to its level in the control or in comparison to a predefined threshold level is indicative of a symptomatic cCMV infection. According to some embodiments, an increase in the level of GPNMB in the biological sample in comparison to its level in the control or in comparison to a predefined threshold level is indicative of a symptomatic cCMV infection. According to some embodiments, the method of diagnosis comprises determining levels of at least two, at least 3, at least 4 or at least 5 biomarkers in the biological sample. According to some embodiments, the method of diagnosis comprises determining levels of 2, 3, 4, 5 or 6 biomarkers in the biological sample. According to some embodiments, an increase in the levels of (i) RARRES2, (ii) LGALS3BP or (iii) both RARRES2 and LGALS3BP in the biological sample in comparison to their levels in the control or in comparison to their predefined threshold levels is indicative of a symptomatic cCMV infection. According to some embodiments, an increase in the levels of RARRES2 and of LGALS3BP, and (i) an increase in the level of at least one biomarker selected from SYNE1, MYH14, GPNMB, CPA2, SCGB3A2 CRP, GSTT1, CPQ, FAM3D, and KRT17; and/or (ii) a decrease in the level of at least one biomarker selected from CPM, PDGFRB, ANGPTL6, DMKN, CHGB, ADAMS, GAS1, PPBP, GP1BA, LAMP2, NFASC, AKR1A1, HSPB1, MGAM, ACTA1, MSLN, SGCE, CGREF1, and ERAP1 in comparison to their levels in the control or in comparison to their predefined threshold levels is indicative of a symptomatic cCMV infection. According to some embodiments, an increase in the levels of RARRES2, LGALS3BP, and GPNMB in the biological sample in comparison to their levels in the control is indicative of a symptomatic cCMV infection. According to some embodiments, the biological sample is an amniotic fluid. According to other embodiments, the biological sample is a maternal serum. According to some embodiments, the diagnosis is performed before week 36 of the pregnancy. According to some embodiments, the method further comprises a step of diagnosing whether the subject, e.g. a fetus, is infected with CMV. According to some other embodiments, the method further comprises differentiating between symptomatic and asymptomatic CMV infection.

According to another aspect, the present invention provides a method of diagnosing an asymptomatic congenital cytomegalovirus in a fetus, wherein the method comprises (i) diagnosing whether the fetus is infected with CMV and (ii) diagnosing whether the fetus has a symptomatic CMV by the method of the present invention, wherein lack of symptomatic CMV in the infected fetus is indicative of presence of asymptomatic cCMV.

According to another aspect, the present invention provides a method for recommending a medical intervention, the method comprises diagnosing a congenital cytomegalovirus using the methods of diagnosis according to the present invention, and recommending the medical intervention based on the obtained results. According to some embodiments, the congenital cytomegalovirus is a symptomatic cCMV. According to other embodiments, the congenital cytomegalovirus is an asymptomatic cCMV. Thus, according to some embodiments, the present invention provides a method for recommending a medical intervention comprising detecting a symptomatic or asymptomatic congenital cytomegalovirus in fetus according to the methods of the present invention and recommending the medical intervention based on the obtained results. According to some embodiments, the present invention provides a method of executing a medical intervention in case of existence of a congenital CMV such symptomatic cCMV comprising diagnosing the cCMV according to the methods of the present invention and effecting the medical intervention. According to some embodiments, the medical intervention is a treatment with an anti-CMV active agent. According to other embodiments, the medical intervention is a termination of pregnancy.

According to some embodiments, the present invention provides a method of treating a congenital cytomegalovirus in a fetus comprising diagnosing the symptomatic or asymptomatic cCMV in the fetus according to the methods of the present invention and administering to the fetus or the mother an anti-CMV active agent. According to some embodiments, the congenital cytomegalovirus is a symptomatic CMV. According to some embodiments, the congenital cytomegalovirus is an asymptomatic CMV.

According to another aspect, the present invention provides a kit comprising means for determining a level of at least one biomarker in a biological sample, wherein the at least one biomarker is selected from a biomarker of Group A, Group B, Group C and Group D, and instructions for use. According to some embodiments, the kit comprises instructions for diagnosing a congenital cytomegalovirus (cCMV) infection. According to other embodiments, the kit comprises instructions for diagnosing a symptomatic cCMV. According to another embodiment, the kit comprises instructions for diagnosing an asymptomatic cCMV. According to some embodiments, the kit provides means for determining the levels of a biomarker selected from RARRES2, LGALS3BP, GPNMB, and a combination thereof. According to some embodiments, the present invention provides a kit comprising means for determining levels of at least two biomarker in a biological sample, wherein the at least two biomarkers are selected from biomarkers of Group C and Group D, and instructions for use of said kit. According to some embodiments, the kit comprises means for determining the levels of RARRES2 and LGALS3BP, RARRES2 and GPNMB or LGALS3BP and GPNMB or of RARRES2, LGALS3BP and GPNMB. According to some embodiments, the kit further comprises means for determining the level of at least one additional biomarker selected from SYNE1, MYH14, GPNMB, CPA2, SCGB3A2, CPM, PDGFRB, ANGPTL6, DMKN, CHGB, ADAM9, GAS1, PPBP, GP1BA, CRP, GSTT1, NFASC, AKR1A1, HSPB1, MGAM, LAMP2 ACTA1, MSLN, SGCE, CGREF1, and ERAP1. According to certain embodiments, the means of the kit allow detecting levels of a plurality of biomarkers. According to some embodiments, the kit comprises all required means and information for detecting the levels of the biomarkers in the biological samples and for comparing the detected levels to their levels in the control or to their threshold levels for diagnosing the cCMV and/or symptomatic cCMV. According to some embodiment, the kit of the present invention is for diagnosing cCMV. According to other embodiments, the kit of the present invention is for diagnosing symptomatic cCMV.

According to another aspect, the present invention provides use of a kit in diagnosis a congenital CMV, wherein the kit comprises means for determining a level of at least one biomarker in a biological sample, wherein the at least one biomarker is selected from a biomarker of Group A, Group B, Group C and Group D. According to some embodiments, the use comprises diagnosing a symptomatic cCMV. According to other embodiments, the use comprises diagnosing an asymptomatic cCMV. According to some embodiments, the use comprises determining the levels of RARRES2 and/or LGALS3BP in a biological sample, and optionally further determining the levels of at least one biomarker selected from SYNE1, MYH14, GPNMB, CPA2, SCGB3A2, CPM, CPQ, FAM3D, KRT17, PDGFRB, ANGPTL6, DMKN, CHGB, ADAM9, GAS1, PPBP, GP1BA, LAMP2, CRP, GSTT1, NFASC, AKR1A1, HSPB1, MGAM, ACTA1 MSLN, SGCE, CGREF1, and ERAP01 and comparing the determined levels to the threshold levels, thereby diagnosing the cCMV and/or symptomatic or asymptomatic cCMV.

BRIEF DESCRIPTION OF DRAWINGS

FIGS. 7A and 7B show plots of top-enriched pathways of the differentially-excreted proteins between CMV-infected and uninfected fetuses (FIG. 7A) and between fetuses with symptomatic and asymptomatic cCMV (FIG. 7B). Based on Ingenuity pathway Analysis. The numbers near each category indicate the number of differentially-excreted proteins related to each of the shown pathways.

FIGS. 9A and 9B show amniotic fluid chemerin (FIG. 9A) and Gal-3BP (FIG. 9B) levels in an Initial Validation cohort of fetuses with symptomatic cCMV (SCC; n=11), asymptomatic cCMV (ACC; n=15), and in uninfected fetuses (n=8). The dotted horizontal lines represent optimal predictive cutoff values derived by ROC analysis.

DETAILED DESCRIPTION OF THE INVENTION

Figure 1:
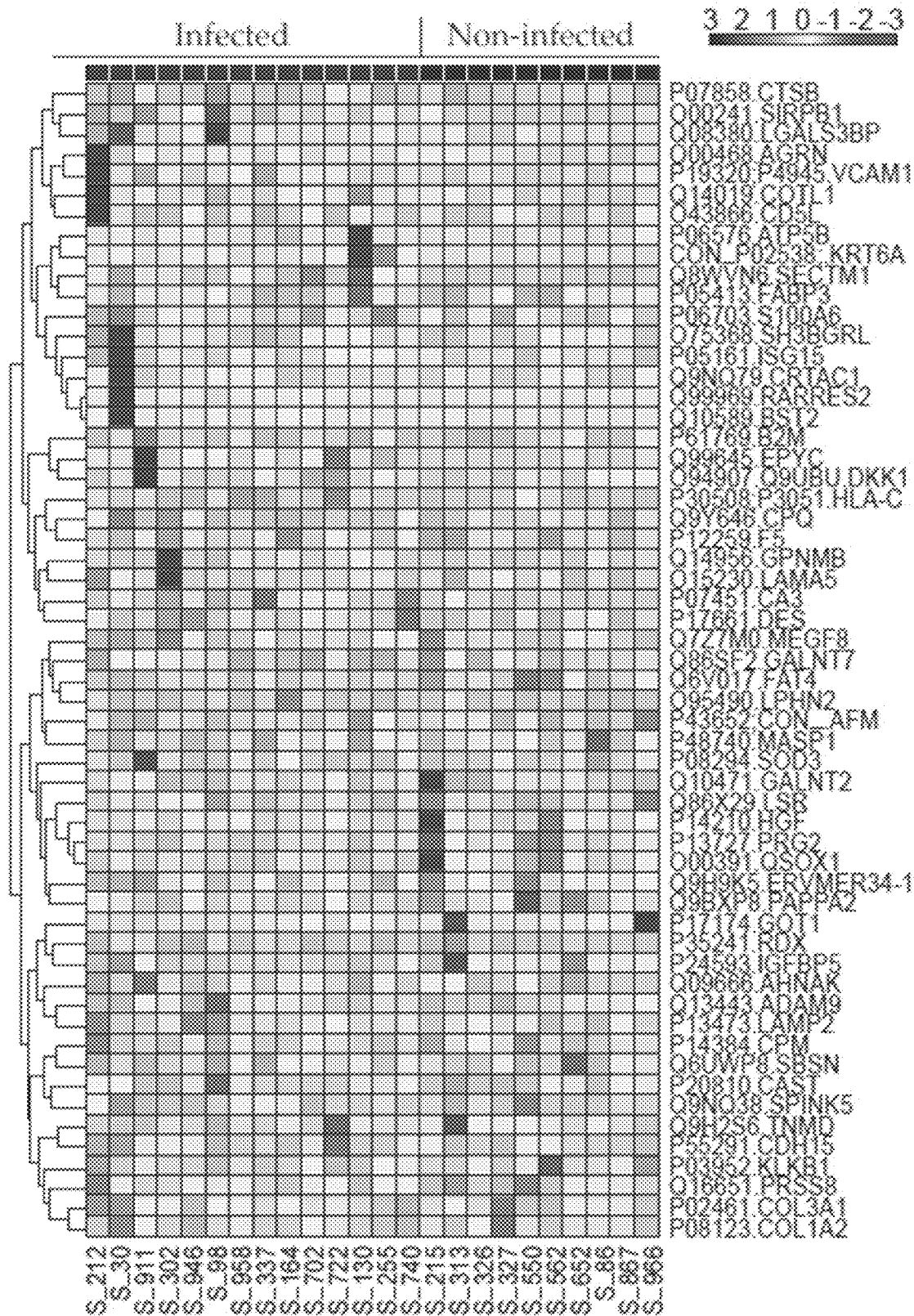
FIG. 1 shows a heatmap showing the proteins differing between CMV-positive (yes) and CMV-negative (no) amniotic fluid samples. The heatmap was drawn using normalized values, after scaling per protein over all drawn samples.

The present invention is based on an unexpected observation that a set of biomarkers, i.e. proteins, secreted into the amniotic fluid, may be useful to unambiguously diagnose fetal infected with cytomegalovirus. Even more surprising was the finding that several specific biomarkers allow determining whether the fetus has/will develop a symptomatic congenital CMV. In other word, the methods of the present invention allow differentiating between symptomatic and asymptomatic infected fetuses. Currently this differentiation is often made by imaging at a later stage and usually does not provide a robust differentiation. Determination whether the fetus is infected by CMV is usually made by measuring viral load in amniotic fluid and usually is unambiguous. However, diagnosing whether the fetus is expected to develop symptoms of CMV will allow to provide much more specific recommendations and will reduce the number of non-necessary terminations of pregnancies. As shown in the results, the present invention allows differentiating fetus having symptomatic and asymptomatic CMV with sensitivity, specificity, and positive and predictive values of above 95.0% each (referring to RARRES2 and LGALS3BP proteins). Specifically, it was shown that detecting RARRES2 in amniotic fluids in concentration above 40 ng/ml allows diagnosing a symptomatic cCMV with sensitivity of 95.2%, specificity of 92.9%, positive predictive value of 90.9%, and negative predictive value of 96.3%. In additional it was shown that detection of LGALS3BP in amniotic fluid above 2475 ng/ml allowed a reliable prenatal disease prediction with sensitivity of 90.5%, specificity of 96.4%, positive predictive value of 95.0%, and negative predictive value of 93.1%. These are outstanding results that allow providing a well-supported recommendation on whether to continue the pregnancy or not, on closer monitoring, and on the potential use of antiviral treatments.

In one aspect the present invention provides a method of diagnosing a congenital cytomegalovirus (cCMV) infection, wherein the method comprises (i) determining a level of at least one biomarker in a biological sample; and (ii) comparing the level of the at least one biomarker from the sample to its level in a control, wherein a difference in the level of the biomarker in the biological sample and in the control is indicative of a congenital CMV infection, wherein the at least one biomarker is selected from Cathepsin B (CTSB), Signal-regulatory protein beta-1 (SIRPB1), Galectin-3-binding protein (LGALS3BP), Agrin (AGRN), Vascular cell adhesion protein 1 (VCAM1), Coactosin-like protein (COTL1), CDS antigen-like (CDSL), ATP synthase subunit beta, mitochondrial (ATPSB), Keratin, type II cytoskeletal 6A (KRT6A), Secreted and transmembrane protein 1 (SECTM1), Fatty acid-binding protein, heart (FABP3), Calcyclin (S100A6), SH3 domain-binding glutamic acid-rich-like protein (SH3BGRL), Interferon-stimulated gene 15

(ISG15), Cartilage acidic protein 1 (CRTAC1), Retinoic acid receptor responder protein 2 (RARRES2), Bone marrow stromal antigen 2 (BST2), Beta-2-microglobulin (B2M), Epiphycan (EPYC), Dickkopf-related protein 1 (DKK1), Major Histocompatibility Complex, Class I, C (HLA-C), Carboxypeptidase Q (CPQ), Coagulation factor V (F5), Transmembrane glycoprotein NMB (GPNMB), Laminin subunit alpha-5 (LAMAS), Carbonic anhydrase 3 (CA3), and Desmin (DES), Multiple epidermal growth factor-like domains protein 8 (MEGF8), N-acetylgalactosaminyltransferase 7 (GALNT7), Protocadherin Fat 4 (FAT4), Latrophilin-2 (LPHN2), Afamin (AFM), Mannan-binding lectin serine protease 1 (MASP1), Extracellular superoxide dismutase [Cu—Zn] (SOD3), Polypeptide N-acetylgalactosaminyltransferase 2 (GALNT2), Lipolysis-stimulated lipoprotein receptor (LSR), Hepatocyte growth factor (HGF), Bone marrow proteoglycan (PRG2), Sulfhydryl oxidase 1 (QSOX1), Endogenous retrovirus group MER34 member 1 Env polyprotein (ERVMER34-1), Pappalysin-2 (PAPPA2), Aspartate aminotransferase, cytoplasmic (GOT1), Radixin (RDX), Insulin-like growth factor-binding protein 5 (IGFBP5), Desmoyokin (AHNAK), Disintegrin and metalloproteinase domain-containing protein 9 (ADAMS), Lysosome-associated membrane glycoprotein 2 (LAMP2), Carboxypeptidase M (CPM), Suprabasin (SBSN), Calpastatin (CAST), Serine protease inhibitor Kazal-type 5 (SPINKS), Tenomodulin (TNMD), Cadherin-15 (CDH15), Plasma kallikrein (KLKB1), Prostasin (PRSS8), Collagen alpha-1(111) chain (COL3A1), and Collagen alpha-2 (I) chain (COL1A2), Nesprin-1 (SYNE1), Myosin-14 (MYH14), GPNMB, LGALS3BP, Carboxypeptidase A2 (CPA2), RARRES2, and Secretoglobin family 3A member 2 (SCGB3A2), CPM, Platelet-derived growth factor receptor beta (PDGFRB), Angiopoietin-related protein 6 (ANGPTL6), Dermokine (DMKN), Secretogranin-1 (CHGB), ADAM9, Growth arrest-specific protein 1 (GAS1), Platelet basic protein (PPBP), and Platelet glycoprotein Ib alpha chain (GP1BA), Chitotriosidase-1 (CHIT1); Transmembrane emp24 domain-containing protein 7 (TMED7); Serine protease 23 (PRSS23); Alpha-1,6-mannosylglycoprotein 6-beta-N-acetylglucosaminyltransferase A (MGAT5); Amiloride-sensitive amine oxidase [copper-containing] (AOC1) and Immunoglobulin superfamily member 1 (IGSF1).

The biomarkers according to the present invention are divided into groups solely for the purpose of easing the reading of the invention. Thus, Group A of biomarkers comprises biomarkers CTSB, SIRPB1, LGALS3BP, AGRN, VCAM1, COTL1, CDSL, ATPSB, KRT6A, SECTM1, FABP3, S100A6, SH3BGRL, ISG15, CRTAC1, RARRES2, BST2, B2M, EPYC, DKK1, HLA-C, CPQ, F5, GPNMB, LAMAS, CA3, and DES. Group B of biomarkers comprises biomarkers MEGF8, GALNT7, FAT4, LPHN2, AFM, MASP1, SOD3, GALNT2, LSR, HGF, PRG2, QSOX1, ERVMER34-1, PAPPA2, GOT1, RDX, IGFBP5, AHNAK, ADAM9, LAMP2, CPM, SBSN, CAST, SPINKS, TNMD, CDH15, KLKB1, PRSS8, COL3A1, COL1A2, CHIT1; TMED7; PRSS23; MGAT5; and AOC1.

Group B of biomarkers comprises biomarkers Disintegrin and metalloproteinase domain-containing protein 9 (ADAM9), Multiple epidermal growth factor-like domains protein 8 (MEGF8), N-acetylgalactosaminyltransferase 7 (GALNT7), Protocadherin Fat 4 (FAT4), (Latrophilin-2 (LPHN2), (Afamin (AFM), Mannan-binding lectin serine protease 1 (MASP1), Extracellular superoxide dismutase [Cu—Zn] (SOD3), Polypeptide N-acetylgalactosaminyltransferase 2 (GALNT2), Lipolysis-stimulated lipoprotein receptor (LSR), Hepatocyte growth factor (HGF), Bone marrow proteoglycan (PRG2), Sulfhydryl oxidase 1 (QSOX1), Endogenous retrovirus group MER34 member 1 Env polyprotein (ERVMER34-1), Pappalysin-2 (PAPPA2), Aspartate aminotransferase, cytoplasmic (GOT1), Radixin (RDX), Insulin-like growth factor-binding protein 5 (IGFBP5), Desmoyokin (AHNAK), Lysosome-associated membrane glycoprotein 2 (LAMP2), Carboxypeptidase M (CPM), Suprabasin (SBSN), Calpastatin (CAST), Serine protease inhibitor Kazal-type 5 (SPINKS), Tenomodulin (TNMD), Cadherin-15 (CDH15), Plasma kallikrein (KLKB1), Prostasin (PRSS8), Collagen alpha-1 (III) chain (COL3A1), Collagen alpha-2 (I) chain (COL1A2) and IGSF1.

Group C of biomarkers comprises biomarkers SYNE1, MYH14, GPNMB, LGALS3BP, CPA2, RARRES2, SCGB3A2 CRP, GSTT1, CPQ, FAM3D, and KRT17.

Group D of biomarkers comprises biomarkers CPM, PDGFRB, ANGPTL6, DMKN, CHGB, ADAM9, GAS1, PPBP, GP1BA, LAMP2, NFASC, AKR1A1, HSPB1, MGAM, ACTA1, MSLN, SGCE, CGREF1, and ERAP1.

According to some embodiments, the biomarkers are protein biomarkers.

According to some embodiments, the biomarkers may be sub-grouped. According to some embodiments, a group E comprises biomarkers GP1BA, ACTA1, AKR1A1, NFASC, CHGB, PPBP, LAMP2, MGAM, HSPB1, ANGPTL6, PDGFRB, ADAM9, MSLN, SGCE, GAS1, CGREF1, and ERAP1.

According to some embodiments, the present invention provides a method of diagnosing a congenital cytomegalovirus (cCMV) infection, wherein the method comprises (i) determining a level of at least one biomarker in a biological sample; and (ii) comparing the level of the at least one biomarker from the sample to its level in a control, wherein the difference between the level of the biomarker in the biological sample and in the control is indicative of a congenital CMV infection, wherein the at least one biomarker is selected from the biomarkers of Group A, Group B, Group C and Group D, as defined hereinabove. According to some embodiments, the present invention provides a method of diagnosing a congenital cytomegalovirus (cCMV) infection, wherein the method comprises (i) determining a level of at least one biomarker Group A and Group B in a biological sample; and (ii) comparing the level of the at least one biomarker from the sample to its level in a control, wherein the difference between the level of the biomarker in the biological sample and in the control is indicative of a congenital CMV infection. According to some embodiments, the present invention provides a method of diagnosing a congenital cytomegalovirus (cCMV) infection, wherein the method comprises (i) determining a level of at least one biomarker Group F and Group G in a biological sample; and (ii) comparing the level of the at least one biomarker from the sample to its level in a control, wherein the difference between the level of the biomarker in the biological sample and in the control is indicative of a congenital CMV infection.

According to any one of the above embodiments, the biomarkers, i.e. the proteins are human proteins. According to certain embodiments, the proteins are fetal proteins.

According to some embodiments, the biological sample is obtained from a subject. The term "subject" refers to a human subject. According to some embodiments, the subject is selected from a fetus, pregnant woman and neonate.

As used herein, the term "biological sample" refers to a sample obtained from a subject, including a sample of a biological tissue or fluid origin obtained in vivo or in vitro. Biological samples can be, without limitation, body fluid (e.g., blood, blood plasma, serum), organs, tissues, fractions and cells isolated from the subject/patient. Biological samples also may include sections of the biological sample including tissues (e.g., sectional portions of an organ or tissue). Biological samples may be dispersed in solution or may be immobilized on a solid support, such as in blots, assays, arrays, glass slides, microtiter, or ELISA plates. Biological samples may be processed in any known method before their use in the methods of the present invention.

In one embodiment, the biological sample is an amniotic fluid. According to some embodiments, the biological sample is selected from an amniotic fluid, fetal blood, fetal blood serum, fetal plasma, blood, serum or plasma from the umbilical cord, placental biopsy, neonate blood, neonate dried blood spot and maternal blood or serum. In some embodiments, the biological sample is selected from the group consisting of breast milk, maternal blood, maternal urine, maternal saliva, fetal blood, fetal blood from the umbilical cord, postnatal infant urine, blood, saliva, a uterine biopsy sample, and a placental biopsy. According to some embodiments, the biological sample is fetal blood. According to another embodiment, the biological sample is maternal blood. According to yet another embodiment, the biological sample is neonate blood. According to any one of the above embodiments, the term blood encompasses the term "serum" and may be replaced by it. According to some embodiments, the biological sample is a maternal serum. According to other embodiments, the biological sample is a fetal or neonatal serum. According to other embodiments, the biological sample is neonatal dried blood spot. According to some embodiments, the fetal marker is measured in the biological sample obtained from the mother such as maternal blood, serum or milk.

The terms "marker" and "biomarker" are used interchangeably and refer to a molecule (typically a protein, nucleic acid, carbohydrate, or lipid) that is differentially expressed in the cell, differentially expressed on the surface of an infected cell, differentially phosphorylated, or differentially secreted by an infected cell in comparison to a normal cell or in a paracrine fashion by neighboring uninfected cells, and which is useful for the diagnosis of congenital CMV infection or symptomatic congenital CMV infection for providing a prognosis for birth defects, and for preferential targeting of a pharmacological agent to an infected fetus or individual. According to some embodiments, the biomarker is a protein. In several cases, such markers are proteins that are secreted by an infected cell in comparison to a normal cell, for instance, 1-fold secretion, 2-fold secretion, 3-fold secretion or more in comparison to a normal cell. Alternatively, such biomarkers are molecules that are underexpressed in an infected cell in comparison to a normal cell. According to some embodiments, the marker is a nucleic acid molecule. According to some embodiments, the marker is a nucleic acid molecule such as DNA or RNA molecule correlating to the amount of a protein. Alternately, such biomarkers are produced by uninfected cells or tissues, resulting from local infection or damage and protein fragments are secreted from cells or released by proteolytic processing from the plasma membrane. Further, a marker can be a molecule that is inappropriately synthesized in the infected cell, for instance, a molecule that contains deletions, additions or mutations in comparison to the molecule expressed on a normal cell. A marker can also be a molecule that is inappropriately processed in infected cells, for instance, a molecule that is secreted, proteolytically processed or subject to post-translational modification (e.g., phosphorylation, glycosylation) in comparison to the molecule expressed on a normal cell. In some embodiments, the term "biomarker" as used herein refers to a protein that is differentially present in a biological sample, such as a protein that is differentially excreted into amniotic fluid. According to some embodiments, the biomarkers, such as proteins, are present in biological samples, whereas the presence of the marker above or below a particular amount, referred also as a threshold or cutoff value, is indicative of a diagnosed condition.

The terms "cytomegalovirus" and "CMV" are used herein interchangeably and refer to a genus of viruses of herpes virus as known in the art, more specifically to CMV infecting humans.

As used herein, the terms "congenital cytomegalovirus", "congenital CMV", "congenital CMV infection" and "cCMV" are used herein interchangeably and refer to in utero transmitted CMV infection. The term refers also to an infection in fetuses, neonates and children that were infected in utero. The congenital CMV may be symptomatic and asymptomatic. The terms "symptomatic cCMV" and "symptomatic congenital CMV", as used in the present invention and claims, refer to the condition in which the infected subject demonstrates a moderate to severe cCMV disease in utero and/or after birth. This term contemplates the expectancy that the fetus will develop a moderate to severe cCMV disease in utero and/or after birth. In some cases, the terms "severe cCMV" and "symptomatic cCMV" are used interchangeably. The terms "asymptomatic cCMV", "asymptomatic congenital CMV" and "non-symptomatic cCMV" as used in the present invention and claims refer to the condition in which the infected subject does not demonstrate or is not expected to demonstrate signs of cCMV disease in utero and does not develop or is not expected to develop symptoms/signs of a disease caused by CMV for at least 1 year after birth. The term "infected" refers to subject that is infected with CMV virus and may be symptomatic and asymptomatic. Typically, symptomatic cCMV results is sensorineural hearing loss (SNHL), a wide range of neurodevelopmental disabilities, brain anomalies, and intrauterine growth restriction. The definition of moderate to severely symptomatic cCMV disease is well known in the art and includes:

Multiple manifestations attributable to cCMV infection, such as: thrombocytopenia, petechiae, hepatomegaly, splenomegaly, intrauterine growth restriction, hepatitis (raised transaminases or bilirubin), and/or Central nervous system involvement, such as: microcephaly, radiographic abnormalities consistent with cytomegalovirus central nervous system disease (ventriculomegaly, intracerebral calcifications, periventricular echogenicity, cortical or cerebellar malformations), abnormal cerebrospinal fluid indices for age, chorioretinitis, sensorineural hearing loss, and the detection of cytomegalovirus DNA in cerebrospinal fluid (Rawlinson et al., Lancet Infect Dis 2017; 17:e177-e188.)

As used herein, the term "level" refers to the amount or concentration of a biomarker (marker), e.g. protein, in the biological sample or in control. Any known method to determine the level of the biomarker may be used, such as ELISA, as long as the level of the biomarker in the biological sample and in control are measured in comparable units. Methods for determining the levels of the biomarker correspond to the type of biomarkers. Subsequently, nucleic acid biomarkers, such as DNA or RNA may be determined by any known appropriate method.

The term "control" as used herein refers to biological samples from a particular predefined group of subjects. According to some embodiments, control refers to the biological samples obtained from non-infected subjects, from infected non-symptomatic or to combination thereof. Therefore, the term "level in the control" with respect to a biomarker has the meaning of the level, e.g. amount or concentration, of the biomarker in biological samples of the predefined group of subjects, as defined above. For the purposes of diagnosing prenatal symptomatic cCMV, the control comprises samples of non-infected fetuses, infected non-symptomatic fetuses, or both.

The terms "diagnosing" and "detecting" are used herein interchangeably and mean assessing whether a subject has a specific condition, specifically whether the subject is infected by the cytomegalovirus or not, more specifically whether the subject has or expected to have a symptomatic congenital CMV. This term also refers to providing a prognosis, i.e. providing expectancy of developing the condition, i.e. whether the subject is expected to have or develop symptomatic congenital CMV. As will be understood by those skilled in the art, such an assessment is usually not intended to be correct for all (i.e. 100%) of the subjects to be identified. The term, however, requires that a statistically significant portion of subjects can be identified. The term diagnosis also refers, in some embodiments, to screening. Screening for infection, in some embodiments, can lead to earlier diagnosis in specific cases. The term refers also to detecting congenital CMV infection. The term in some embodiments refers to distinguishing between symptomatic and asymptomatic congenital CMV infection. The term encompasses assessing whether the subject has a symptomatic cCMV infection. The term also encompasses assessing whether the subject will develop a symptomatic cCMV infection. As used herein, the term "providing a prognosis" refers to providing a prediction of the probable course and outcome of the diagnosis. Thus, the term "diagnosing cCMV" have the meaning of predicting whether the subject has or will be infected by cCMV. The term "diagnosing symptomatic cCMV" have the meaning of predicting whether the subject has or will be infected by symptomatic cCMV. As stated above, the prediction is not always 100%. Thus, the term "diagnosing symptomatic cCMV" may have the meaning predicting that the subject has or will have symptomatic cCMV with a probability of above 95, about 95%, about 90%, about 85%, about 80%, about 75%, about 70%, or from 70 to 95%. According to some embodiments, the sensitivity of diagnosing symptomatic cCMV is from 85 to 99%, from 85 to 90%, from 90 to 98% or from 92 to 96%. According to some embodiments, the specificity in diagnosing symptomatic cCMV is from 85 to 99%, from 90 to 98% or from 92 to 96%. According to some embodiments, the positive predictive value (PPV) of diagnosing symptomatic cCMV is from 85 to 99%, from 90 to 98% or from 92 to 96% or from 90 to 100%. According to some embodiments, the negative predictive value of diagnosing symptomatic cCMV is from 85 to 99%, from 90 to 98% or from 92 to 96%. According to some embodiments, the specificity of diagnosing symptomatic cCMV is from 85 to 100%, from 90 to 100%, from 95 to 100% or from 94 to 99%.

The term "sensitivity", as used herein, refers to the ratio of positive samples correctly recognized as such by carrying out the assay of interest and the total number of samples examined. In other words, an assay has 100% sensitivity if all samples from infected patients give a positive result, i.e. there are no false negative results.

The term "specificity", as used herein, refers to the ratio of negative samples correctly recognized as such by carrying out the assay of interest and the total number of samples examined. In other words, an assay has 100% specificity if all samples from healthy subjects give a negative result, i.e. there are no false positive results.

The term "positive predictive value" as used herein refers to the probability of the disease being present, among those with positive diagnostic test results. The term "negative predictive value" as used herein refers to the probability that the disease was absent, among those whose diagnostic test results were negative.

According to any one of the above embodiments, the diagnosed subject is a fetus. Therefore, the present invention provides a method of prenatal diagnosis of a congenital CMV in fetus. According to some embodiments, the present invention provides a method of prenatal diagnosis of a symptomatic congenital CMV in fetus.

According to some embodiments, an increase in the level of at least one biomarker of Group A or Group G in the biological sample in comparison to its levels in the control is indicative of cCMV infection. According to some embodiments, an increase in the level of at least one biomarker of Group A or Group F in the biological sample above a particular ratio is indicative of cCMV infection. According to other embodiments, a ratio of above 1.1:1 between the level of at least one biomarker of Group A or Group F in the biological sample to its levels in the control is indicative of cCMV infection. According to other embodiments, a decrease in the level of at least one biomarker of Group B or Group G in the biological sample in comparison to its levels in the control is indicative of cCMV infection. According to other embodiments, a decrease in the level of at least one biomarker of Group B or Group G in the biological sample below a particular threshold is indicative of cCMV infection. According to yet another embodiment, a ratio of above 1.1:1 between the level of the at least one biomarker in the control to the level of at least one biomarker of Group B or Group G in the biological sample is indicative of cCMV infection. According to some embodiments, an increase in the level of at least one biomarker of Group A and a decrease in the level of at least one biomarker of Group B in the biological sample in comparison to their levels in the control is indicative of the presence of cCMV infection. According to some embodiments, an increase in the level of at least one biomarker of Group F and a decrease in the level of at least one biomarker of Group G in the biological sample in comparison to their levels in the control is indicative of the presence of cCMV infection.

The terms "indicative of cCMV", "indicative of presence of cCMV", and "indicative of existence of cCMV" are used herein interchangeably and mean that the parameter, results of the comparison, etc. indicate(s) that the subject is infected with cCMV. The term "indicative of symptomatic cCMV", "indicative of presence of symptomatic of cCMV", and "indicative of existence of symptomatic cCMV" are used herein interchangeably and mean that the parameter, results of the comparison, etc. indicate(s) that the subject is infected with cCMV and develops or expected to develop CMV symptoms.

The term "at least X" as used herein have the meaning of "X or more", in which X is a number. According to some embodiments, the method of diagnosis comprises determining the level of more than one biomarker. Thus, according to some embodiments, an increase in the levels of 2 or more biomarkers of Group A or Group F in the biological sample in comparison to their levels in the control is indicative of cCMV infection. According to other embodiments, an increase in the level of 3 or more biomarkers of Group A or Group F in the biological sample in comparison to their levels in the control is indicative of cCMV infection. According to some embodiments, a decrease in the level of 2 or more biomarkers of Group B or Group G in the biological sample in comparison to their levels in the control is indicative of cCMV infection. According to other embodiments, a decrease in the level of 3 or more biomarkers of Group B or Group G in the biological sample in comparison to their levels in the control is indicative of cCMV infection. According to some embodiments, the biomarker is selected from RARRES2, LGALS3BP, GPNMB and a combination thereof. According to some embodiments, an increase in the level of a biomarker selected from RARRES2, LGALS3BP, GPNMB and a combination thereof in comparison to their levels in the control is indicative of presence of cCMV infection in the subject. According to some embodiments, the biomarker is selected from SYNE1, ANGPTL6, GAS1, CHGB, ADAM9, and any combination thereof. According to some embodiments, an increase in the level of SYNE1 and/or a decrease in the level of ANGPTL6, GAS1, CHGB, or ADAM9 in the biological sample in comparison to their levels in the control is indicative of presence of cCMV infection in the subject.

According to some embodiments, an increase in the level of 1, 2, 3, 4, 5, 6, 7, 8, 9, or 10 of the biomarkers of Group A or Group F in comparison to their levels in the control is indicative of cCMV infection in the subject. According to another embodiment, a decrease in the level of 1, 2, 3, 4, 5, 6, 7, 8, 9, or 10 of the biomarkers of Group B or Group G in comparison to their levels in the control is indicative of cCMV infection. According to yet another embodiment, an increase in the level of 1, 2, 3, 4, 5, 6, 7, 8, 9, or 10 of the biomarkers of group A and a decrease in the level of 1, 2, 3, 4, 5, 6, 7, 8, 9, or 10 of the biomarkers of group B in comparison to their levels in the control is indicative of cCMV infection. According to yet another embodiment, an increase in the level of 1, 2, 3, 4, 5, 6, 7, 8, 9, or 10 of the biomarkers of Group F and a decrease in the level of 1, 2, 3, 4, 5, 6, 7, 8, 9, or 10 of the biomarkers of Group G in comparison to their levels in the control is indicative of cCMV infection.

According to some embodiments, a difference in the levels of the biomarker in maternal blood and in the control is indicative of a congenital CMV infection in fetus. According to other embodiments, a difference in the levels of the biomarker in amniotic fluid and in the control is indicative of a congenital CMV infection in fetus.

According to any one of the above embodiments, the control comprises samples from non-infected subjects. Thus, a level of the biomarker in the control refers to a level of the biomarker in biological samples of non-infected subjects. According to some embodiments, the subject is fetus. According to other embodiment, the subject is a pregnant woman. It is clear that the biological sample and the control refer correspond one to another. According to some embodiments, a level of the biomarker in the control refers to a level of the biomarker in amniotic fluid of non-infected fetuses.

According to any one of the above embodiments, diagnosing comprises diagnosing of a symptomatic cCMV. According to other embodiments, diagnosing of the symptomatic cCMV comprises differentiating between symptomatic and asymptomatic cCMV.

Thus, according to some embodiments, the present invention provides a method of diagnosing a symptomatic congenital cytomegalovirus (symptomatic cCMV) in a subject, wherein the method comprises (i) determining a level of at least one biomarker in a biological sample; and (ii) comparing the level of the at least one biomarker from the biological sample to its level in a control, wherein a difference in the level of the biomarker in the biological sample and in the control is indicative of presence of a symptomatic cCMV infection in the subject, wherein the at least one biomarker is selected from the biomarkers of group Group C and Group D, wherein: Group C comprises biomarkers RARRES2, LGALS3BP, GPNMB, Nesprin-1 (SYNE1), Myosin-14 (MYH14), Carboxypeptidase A2 (CPA2), Secretoglobin family 3A member 2 (SCGB3A2) and CRP, GSTT1, CPQ, FAM3D, and KRT17, GSTT1, CPQ, FAM3D, and KRT17; and Group D comprises biomarkers CPM, Platelet-derived growth factor receptor beta (PDGFRB), Angiopoietin-related protein 6 (ANGPTL6), Dermokine (DMKN), Secretogranin-1 (CHGB), ADAMS, Growth arrest-specific protein 1 (GAS1), Platelet basic protein (PPBP), Platelet glycoprotein Ib alpha chain (GP1BA), LAMP2NFASC, AKR1A1, HSPB1, MGAM, ACTA1, MSLN, SGCE, CGREF1, and ERAP1. According to some embodiments, the biomarkers are protein biomarkers. According to some embodiments, the present invention provides a method of diagnosing a symptomatic congenital cytomegalovirus (symptomatic cCMV) in a subject, wherein the method comprises (i) determining a level of at least one biomarker in a biological sample; and (ii) comparing the level of the at least one biomarker from the biological sample to its level in a control, wherein a difference in the level of the biomarker in the biological sample and in the control is indicative of presence of a symptomatic cCMV infection in the subject, wherein the at least one biomarker is selected from the biomarkers of group Group C and Group E.

According to another embodiment, the present invention provides a method of detecting the presence of a symptomatic congenital cytomegalovirus (symptomatic cCMV) in a subject, wherein the method comprises (i) determining a level of at least one biomarker in a biological sample; and (ii) comparing the level of the at least one biomarker from the biological sample to its level in a control, wherein a difference in the level of the biomarker in the biological sample and in the control is indicative of presence of a symptomatic cCMV infection, wherein the at least one biomarker is selected from the biomarkers of group Group C, Group D, and Group E. According to some embodiments, the subject is a fetus. Therefore, according to some embodiments, the diagnosis or detection is a prenatal diagnosis of detection. Thus, in some embodiments, the present invention provides a method of diagnosing a symptomatic congenital cytomegalovirus (symptomatic cCMV) in fetus, wherein the method comprises (i) determining a level of at least one biomarker in a biological sample; and (ii) comparing the level of the at least one biomarker from the biological sample to its level in a control, wherein a difference in the level of the biomarker in the biological sample and in the control is indicative of presence of a symptomatic cCMV infection in fetus, wherein the at least one biomarker is selected from the biomarkers of Group C, Group D and Group E.

According to some embodiments, the biological sample is obtained from a subject selected from a fetus, pregnant woman and neonate. According to some embodiments, the biological sample is an amniotic fluid. According to other embodiments, the biological sample is selected from amniotic fluid, fetal blood or serum, fetal blood or serum from the umbilical cord, placental biopsy, neonate blood or serum and maternal blood or serum. According to one embodiment, the biological sample is an amniotic fluid. According to some embodiments, the sample is a sample of an infected subject. According to some embodiments, the sample is a sample of an infected fetus. According to some embodiments, diagnosing the presence of CMV infection may be according to any known method, e.g. by PCR. According to one embodiment, diagnosing the presence of CMV infection is performed according to the teaching of the present invention.

The term "RARRES2" refers to human Retinoic Acid Receptor Responder 2 protein having accession number Q99969.

The term "LGALS3BP" refers to a human Galectin-3-binding protein having accession number Q08380.

The term "GPNMB" refers to a human transmembrane glycoprotein NMB having accession number Q14956.

According to some embodiments, an increase in the level of 1, 2, 3, 4, 5, 6, or 7 of the biomarkers of group C in comparison to their levels in the control is indicative of cCMV infection in the subject. According to another embodiment, a decrease in the level of 1, 2, 3, 4, 5, 6, 7, 8 or 9 of the biomarkers of group D in comparison to their levels in the control is indicative of symptomatic cCMV infection. According to yet another embodiment, an increase in the level of 1, 2, 3, 4, 5, 6, or 7 of the biomarkers of group C and a decrease in the level of 1, 2, 3, 4, 5, 6, 7, 8, or 9 of the biomarkers of group D in comparison to their levels in the control is indicative of symptomatic cCMV infection.

According to some embodiments, an increase in the level of at least one biomarker selected from SYNE1, MYH14, GPNMB, LGALS3BP, CPA2, RARRES2, SCGB3A2, CRP, GSTT1, CPQ, FAM3D, and KRT17, GSTT1, CPQ, FAM3D, and KRT17 in the biological sample in comparison to its levels in the control is indicative of a symptomatic cCMV infection. According to some embodiments, an increase in the level of at least one biomarker of Group C in the biological sample above a particular ratio is indicative of a symptomatic cCMV infection. According to other embodiments, a ratio of above 1.1:1 between the level of the at least one biomarker of Group C in the biological sample to its levels in the control is indicative of a symptomatic cCMV infection. According to some embodiments, the biological sample is an amniotic fluid.

According to other embodiments, a decrease in the level of at least one biomarker selected from CPM, PDGFRB, ANGPTL6, DMKN, CHGB, ADAM9, GAS1, PPBP, GP1BA, LAMP2, NFASC, AKR1A1, HSPB1, MGAM, ACTA1, MSLN, SGCE, CGREF1, and ERAP1 in the biological sample in comparison to its levels in the control is indicative of a symptomatic cCMV infection. According to yet other embodiments, a decrease in the level of at least one biomarker selected from GP1BA, ACTA1, AKR1A1, NFASC, CHGB, PPBP, LAMP2, MGAM, HSPB1, MSLN, SGCE, CGREF1, ERAP1 and ANGPTL6 in the biological sample in comparison to its levels in the control is indicative of a symptomatic cCMV infection. According to other embodiments, a decrease in the level of at least one biomarker of Group D or group E in the biological sample below a particular threshold is indicative of a symptomatic cCMV infection. According to yet another embodiment, a ratio of above 1.1:1 between the level of the at least one biomarker in the control to the level of the least one biomarker of Group D or group E in the biological sample is indicative of a symptomatic cCMV infection. According to another embodiment, an increase in the level of at least one biomarker of Group C and a decrease in the level of at least one biomarker of Group D or Group E in the biological sample in comparison to their levels in the control is indicative of a symptomatic cCMV infection. According to some embodiments, the biological sample is an amniotic fluid.

According to some embodiment, the present invention provides a method of diagnosing a symptomatic congenital cytomegalovirus (cCMV) infection, wherein the method comprises (i) determining a level of at least one biomarker in a biological sample; and (ii) comparing the level of the at least one biomarker from the biological sample to its level in a control, wherein a difference in the level of the biomarker in the biological sample and in the control is indicative of a symptomatic congenital CMV infection, wherein the at least one biomarker is selected from SYNE1, MYH14, GPNMB, LGALS3BP, CPA2, RARRES2, SCGB3A2, CRP, GSTT1, CPQ, FAM3D, and KRT17, CPM, PDGFRB, ANGPTL6, DMKN, CHGB, ADAM9, GAS1, PPBP, GP1BA, LAMP2, NFASC, AKR1A1, HSPB1, MGAM, ACTA1, MSLN, SGCE, CGREF1, and ERAP1. According to some embodiments, the control comprises samples from the infected non-symptomatic, non-infected subject or both. Thus, a level of the biomarker in the control refers to a level of the biomarker in biological samples of infected non-symptomatic, in the samples of non-infected subjects, or in combination thereof. According to some embodiments, the subject is a fetus. According to other embodiments, the subject is a pregnant woman. According to some embodiments, the level is an amount or a concentration of the biomarker in the sample. According to some embodiments, the biological sample is an amniotic fluid.

According to some embodiments, an increase in the level of at least one biomarker selected from SYNE1, MYH14, GPNMB, LGALS3BP, CPA2, RARRES2, SCGB3A2, CRP, GSTT1, CPQ, FAM3D, and KRT17 in the biological sample in comparison to its level in the control is indicative of a symptomatic cCMV infection. According to some embodiments, an increase of more than 1.5, 2, 2.5 or 3 folds in the level of the biological sample in comparison to its level in the control is indicative of a symptomatic cCMV infection. According to some embodiments, an increase of more than 15%, 20%, 25%, 30%, 35%, 40%, 45%, 50% 60%, 70%, 80 or 100% in the level of the biological sample in comparison to its level in the control is indicative of a symptomatic cCMV infection. According to some embodiments, an increase in the level of at least one biomarker selected from SYNE1, MYH14, GPNMB, LGALS3BP, CPA2, RARRES2, SCGB3A2, CRP, GSTT1, CPQ, FAM3D, and KRT17 in the biological sample above a particular value or threshold as defined based on the control is indicative of a symptomatic cCMV infection. According to other embodiments, a decrease in the level of at least one biomarker selected from CPM, PDGFRB, ANGPTL6, DMKN, CHGB, ADAM9, GAS1, PPBP, GP1BA, LAMP2, NFASC, AKR1A1, HSPB1, MGAM, ACTA1, MSLN, SGCE, CGREF1, and ERAP1 in the biological sample in comparison to its level in the control is indicative of a symptomatic cCMV infection. According to some embodiments, a decrease in the level of at least one biomarker selected from CPM, PDGFRB, ANGPTL6, DMKN, CHGB, ADAM9, GAS1, PPBP, GP1BA, LAMP2, NFASC, AKR1A1, HSPB1, MGAM, ACTA1, MSLN, SGCE, CGREF1, and ERAP1 more than 10%, more than 15%, more than 20% or more than 25% in the biological sample in comparison to its level in the control is indicative of a symptomatic cCMV infection. According to some embodiments, a decrease in the level of at least one biomarker selected from CPM, PDGFRB, ANGPTL6, DMKN, CHGB, ADAM9, GAS1, PPBP, GP1BA, LAMP2, NFASC, AKR1A1, HSPB1, MGAM, ACTA1, MSLN, SGCE, CGREF1, and ERAP1 in the biological sample below a particular value or threshold as defined based on the control is indicative of a symptomatic cCMV infection. According to some embodiments, a decrease in the level of at least one biomarker selected from GP1BA, ACTA1, AKR1A1, NFASC, CHGB, PPBP, LAMP2, MGAM, HSPB1, and ANGPTL6 more than 10%, more than 15%, more than 20% or more than 25% in the biological sample in comparison to its level in the control or below a particular value or threshold as defined based on the control is indicative of a symptomatic cCMV infection.

As known in the art, comparison to the level in a control may be performed by defining a particular threshold above which or below which the level of the marker is considered as indicative to cCMV, and in particular indicative to symptomatic cCMV. Thus, in some embodiments, the term "comparing the level of the at least one biomarker from the biological sample to its level in a control" and alike may be replaced by "comparing the level of the at least one biomarker to a threshold". Subsequently, the term "an increase in the level of a biomarker X in the biological sample in comparison to their levels in the control" and alike may be replaced by the term "an increase in the level of a biomarker X in the biological sample above a threshold". The term "a decrease in the level of a biomarker X in the biological sample in comparison to their levels in the control" and alike may be replaced by the term "a decrease in the level of a biomarker X in the biological sample below a threshold". As also clear, the threshold may be dependent on the method of detection of the markers and thus may vary.

According to some embodiments, the method comprises determining the level of RARRES2. According to certain embodiments, an increase in the level of RARRES2 in the biological sample in comparison to its level in the control is indicative of a symptomatic cCMV infection. According to some embodiments, an increase of more than 1.5, 2, 2.5 or 3 folds in the level of RARRES2 in the biological sample in comparison to its level in the control is indicative of a symptomatic cCMV infection. According to some embodiments, an increase of from 2 to 20 folds in the level of RARRES2 in the biological sample in comparison to its level in the control is indicative of a symptomatic cCMV infection. According to certain embodiments, an increase of from 4 to 16, 5 to 15, 8 to 12 folds is indicative of a symptomatic cCMV infection. According to some embodiment, an increase of 10% or more, 15% or more, 20% or more, 25% or more, 50% or more, 75% or more, 100%, of above 150%, above 200%, above 250%, above 300% in the level of RARRES2 in the biological sample in comparison to its level in the control is indicative of a symptomatic cCMV infection. According to some embodiments, an increase in the level of RARRES2 in the biological sample above a particular value as define based on the control is indicative of a symptomatic cCMV infection. According to some embodiments, an increase in the level of RARRES2 of 10% or more, 15% or more, 20% or more, 25% or more, 50% or more, 75% or more, 100% or more, or from 2 to 20 times above a threshold is indicative of a symptomatic cCMV infection. According to some embodiments, the threshold is 40 ng/ml of RARRES2 in amniotic fluid, as determined by the methods of the present invention. According to another embodiment, the threshold is 51 ng/ml. According to some embodiments, an increase in the level of RARRES2 in the biological sample above 30 ng/ml, above 35 ng/ml or above 40 ng/ml or above 45 ng/ml or above 50 ng/ml or above 51 ng/ml or above 55 ng/ml is indicative of a symptomatic cCMV infection. According to some embodiments, the threshold for RARRES2 in amniotic fluid is from 20 to 80 ng/ml. According to some embodiments, the threshold for RARRES2 in amniotic fluid is from 25 to 75, from 30 to 70, or from 35 to 65 ng/ml. According to some embodiments, the sensitivity of diagnosing symptomatic cCMV is from 85 to 99%, from 90 to 98% or from 92 to 96%. According to some embodiments, the specificity in diagnosing symptomatic cCMV is from 85 to 99%, from 90 to 98% or from 92 to 96%. According to some embodiments, the positive predictive value of diagnosing symptomatic cCMV is from 85 to 99%, from 90 to 98% or from 92 to 96%. According to some embodiments, the negative predictive value of diagnosing symptomatic cCMV is from 85 to 99%, from 90 to 98% or from 92 to 96%.

According to some embodiments, the method comprises determining the level of LGALS3BP. According to certain embodiments, an increase in the level of LGALS3BP in the biological sample in comparison its level to the control is indicative of a symptomatic cCMV infection. According to some embodiment, the increase in the level of LGALS3BP in the biological sample in comparison to its level in the control is indicative of a symptomatic cCMV infection. According to some embodiments, an increase in the level of LGALS3BP in the biological sample above a particular value as defined based on the control is indicative of a symptomatic cCMV infection. According to some embodiments, increase of more than 1.5, 2, 2.5 or 3 folds in the level of LGALS3BP in the biological sample in comparison to its level in the control is indicative of a symptomatic cCMV infection. According to some embodiments, an increase of from 2 to 20 folds in the level of LGALS3BP in the biological sample in comparison to its level in the control is indicative of a symptomatic cCMV infection. According to certain embodiments, an increase of from 4 to 16, 5 to 15, 8 to 12 folds is indicative of a symptomatic cCMV infection. According to some embodiment, an increase of 10% or more, 15% or more, 20% or more, 25% or more, 50% or more, 75% or more, 100%, of above 150%, above 200%, above 250%, above 300% of LGALS3BP in the biological sample in comparison to its level in the control is indicative of a symptomatic cCMV infection. According to some embodiments, an increase in the level of LGALS3BP of 10% or more, 15% or more, 20% or more, 25% or more, 50% or more, 75% or more, 100% or more, or from 2 to 20 times above a threshold is indicative of a symptomatic cCMV infection. According to some embodiments, the threshold for is 2475 ng/ml of LGALS3BP in amniotic fluid, as determined by the methods of the present invention. According to some embodiments, an increase in the level of LGALS3BP in the biological sample above 1500 ng/ml, above 2000 ng/ml or above 2200 ng/ml or above 2400 ng/ml or above 2475 ng/ml or above 2500 ng/ml or above 2700 ng/ml is indicative of a symptomatic cCMV infection. According to some embodiments, the threshold for LGALS3BP in amniotic fluid is from 1000 to 4000 ng/ml. According to some embodiments, the threshold for LGALS3BP in amniotic fluid is from 1200 to 3800 ng/ml, from 1500 to 3500 ng/ml, from 1700 to 3200 ng/ml, from 2000 to 3000 ng/ml, or from 2200 to 2800 ng/ml. According to some embodiments, the sensitivity of diagnosing symptomatic cCMV is from 85 to 99%, from 90 to 98% or from 92 to 96%. According to some embodiments, the specificity in diagnosing symptomatic cCMV is from 85 to 99%, from 90 to 98% or from 92 to 96%. According to some embodiments, the positive predictive value of diagnosing symptomatic cCMV is from 85 to 99%, from 90 to 98% or from 92 to 96%. According to some embodiments, the negative predictive value of diagnosing symptomatic cCMV is from 85 to 99%, from 90 to 98% or from 92 to 96%.

According to some embodiments, the method comprises determining the level of GPNMB. According to certain embodiments, an increase in the level of GPNMB in the biological sample in comparison to its level in the control is indicative of symptomatic cCMV. According to some embodiments, an increase of more than 1.5, 2, 2.5 or 3 folds in the level of GPNMB in the biological sample in comparison to its level in the control is indicative of a symptomatic cCMV infection. According to some embodiments, an increase of from 2 to 20 folds in the level of GPNMB in the biological sample in comparison to its level in the control is indicative of a symptomatic cCMV infection. According to certain embodiments, increase of from 4 to 16, 5 to 15, 8 to 12 folds is indicative of a symptomatic cCMV infection. According to some embodiment, an increase of 10% or more, 15% or more, 20% or more, 25% or more, 50% or more, 75% or more, above 100%, above 150%, above 200%, above 250%, above 300% of GPNMB in the biological sample in comparison to its level in the control is indicative of a symptomatic cCMV infection. According to some embodiments, an increase in the level of GPNMB of 10% or more, 15% or more, 20% or more, 25% or more, 50% or more, 75% or more, 100% or more, or from 2 to 20 times above a threshold is indicative of a symptomatic cCMV infection.

According to some embodiments, the method comprises determining the level of SYNE1. According to certain embodiments, an increase in the level of SYNE1 in the biological sample in comparison to its level in the control is indicative of symptomatic cCMV. According to some embodiments, an increase in the level of SYNE1 of 10% or more, 15% or more, 20% or more, 25% or more, 50% or more, 75% or more, 100% or more, or from 2 to 20 times above a threshold is indicative of a symptomatic cCMV infection.

According to some embodiments, the method comprises determining the level of MYH14. According to certain embodiments, an increase in the level of MYH14 in the biological sample in comparison to its level in the control is indicative of symptomatic cCMV. According to some embodiments, an increase in the level of MYH14 of 10% or more, 15% or more, 20% or more, 25% or more, 50% or more, 75% or more, 100% or more, or from 2 to 20 times above a threshold is indicative of a symptomatic cCMV infection. According to some embodiments, the method comprises determining the level of CPA2. According to certain embodiments, an increase in the level of CPA2 in the biological sample in comparison to its level in the control is indicative of symptomatic cCMV. According to some embodiments, an increase in the level of CPA2 of 10% or more, 15% or more, 20% or more, 25% or more, 50% or more, 75% or more, 100% or more, or from 2 to 20 times above a threshold is indicative of a symptomatic cCMV infection.

According to some embodiments, the method comprises determining the level of SCGB3A2. According to certain embodiments, an increase in the level of SCGB3A2 in the biological sample in comparison to its level in the control is indicative of symptomatic cCMV. According to some embodiments, an increase in the level of SCGB3A2 of 10% or more, 15% or more, 20% or more, 25% or more, 50% or more, 75% or more, 100% or more, or from 2 to 20 times above a threshold is indicative of a symptomatic cCMV infection. According to some embodiments, the method comprises determining the level of CRP. According to certain embodiments, an increase in the level of CRP in the biological sample in comparison to its level in the control is indicative of symptomatic cCMV. According to some embodiments, an increase in the level of CRP of 10% or more, 15% or more, 20% or more, 25% or more, 50% or more, 75% or more, 100% or more, or from 2 to 20 times above a threshold is indicative of a symptomatic cCMV infection.

According to some embodiments, the method comprises determining the level of GSTT1. According to certain embodiments, an increase in the level of GSTT1 in the biological sample in comparison to its level in the control is indicative of symptomatic cCMV. According to some embodiments, an increase in the level of GSTT1 of 10% or more, 15% or more, 20% or more, 25% or more, 50% or more, 75% or more, 100% or more, or from 2 to 20 times above a threshold is indicative of a symptomatic cCMV infection.

According to some embodiments, the method comprises determining the level of ANGPTL6. According to certain embodiments, a decrease in the level of ANGPTL6 in the biological sample in comparison to its level in the control is indicative of symptomatic cCMV. According to some embodiments, a decrease in the level of ANGPTL6 of 10% or more, 15% or more, 20% or more, 25% or more, 50% or more, 75% or more in comparison to a threshold is indicative of a symptomatic cCMV infection.

According to some embodiments, the method comprises determining the level of GAS1. According to certain embodiments, a decrease in the level of GAS1 in the biological sample in comparison to its level in the control is indicative of symptomatic cCMV. According to some embodiments, a decrease in the level of GAS1 of 10% or more, 15% or more, 20% or more, 25% or more, 50% or more, 75% or more in comparison to a threshold is indicative of a symptomatic cCMV infection.

According to some embodiments, the method comprises determining the level of CHGB. According to certain embodiments, a decrease in the level of CHGB in the biological sample in comparison to its level in the control is indicative of symptomatic cCMV. According to certain embodiments, a decrease in the level of CHGB in the biological sample of 10% or more, 15% or more, 20% or more, 25% or more, 50% or more, 75% or more in comparison to a threshold is indicative of symptomatic cCMV.

According to some embodiments, the method comprises determining the level of ADAM9. According to certain embodiments, a decrease in the level of ADAM9 in the biological sample in comparison to its level in the control is indicative of symptomatic cCMV. According to certain embodiments, a decrease in the level of ADAM9 in the biological sample of 10% or more, 15% or more, 20% or more, 25% or more, 50% or more, 75% or more in comparison to a threshold is indicative of symptomatic cCMV. According to some embodiments, the method comprises determining the level of GP1BA, ACTA1, AKR1A1, NFASC, PPBP, LAMP2, MGAM, MSLN, SGCE, CGREF1, ERAP1 and/or HSPB1. According to certain embodiments, a decrease in the level of GP1BA, ACTA1, AKR1A1, NFASC, PPBP, LAMP2, MGAM, MSLN, SGCE, CGREF1, ERAP1 and/or HSPB1 in the biological sample in comparison to its level in the control is indicative of symptomatic cCMV. According to certain embodiments, a decrease in the level of ADAM9 in the biological sample of 10% or more, 15% or more, 20% or more, 25% or more, 50% or more, 75% or more in comparison to a threshold is indicative of symptomatic cCMV.

According to some embodiments, the method comprises determining the level of at least two biomarkers selected from SYNE1, MYH14, GPNMB, LGALS3BP, CPA2, RARRES2, SCGB3A2, CRP, GSTT1, CPQ, FAM3D, KRT17, CPM, PDGFRB, ANGPTL6, DMKN, CHGB, ADAMS, GAS1, PPBP, GP1BA LAMP2, NFASC, AKR1A1, HSPB1, MGAM, ACTA1, MSLN, SGCE, CGREF1, and ERAP1 in the biological sample.

According to some embodiments, the method comprises determining the levels of RARRES2 and LGALS3BP. According to some embodiments, an increase in the levels of RARRES2 and of LGALS3BP in the biological sample in comparison to their levels in the control is indicative of symptomatic cCMV infection. According to some embodiments, an increase of 10% or more, 15% or more, 20% or more, 25% or more, 50% or more, 75% or more, 100% or more, or from 2 to 20 times above thresholds in the levels of RARRES2 and of LGALS3BP is indicative of a symptomatic cCMV infection. According to some embodiments, an increase in the levels of RARRES2 above 35 ng/ml, 40 ng/ml or above 50 ng/ml and an increase in the levels of LGALS3BP above 2400 ng/ml, above 2450 ng/ml or above 2475 ng/ml is indicative of a symptomatic cCMV infection. According to some embodiments, the method comprises determining the levels of RARRES2 and LGALS3BP and an increase in the levels of RARRES2 or LGALS3BP in the biological sample in comparison to their levels in the control is indicative of symptomatic cCMV infection.

According to some embodiments, the method comprises determining the levels of RARRES2, LGALS3BP and/or GPNMB. According to some embodiments, an increase in the levels of RARRES2 and of GPNMB in the biological sample in comparison to their levels in the control is indicative of a symptomatic cCMV infection. According to other embodiments, an increase in the levels of LGALS3BP and GPNMB in the biological sample in comparison to their levels in the control is indicative of a symptomatic cCMV infection According to some embodiments, an increase in the levels of RARRES2, LGALS3BP or GPNMB is indicative of symptomatic cCMV infection. According to some embodiments, an increase in the levels of RARRES2, LGALS3BP and GPNMB is indicative of symptomatic cCMV infection.

According to some embodiments, the method comprises determining levels of at least three biomarkers selected from SYNE1, MYH14, GPNMB, LGALS3BP, CPA2, RARRES2, SCGB3A2, CRP, GSTT1, CPQ, FAM3D, KRT17, CPM, PDGFRB, ANGPTL6, DMKN, CHGB, ADAM9, GAS1, PPBP, GP1BA, LAMP2, NFASC, AKR1A1, HSPB1, MGAM, ACTA1, MSLN, SGCE, CGREF1, and ERAP1 in the biological sample.

According to some embodiments, the method comprises determining the level of RARRES2, LGALS3BP and at least one biomarker selected from SYNE1, MYH14, GPNMB, CPA2, SCGB3A2, CRP, GSTT1, CPM, CPQ, FAM3D, KRT17, PDGFRB, ANGPTL6, DMKN, CHGB, ADAM9, GAS1, PPBP, GP1BA, LAMP2, NFASC, AKR1A1, HSPB1, MGAM, ACTA1, MSLN, SGCE, CGREF1, and ERAP1. According to some embodiments, an increase in the levels of RARRES2 and of LGALS3BP, and in the level of at least one biomarker selected from SYNE1, MYH14, GPNMB, CRP, GSTT1, CPA2, and SCGB3A2 in the biological sample in comparison to their levels in the control is indicative of a symptomatic cCMV infection. According to other embodiments, an increase in the levels of RARRES2 and of LGALS3BP, and a decrease in the level of at least one biomarker selected from CPM, PDGFRB, ANGPTL6, DMKN, CHGB, ADAM9, GAS1, PPBP, LAMP2, NFASC, AKR1A1, HSPB1, MGAM, ACTA1, MSLN, SGCE, CGREF1, ERAP01, and GP1BA in comparison to their levels in the control is indicative of a symptomatic cCMV infection. According to other embodiments, an increase in the levels of RARRES2 and of LGALS3BP, and a decrease in the level of at least one biomarker selected from GP1BA, ACTA1, AKR1A1, NFASC, CHGB, PPBP, LAMP2, MGAM, HSPB1, MSLN, SGCE, CGREF1, ERAP01, and ANGPTL6 in comparison to their levels in the control is indicative of a symptomatic cCMV infection. According to some embodiments, an increase in the levels of RARRES2, LGALS3BP and GPNMB in the biological sample in comparison to their levels in the control is indicative of a symptomatic cCMV infection. According to some embodiments, an increase in the levels of RARRES2, LGALS3BP and SYNE1 in the biological sample in comparison to their levels in the control is indicative of symptomatic cCMV infection. According to some embodiments, an increase in the levels of RARRES2, LGALS3BP, GPNMB and SYNE1 in the biological sample in comparison to their levels in the control is indicative of symptomatic cCMV infection.

According to some embodiments, an increase in the levels of RARRES2 and LGALS3BP and a decrease in the level of a biomarker selected from ANGPTL6, GAS1, CHGB, ADAM9 or a combination thereof in the biological sample in comparison to their levels in the control is indicative of symptomatic cCMV infection. According to some embodiments, the biological sample is amniotic fluid. According to some embodiments, an increase in the levels of RARRES2 and LGALS3BP and a decrease in the level of ADAM9 in the biological sample in comparison to their levels in the control is indicative of symptomatic cCMV infection.

According to some embodiments, an increase in the levels of RARRES2, GPNMB and LGALS3BP and a decrease in the level of a biomarker selected from ANGPTL6, GAS1, CHGB, ADAM9 or a combination thereof in the biological sample in comparison to their levels in the control is indicative of symptomatic cCMV infection. According to some embodiments, the biological sample is amniotic fluid. According to some embodiments, an increase in the levels of RARRES2, GPNMB and LGALS3BP and a decrease in the level of ADAM9 in the biological sample in comparison to their levels in the control is indicative of symptomatic cCMV infection.

Thus, according to some embodiments, an increase in the levels of at least one or at least two or at least three biomarkers selected from SYNE1, MYH14, GPNMB, LGALS3BP, CPA2, RARRES2, and SCGB3A2 in amniotic fluid in comparison to their levels in the control is indicative of a symptomatic cCMV infection in fetus. According to certain embodiments, an increase in the levels of RARRES2 and/or LGALS3BP, and optionally in the level of at least one biomarker selected from SYNE1, MYH14, GPNMB, CPA2, and SCGB3A2 in amniotic fluid in comparison to their levels in the control is indicative of a symptomatic cCMV infection in fetus.

According to some embodiment, the present invention provides method of diagnosing a symptomatic congenital cytomegalovirus (symptomatic cCMV) in a fetus, wherein the method comprises (i) determining a levels of biomarkers RARRES2, LGALS3BP or both in amniotic fluid; and (ii) comparing the levels determined in (i) to their levels in a control, wherein an increase in the level of the biomarker in the biological sample in comparison to their levels in the control is indicative of presence of a symptomatic congenital cCMV infection in fetus. According to some embodiment, the present invention provides a method of diagnosing a symptomatic congenital cytomegalovirus (symptomatic cCMV) in a fetus, wherein the method comprises (i) determining a levels of biomarkers RARRES2, LGALS3BP or both in amniotic fluid; and (ii) comparing the levels determined in (i) predefined thresholds, wherein an increase in the level of the biomarker in the biological sample in comparison to the thresholds is indicative of presence of a symptomatic congenital cCMV infection in fetus. According to some embodiment, the present invention provides a method of diagnosing a symptomatic congenital cytomegalovirus (symptomatic cCMV) in a fetus, wherein the method comprises (i) determining a levels of biomarkers RARRES2, LGALS3BP, and GPNMB in amniotic fluid; and (ii) comparing the levels determined in (i) to their levels in a control or to thresholds, wherein an increase in the level of the biomarker in the biological sample in comparison to their levels in the control or above the thresholds is indicative of presence of a symptomatic congenital cCMV infection in the fetus. According to some embodiments, the threshold for RARRES2 is from 35 to 55 ng/ml and the threshold for LGALS3BP is from 2400 to 2500 ng/ml, as determined by the methods of the present invention.

According to any one of the above embodiments, the method comprises a step of detecting whether the fetus is infected with cCMV prior to detecting whether the cCMV is symptomatic or asymptomatic.

It is clear that different methods and assays may result in different values and equivalents of the thresholds. Nevertheless, these values can be easily correlated with the values obtained by the methods used in the present invention and therefore any such values and equivalents are encompassed by the present invention as well.

According to any one of the above embodiments, the method further comprises diagnosing whether the subject, e.g. the fetus is infected with CMV. According to some embodiments, the method comprises measuring a viral load of CMV as known in the art in the biological sample, e.g. in an amniotic fluid.

According to any one of the above embodiments, the method further comprises a step of obtaining the biological sample. According to some embodiments, the step of obtaining the biological sample is effected before determining the level of at least one biomarker. According to some embodiments, the biological sample is obtained by any known method. According to some embodiments, amniotic fluid is collected via amniocentesis. According to some embodiments, the biological sample is further processed before determining the level of at least one biomarker, such as purification and dilutions.

According to any one of the above embodiments, the diagnosis is made before week 21 of pregnancy. According to some embodiments, the diagnosis is performed before week 24 of pregnancy. According to some embodiments, the diagnosis is made at week 12, 13, 14, 15, 16, 17, 18, 19 or week 20 of pregnancy. According to any one of the above embodiments, the diagnosis is made at or before week 36 of pregnancy.

According to any one of the above embodiments, the biological sample is obtained before week 21 of pregnancy. According to some embodiments, the biological sample is obtained before week 24 of pregnancy. According to some embodiments, the biological sample is obtained at week 12, 13, 14, 15, 16, 17, 18, 19 or week 20 of pregnancy. According to any one of the above embodiments, the biological sample is obtained at or before week 36 of pregnancy. According to other embodiments, the biological sample is obtained at week 12 to 36 of pregnancy. According to some embodiments, the biological sample is an amniotic fluid. Thus, according to some embodiments, the amniotic fluid is obtained at week 15, 16, 17 or 18 of the pregnancy. According to some embodiments, the amniotic fluid is obtained before week 24 of pregnancy. According to certain embodiments, the sample is fetal blood or serum. According to a further embodiment, the biological sample is maternal blood or serum. According to certain embodiments, the difference in the level of the at least one biomarker in the maternal blood or serum in comparison to the control is indicative of the presence of cCMV such as symptomatic cCMV infection in fetus. As such, according to some embodiments, the diagnosis is performed on or before week 36 of pregnancy. According to some embodiments, the diagnosis is made between week 12 to 36 of pregnancy.

According to any one of the above embodiments, the biomarker is a protein biomarker.

According to the teaching of the present invention, any known method may be used for the determination of the level of the at least one biomarker. According to some embodiments, the biomarker is a protein biomarker and any method for determining the level of proteins or peptides may be used. According to some embodiment, the method comprises use of an enzyme-linked immunosorbent assay (ELISA), luminex assay, or any other immune-detection assay. According to other embodiment, the method comprises use of a mass spectroscopy. According to some embodiments, the methods are chromatography methods.

According to some embodiments, an increase in the level of at least one biomarker selected from SYNE1, MYH14, GPNMB, LGALS3BP, CPA2, RARRES2, SCGB3A2 CRP, GSTT1, CPQ, FAM3D, and KRT17 in the biological sample in comparison to its levels in the control is indicative of a symptomatic cCMV infection. According to other embodiments, a decrease in the level of at least one biomarker selected from CPM, PDGFRB, ANGPTL6, DMKN, CHGB, ADAMS, GAS1, PPBP, GP1BA LAMP2, NFASC, AKR1A1, HSPB1, MGAM, ACTA1, MSLN, SGCE, CGREF1, and ERAP1 in the biological sample in comparison to their levels in the control is indicative of a symptomatic cCMV infection. According to another embodiment, an increase in the level of at least one biomarker of Group C and a decrease in the level of at least one biomarker of Group D or Group E in the biological sample in comparison to their levels in control is indicative of a symptomatic cCMV infection. According to some embodiments, an increase in levels of 2, 3, 4, 5, 6, or 7 biomarkers selected from SYNE1, MYH14, GPNMB, LGALS3BP, CPA2, RARRES2, SCGB3A2, CRP, GSTT1, CPQ, FAM3D, and KRT17 and/or a decrease in levels of 2, 3, 4, 5, 6, 7, 8 or 9 biomarkers selected from CPM, PDGFRB, ANGPTL6, DMKN, CHGB, ADAMS, GAS1, PPBP, GP1BA, LAMP2, NFASC, AKR1A1, HSPB1, MGAM, ACTA1, MSLN, SGCE, CGREF1, and ERAP1 in the biological sample in comparison to their levels in control is indicative of a symptomatic cCMV infection. According to some embodiments, increase in levels of a biomarker selected from RARRES2, LGALS3BP and the combination thereof in the biological sample in comparison to their levels in control is indicative of a symptomatic cCMV infection. According to some embodiments, the biological sample is amniotic fluid. According to one embodiment, the amniotic fluid is obtained between weeks 12 to 36, or between weeks 14 to week 24 of pregnancy According to some embodiments, the level of the biomarkers is determined by immunoassay method. According to any one of the above embodiments, the biomarker is a protein biomarker.

According to some embodiments, the present invention provides a method of providing an indication useful in distinguishing between subjects infected with cCMV and uninfected, comprising (i) determining the level of at least one biomarker in a biological sample; and (ii) comparing the level of the at least one biomarker from the sample to its level in a control, wherein a difference in the levels of the biomarker in the biological sample and in the control provides an indication useful in distinguishing between infected and uninfected subjects, wherein at least one biomarker is selected from a biomarker of Group A and Group B. According to some embodiments, the subject is a fetus. According to some embodiments, the biological sample is amniotic fluid.

According to some embodiments, the present invention provides a method of providing an indication useful in distinguishing between subjects having a symptomatic cCMV and asymptomatic cCMV subjects, comprising (i) determining a level of at least one biomarker in a biological sample; and (ii) comparing the level of the at least one biomarker from the sample to its level in a control, wherein a difference in the level of the biomarker in the biological sample and in the control provides an indication useful in distinguishing between symptomatic and asymptomatic cCMV or uninfected subjects, wherein at least one biomarker is selected from a biomarker of Group C and Group D or E. According to some embodiments, the subject is a fetus. According to some embodiments, the biological sample is amniotic fluid.

According to some embodiments, the present invention provides a method or diagnosing an asymptomatic cCMV infection in a subject, such as fetus. Typically the presence of infection in fetus may be carried out by the methods of the present invention or by any known method. Once it is identified than the fetus has CMV infection, it is possible according to the teaching of the present invention to diagnose whether the subject has a symptomatic or asymptomatic CMV. In case the fetus is infected but is not diagnosed as having a symptomatic CMV, said fetus is identified/diagnosed as having asymptomatic CMV. In such a case a preventive treatment may be administered or adjusted. Thus, according to some embodiments, the present invention provides a method of diagnosing an asymptomatic cCMV infection in a fetus comprising (i) diagnosing whether the fetus is infected with cCMV and (ii) diagnosing whether the fetus has a symptomatic cCMV according to the methods of the present invention. In case the fetus is infected with cCMV but is not diagnosed as having symptomatic cCMV said fetus is diagnosed as having an asymptomatic cCMV. Any method for diagnosing whether the fetus is infected with cCMV can be used. Examples of such methods is as defined by the methods of the present invention or determining viral load e.g. by PCR. Therefore, according to some embodiments, the present invention provides a method of diagnosing an asymptomatic cCMV infection in fetus comprising (i) determining a level of at least one biomarker in a biological sample of an infected subject; and (ii) comparing the level of the at least one biomarker from the biological sample to its level in a control, wherein a lack of statistically significant difference in the level of the biomarker in the biological sample and in the control is indicative of presence of asymptomatic cCMV infection in the fetus, wherein the at least one biomarker is selected from the biomarkers of Group C and Group D. According to some embodiments, the present invention provides a method of diagnosing an asymptomatic cCMV infection in the infected fetus comprising (i) determining a level of at least one biomarker in the biological sample; and (ii) comparing the level of the at least one biomarker from the biological sample to its level in a control, wherein a lack of statistically significant difference in the level of the biomarker in the biological sample and in the control is indicative of presence of asymptomatic cCMV infection in the fetus, wherein the at least one biomarker is selected from the biomarkers of Group C and Group D and the biological sample is an amniotic fluid. According to some embodiments, the method comprises determining whether the fetus is infected with CMV prior to determining whether the CMV is symptomatic or asymptomatic. According to another aspect, the present invention provides a method for recommending a medical intervention, the method comprises detecting whether a subject has a congenital cytomegalovirus according to the methods of the present invention and recommending the medical intervention based on the obtained results. Any terms and definition according to the previous aspects and embodiment are valid and implemented in this aspect as well. Thus, according to some embodiments, the present invention provides a method of diagnosing and recommending a medical intervention, wherein the method comprises (i) determining a level of at least one biomarker in a biological sample; (ii) comparing the level of the at least one biomarker from the biological sample to its level in a control, wherein a difference in the level of the biomarker in the biological sample and in the control is indicative of a congenital CMV infection; and (iii) providing a recommendation of a medical intervention based on the obtained results, wherein the biomarker is selected from CTSB, SIRPB1, LGALS3BP, AGRN, VCAM1, COTL1, CDSL, ATPSB, KRT6A, SECTM1, FABP3, S100A6, SH3BGRL, ISG15, CRTAC1, RARRES2, BST2, B2M, EPYC, DKK1, HLA-C, CPQ, GPNMB, LAMA5, CA3, DES, MEGF8, GALNT7, FAT4, LPHN2, AFM, MASP1, SOD3, GALNT2, LSR, HGF, PRG2, QSOX1, ERVMER34-1, PAPPA2, GOT1, RDX, IGFBP5, AHNAK, ADAM9, LAMP2, CPM, SBSN, CAST, SPINKS, TNMD, CDH15, KLKB1, PRSS8, COL3A1, COL1A2, SYNE1, MYH14, GPNMB, LGALS3BP, CPA2, RARRES2, SCGB3A2, CPM, PDGFRB, ANGPTL6, DMKN, CHGB, ADAM9, GAS1, PPBP, GP1BA, CHIT1; TMED7; PRSS23; MGAT5; AOC1, IGSF1, CRP, GSTT1, CPQ, FAM3D, KRT17, LAMP2, NFASC, AKR1A1, HSPB1, MGAM, ACTA1, MSLN, SGCE, CGREF1, ERAP01 and any combination thereof. According to some embodiment, the present invention provides a method of recommending a medical intervention, wherein the method comprises (i) determining a level of at least one biomarker in a biological sample; (ii) comparing the level of the at least one biomarker from the biological sample to its level in a control, wherein a difference in the level of the biomarker in the biological sample and in the control is indicative of a congenital CMV infection; and (iii) providing a recommendation of a medical intervention based on the obtained results, wherein the biomarker is selected from CTSB, SIRPB1, LGALS3BP, AGRN, VCAM1, COTL1, CDSL, ATPSB, KRT6A, SECTM1, FABP3, S100A6, SH3BGRL, ISG15, CRTAC1, RARRES2, BST2, B2M, EPYC, DKK1, HLA-C, CPQ, F5, GPNMB, LAMA5, CA3, DES, MEGF8, GALNT7, FAT4, LPHN2, AFM, MASP1, SOD3, GALNT2, LSR, HGF, PRG2, QSOX1, ERVMER34-1, PAPPA2, GOT1, RDX, IGFBP5, AHNAK, ADAM9, LAMP2, CPM, SBSN, CAST, SPINKS, TNMD, CDH15, KLKB1, PRSS8, COL3A1, COL1A2, SYNE1, MYH14, GPNMB, LGALS3BP, CPA2, RARRES2, SCGB3A2, CPM, PDGFRB, ANGPTL6, DMKN, CHGB, ADAM9, GAS1, PPBP, and GP1BA, CHIT1; TMED7; PRSS23; MGAT5; AOC1, IGSF1, CRP, GSTT1, CPQ, FAM3D, and KRT17, LAMP2, NFASC, AKR1A1, HSPB1, MGAM, ACTA1, MSLN, SGCE, CGREF1, ERAP01 and any combination thereof. According to some embodiments, the cCMV is a symptomatic cCMV. Thus, according to some embodiments, the present invention provides a method of recommending a medical intervention, wherein the method comprises (i) determining a level of at least one biomarker in a biological sample; (ii) comparing the level of the at least one biomarker from the biological sample to its level in a control, wherein a difference in the level of the biomarker in the biological sample and in the control is indicative of a congenital CMV infection; and (iii) providing a recommendation of a medical intervention based on the obtained results, wherein the biomarker is selected from biomarkers of Group C, and Group D or E.

According to some embodiments, the present invention provides a method for recommending a medical intervention comprising detecting whether a fetus has a symptomatic congenital cytomegalovirus (cCMV) and providing recommendation of a medical intervention, wherein detecting a symptomatic congenital cytomegalovirus comprises (i) determining a level of at least one biomarker in a biological sample; and (ii) comparing the level of the at least one biomarker from the biological sample to its level in a control, wherein a difference in the level of the biomarker in the biological sample and in the control is indicative of presence of the symptomatic cCMV infection, wherein the at least one biomarker is selected from RARRES2, LGALS3BP, GPNMB, Nesprin-1 (SYNE1), Myosin-14 (MYH14), Carboxypeptidase A2 (CPA2), Secretoglobin family 3A member 2 (SCGB3A2) C-reactive protein (CRP), Glutathione S-transferase theta-1 (GSTT1), Carboxypeptidase Q Protein (CPQ); (Family with sequence similarity 3 member D) FAM3D; Keratin 17 (KRT17); Angiopoietin-related protein 6 (ANGPTL6), CPM, Platelet-derived growth factor receptor beta (PDGFRB), Dermokine (DMKN), Secretogranin-1 (CHGB), ADAM9, Growth arrest-specific protein 1 (GAS1), Platelet basic protein (PPBP), Platelet glycoprotein Ib alpha chain (GP1BA), Lysosome-associated membrane glycoprotein 2 (LAMP2), Neurofascin (NFASC), Alcohol dehydrogenase [NADP(+)] (AKR1A1), Heat shock protein beta-1 (HSPB1), Maltase-glucoamylase (MGAM), Actin alpha 1, skeletal muscle (ACTA1), Mesothelin (MSLN); Sarcoglycan epsilon (SGCE); Cell growth regulator with EF hand domain protein 1 (CGREF1); and Endoplasmic reticulum aminopeptidase 1 (ERAP1),
wherein the biomarkers RARRES2, LGALS3BP, GPNMB, SYNE1, MYH14, CPA2, SCGB3A2, CRP, GSTT1, CPQ, FAM3D, and KRT17 are collectively referred to as biomarkers of Group C and biomarkers ANGPTL6, CPM, PDGFRB, DMKN, CHGB, ADAM9, GAS1, PPBP, GP1BA, LAMP2, NFASC, AKR1A1, HSPB1, MGAM, AACTA1, MSLN, SGCE, CGREF1, and ERAP1 are collectively referred to as biomarkers of Group D.

According to some embodiments, the present invention provides a method for recommending a medical intervention comprising detecting whether a fetus has a symptomatic or asymptomatic congenital cytomegalovirus and providing recommendation of a medical intervention accordingly, wherein determining a symptomatic and asymptomatic cCMV comprises (i) determining a level of at least one biomarker in a biological sample; and (ii) comparing the level of the at least one biomarker from the biological sample to its level in a control, wherein a difference in the level of the biomarker in the biological sample and in the control is indicative of presence of the symptomatic cCMV infection, wherein the at least one biomarker is selected from the biomarkers of Group C and Group D, wherein:

Group C comprises biomarkers RARRES2, LGALS3BP, GPNMB, Nesprin-1 (SYNE1), Myosin-14 (MYH14), Carboxypeptidase A2 (CPA2), and Secretoglobin family 3A member 2 (SCGB3A2) C-reactive protein (CRP), Glutathione S-transferase theta-1 (GSTT1); Carboxypeptidase Q Protein (CPQ); (Family with sequence similarity 3 member D) FAM3D; Keratin 17 (KRT17); and Group D comprises biomarkers CPM, Platelet-derived growth factor receptor beta (PDGFRB), Angiopoietin-related protein 6 (ANGPTL6), Dermokine (DMKN), Secretogranin-1 (CHGB), ADAM9, Growth arrest-specific protein 1 (GAS1), Platelet basic protein (PPBP), and Platelet glycoprotein Ib alpha chain (GP1BA), Lysosome-associated membrane glycoprotein 2 (LAMP2), Neurofascin (NFASC), Alcohol dehydrogenase [NADP(+)] (AKR1A1), Heat shock protein beta-1 (HSPB1), Maltase-glucoamylase (MGAM), LAMP2, Actin alpha 1, skeletal muscle (ACTA1), Mesothelin (MSLN); Sarcoglycan epsilon (SGCE); Cell growth regulator with EF hand domain protein 1 (CGREF1); and Endoplasmic reticulum aminopeptidase 1 (ERAP1). According to some embodiments, the cCMV is an asymptomatic CMV. Thus, according to some embodiments, the present invention provides a method of recommending a medical intervention, wherein the method comprises (i) detecting whether the fetus has an asymptomatic CMV according to any one of the above aspects and embodiments and (ii) providing a recommendation of a medical intervention based on the obtained results. According to some embodiments, the intervention comprises monitoring. According to some embodiments, the cCMV is a symptomatic CMV. Thus, according to some embodiments, the present invention provides a method of recommending a medical intervention, wherein the method comprises (i) detecting whether the fetus has a symptomatic CMV according to any one of the above aspects and embodiments and (ii) providing a recommendation of a medical intervention based on the obtained results. According to some embodiments, an increase in the level of at least one biomarker selected from SYNE1, MYH14, GPNMB, LGALS3BP, CPA2, RARRES2, CRP, GSTT1, CPQ, FAM3D, and KRT17 and SCGB3A2 in the biological sample in comparison to its levels in the control is indicative of a symptomatic cCMV infection. According to other embodiments, a decrease in the level of at least one biomarker selected from CPM, PDGFRB, ANGPTL6, DMKN, CHGB, ADAM9, GAS1, PPBP, LAMP2, NFASC, AKR1A1, HSPB1, MGAM, ACTA, MSLN, SGCE, CGREF1, and ERAP01GP1BA in the biological sample in comparison to their levels in the control is indicative of a symptomatic cCMV infection. According to other embodiments, a decrease in the level of at least one biomarker selected from GP1BA, ACTA1, AKR1A1, NFASC, CHGB, PPBP, LAMP2, MGAM, HSPB1, ANGPTL6, MSLN, SGCE, CGREF1, and ERAP01 in the biological sample in comparison to their levels in the control is indicative of a symptomatic cCMV infection. According to another embodiment, an increase in the level of at least one biomarker of Group C and decrease in the level of at least one biomarker of Group D or E in the biological sample in comparison to their levels in control is indicative of a symptomatic cCMV infection. According to some embodiments, an increase in levels of 2, 3, 4, 5, 6 or 7 biomarkers selected from SYNE1, MYH14, GPNMB, LGALS3BP, CPA2, RARRES2, CRP, CPQ, FAM3D, and KRT17SCGB3A2 and/or a decrease in levels of 2, 3, 4, 5, 6, 7, 8 or 9 biomarkers selected from CPM, PDGFRB, ANGPTL6, DMKN, CHGB, ADAM9, GAS1, PPBP, GP1BA LAMP2, NFASC, AKR1A1, HSPB1, MGAM, ACTA1, MSLN, SGCE, CGREF1, and ERAP1 in the biological sample in comparison to their levels in control is indicative of a symptomatic cCMV infection. According to some embodiments, an increase in levels of 2, 3, 4, 5, 6 or 7 biomarkers selected from SYNE1, MYH14, GPNMB, LGALS3BP, CPA2, RARRES2, CRP, GSTT1, CPQ, FAM3D, KRT17, and SCGB3A2 and/or a decrease in levels of 2, 3, 4, 5, 6, 7, 8 or 9 biomarkers selected from GP1BA, ACTA1, AKR1A1, NFASC, CHGB, PPBP, LAMP2, MGAM, HSPB1, MSLN, SGCE, CGREF1, ERAP01 and ANGPTL6 in the biological sample in comparison to their levels in control is indicative of a symptomatic cCMV infection. According to some embodiments, an increase in levels of RARRES2 and LGALS3BP in the biological sample in comparison to their levels in control is indicative of a symptomatic cCMV infection. According to some embodiments, the biological sample is amniotic fluid. According to one embodiment, the amniotic fluid is obtained between week 12 to week 36 or between week 14 to week 24 of pregnancy. According to some embodiments, the method further comprises a step of obtaining the biological sample. According to some embodiments, the step of obtaining the biological sample is effected before determining the level of at least one biomarker.

According to some embodiments, the medical intervention is selected from a treatment of cCMV, cessation of treatment of cCMV, adjusting treatment, watchful waiting, monitoring or recommendation to terminate the pregnancy. According to some embodiments, the treatment is pregnancy termination. According to some embodiments, the term "adjusting treatment" contemplates cessation of treatment or changing the administered dose or changing the treatment. According to some embodiments, the medical intervention comprises treatment and/or monitoring of a symptomatic cCMV. According to some embodiments, the medical intervention comprises treatment and/or monitoring of an asymptomatic cCMV.

According to some embodiments, the present invention provides a method of providing a medical intervention in case of presence of symptomatic cCMV in fetus comprising detecting whether a fetus has a symptomatic cCMV by the methods of the present invention and treating the symptomatic cCMV, wherein medical intervention comprises treatment using an anti-CMV compound or pregnancy termination. According to some embodiments, the present invention provides providing a medical intervention in case of presence of symptomatic cCMV in fetus comprising: (I) detecting whether a fetus has a symptomatic cCMV by (i) determining a level of at least one biomarker in a biological sample; (ii) comparing the level of the at least one biomarker from the biological sample to its level in a control, wherein a difference in the level of the biomarker in the biological sample and in the control is indicative of a congenital CMV infection, and wherein the biomarker is selected from biomarkers of Group C, and Group D or E; and (II) based on the result of (I) providing a medical intervention comprising treating cCMV or pregnancy termination. According to some embodiments, the method comprises determining whether the fetus is infected with CMV prior to determining symptomatic cCMV.

According to some embodiments, the treatment of cCMV comprises treatment using an anti-CMV compound selected from an antiviral drug and antibodies against CMV. According to one embodiment, the antiviral drug is valacyclovir or letermovir. According to some embodiment, the treatment comprises administering to the mother the anti-CMV compound. According to other embodiments, the treatment comprises administering the fetus the anti-CMV compound.

According to some embodiments, the present invention provides a method of providing a medical intervention in case of presence of asymptomatic cCMV in fetus comprising detecting whether a fetus has an asymptomatic cCMV by the methods of the present invention and treating the symptomatic cCMV, wherein medical intervention comprises treatment using an anti-CMV compound. According to some embodiments, the present invention provides providing a medical intervention in case of presence of asymptomatic cCMV in fetus comprising (I) determining whether the fetus in infected with CMV, (II) detecting whether a fetus has a symptomatic cCMV by (i) determining a level of at least one biomarker in a biological sample; (ii) comparing the level of the at least one biomarker from the biological sample to its level in a control, wherein a difference in the level of the biomarker in the biological sample and in the control is indicative of a congenital CMV infection, and wherein the biomarker is selected from biomarkers of Group C and Group D, and (III) based on the result of (I) and (II) providing a medical intervention comprising treating cCMV or cessation of treatment of the cCMV. Determining whether the fetus is infected by CMV may be performed by the methods of the present invention or by any other methods such as determining the viral load of CMV by e.g. PCR.

The terms "treating", "therapy" or "treatment" a condition or patient refers to taking steps to obtain beneficial or desired results, including clinical results. Beneficial or desired clinical results include, but are not limited to, or ameliorating abrogating, substantially inhibiting, slowing or reversing the progression of a disease, condition or disorder, substantially ameliorating or alleviating clinical or esthetical symptoms of a condition, substantially preventing the appearance of clinical or esthetical symptoms of a disease, condition, or disorder, and protecting from harmful or annoying symptoms. Treating further refers to accomplishing one or more of the following: (a) reducing the severity of the disorder; (b) limiting development of symptoms characteristic of the disorder(s) being treated; (c) limiting worsening of symptoms characteristic of the disorder(s) being treated; (d) limiting recurrence of the disorder(s) in patients that have previously had the disorder(s); and/or (e) limiting recurrence of symptoms in patients that were previously asymptomatic for the disorder(s).

The term "administering" or "administration of" a substance, a compound or an agent to a subject can be carried out using one of a variety of methods known to those skilled in the art. For example, a compound or an agent can be administered intrauterinally, intra umbilical cord, intravenously, arterially, intradermally, intramuscularly, intraperitonealy, intravenously, subcutaneously, ocularly, sublingually, orally (by ingestion), intranasally (by inhalation), intraspinally, intracerebrally, and transdermally (by absorption, e.g., through a skin duct). A compound or agent can also appropriately be introduced by rechargeable or biodegradable polymeric devices or other devices, e.g., patches and pumps, or formulations, which provide for the extended, slow or controlled release of the compound or agent. Administering can also be performed, for example, once, a plurality of times, and/or over one or more extended periods. According to some embodiments, the composition is administered 1, 2, 3, 4, 5 or 6 times a day. According to other embodiments, the composition is administered 1, 2, 3, 4, 5 or 6 times a month. In some embodiments, the administration includes both direct administration, including self-administration, and indirect administration, including the act of prescribing a drug. For example, as used herein, a physician who instructs a patient to self-administer a drug, or to have the drug administered by another and/or who provides a patient with a prescription for a drug is administering the drug to the patient.

According to another aspect, the present invention provides a method of treating a symptomatic or asymptomatic congenital cytomegalovirus in a fetus comprising diagnosing the symptomatic or asymptomatic cCMV in fetus according to the methods of the present invention and administering to the fetus or to the mother an anti-CMV active agent.

According to another aspect, the present invention provides a method of determining the efficacy of the prevention or treatment of a symptomatic or asymptomatic congenital cytomegalovirus (cCMV) infection, the method comprises the steps of: (i) determining a level of at least one biomarker in a biological sample, wherein the at least one biomarker is selected from a biomarker of Group C and Group D; and (ii) comparing the level of the at least one biomarker from the biological sample to the level of the biomarker in a corresponding biological sample obtained from the same subject at an earlier sampling and/or to the level of the biomarker in the control, wherein a change in the level of the biomarkers in two consecutive measurements is indicative of efficacy of the prevention or therapy of the symptomatic or asymptomatic cCMV.

According some embodiments, the present invention provides a method of determining efficacy of prevention of a congenital cytomegalovirus (cCMV) infection or disease, the method comprising the steps of: (i) determining the level of at least one biomarker in a biological sample, wherein the at least one biomarker is selected from a biomarker of Group A, Group B, Group C or Group D; and (ii) comparing the level of the at least one biomarker from the biological sample to the level of the biomarker in the control, wherein the efficacy of the prevention is evaluated according to the change or lack of change in the level(s) of the biomarker(s). Any terms and definitions according to previous aspects and embodiment are valid and implemented in this aspect as well. According to some embodiments, the method comprises administering a pharmaceutical composition configured to prevent cCMV, such as an antiviral compound.

According to another embodiment, the present invention provides a method of determining the efficacy of therapy of a congenital cytomegalovirus (cCMV) infection or disease, the method comprising the steps of: (i) determining the level of at least one biomarker in a biological sample, wherein the at least one biomarker is selected from a biomarker of Group A, Group B, Group C or Group D; and (ii) comparing the level of the at least one biomarker from the biological sample to the level of the biomarker in a corresponding biological sample obtained from the same subject at an earlier sampling or to the level of the biomarker in the control, wherein the efficacy of the therapy is evaluated according to the change or lack of change in the level(s) of the biomarker(s). Any terms and definition according to previous aspects and embodiment are valid and implemented in this aspect as well. According to some embodiments, the method comprises a step of treating the cCMV before determining the efficacy of the therapy such as by administering an antiviral compound or drug.

According to one embodiment, the present invention provides a method of determining efficacy of prevention of a symptomatic cCMV infection or disease, the method comprising the steps of: (i) determining the level of at least one biomarker in a biological sample, wherein the at least one biomarker is selected from a biomarker of Group C or Group D; and (ii) comparing the level of the at least one biomarker from the biological sample to the level of the biomarker in the control or in a corresponding biological sample obtained from the same subject at an earlier sampling, wherein the efficacy of the prevention is evaluated according to the change or lack of change in the level(s) of the biomarker(s). According to some embodiments, the method comprises administering a pharmaceutical composition configured to prevent cCMV, such as an antiviral compound.

According to another embodiment, the present invention provides a method of determining the efficacy of therapy of a symptomatic cCMV, the method comprising the steps of: (i) determining the level of at least one biomarker in a biological sample, wherein the at least one biomarker is selected from a biomarker of Group C or Group D or Group E; and (ii) comparing the level of the at least one biomarker from the biological sample to the level of the biomarker in a corresponding biological sample obtained from the same subject at an earlier sampling or to the level of the biomarker in the control, wherein the efficacy of the therapy is evaluated according to the change or lack of change in the level(s) of the biomarker(s) between subsequently obtained biological samples. According to some embodiments, the method comprises a step of treating the cCMV before determining the efficacy of the therapy such as by administering an antiviral compound or drug.

According to one embodiment, the present invention provides a method of determining efficacy of prevention of an asymptomatic cCMV infection or disease, the method comprising the steps of: (i) determining the level of at least one biomarker in a biological sample, wherein the at least one biomarker is selected from a biomarker of Group C, Group D or Group E; and (ii) comparing the level of the at least one biomarker from the biological sample to the level of the biomarker in a corresponding biological sample obtained from the same subject at an earlier sampling or to its level in the control, wherein the efficacy of the prevention is evaluated according to the change or lack of change in the level(s) of the biomarker(s). According to some embodiments, the method comprises administering a pharmaceutical composition configured to prevent symptomatic cCMV, such as an antiviral compound.

As used herein, the term "preventing" when used in relation to a condition, refers to administration of a composition which reduces the frequency of, or delays the onset of, symptoms of the medical condition in a subject relative to a subject which does not receive the composition.

According to some embodiments, decreasing the difference between the level(s) of the biomarker(s) in the biological sample and its/their level in a control corresponds to effective treatment. According to some embodiments, cessation of the increase of the difference between the level(s) of the biomarker(s) in the biological sample and its/their level in a control corresponds to effective treatment.

According to another aspect, the present invention provides a method of classifying a sample as a sample of a subject infected with CMV or not, and if infected, as having symptomatic or asymptomatic congenital cytomegalovirus (cCMV), the method comprising (i) determining the level of at least one biomarker in a biological sample; and (ii) comparing the level of the at least one biomarker from the biological sample to its level in a control, wherein a difference in the level of the biomarker in the biological sample and in the control is indicative of presence of CMV infection and symptomatic cCMV infection. The at least one biomarker is selected from RARRES2, LGALS3BP, GPNMB, Nesprin-1 (SYNE1), Myosin-14 (MYH14), Carboxypeptidase A2 (CPA2), Secretoglobin family 3A member 2 (SCGB3A2) C-reactive protein (CRP), Glutathione S-transferase theta-1 (GSTT1), Carboxypeptidase Q Protein (CPQ); FAM3D (Family with sequence similarity 3 member D); Keratin 17 (KRT17); Angiopoietin-related protein 6 (ANGPTL6), CPM, Platelet-derived growth factor receptor beta (PDGFRB), Dermokine (DMKN), Secretogranin-1 (CHGB), ADAM9, Growth arrest-specific protein 1 (GAS1), Platelet basic protein (PPBP), Platelet glycoprotein Ib alpha chain (GP1BA), Lysosome-associated membrane glycoprotein 2 (LAMP2), Neurofascin (NFASC), Alcohol dehydrogenase [NADP(+)] (AKR1A1), Heat shock protein beta-1 (HSPB1), Maltase-glucoamylase (MGAM), Actin alpha 1, skeletal muscle (ACTA1), Mesothelin (MSLN); Sarcoglycan epsilon (SGCE); Cell growth regulator with EF hand domain protein 1 (CGREF1); and Endoplasmic reticulum aminopeptidase 1 (ERAP1), wherein the biomarkers RARRES2, LGALS3BP, GPNMB, SYNE1, MYH14, CPA2, SCGB3A2, CRP, GSTT1, CPQ, FAM3D, and KRT17 are collectively referred to as biomarkers of Group C and biomarkers ANGPTL6, CPM, PDGFRB, DMKN, CHGB, ADAM9, GAS1, PPBP, GP1BA, LAMP2, NFASC, AKR1A1, HSPB1, MGAM, AACTA1, MSLN, SGCE, CGREF1, and ERAP1 are collectively referred to as biomarkers of Group D.

In some embodiments the method of classifying comprises determining the level of at least two biomarkers, or three biomarkers, or up to the thirty-one biomarkers defined in groups C and D in a biological sample. Any combination of the biomarkers of groups C and D may be used for the classification method provided herein.

According to some embodiments, the sample is a biological sample.

According to another aspect, the present invention provides a kit comprising means for determining a level of at least one biomarker in a biological sample, and instructions for use, wherein the biomarker is selected from CTSB, SIRPB1, LGALS3BP, AGRN, VCAM1, COTL1, CDSL, ATPSB, KRT6A, SECTM1, FABP3, S100A6, SH3BGRL, ISG15, CRTAC1, RARRES2, BST2, B2M, EPYC, DKK1, HLA-C, CPQ, F5, GPNMB, LAMAS, CA3, DES, MEGF8, GALNT7, FAT4, LPHN2, AFM, MASP1, SOD3, GALNT2, LSR, HGF, PRG2, QSOX1, ERVMER34-1, PAPPA2, GOT1, RDX, IGFBP5, AHNAK, ADAM9, LAMP2, CPM, SBSN, CAST, SPINKS, TNMD, CDH15, KLKB1, PRSS8, COL3A1, COL1A2, SYNE1, MYH14, GPNMB, LGALS3BP, CPA2, RARRES2, SCGB3A2, CPM, PDGFRB, ANGPTL6, DMKN, CHGB, ADAM9, GAS1, PPBP, GP1BA, CHIT1; TMED7; PRSS23; MGAT5; AOC1, IGSF1, CRP, GSTT1, CPQ, FAM3D, KRT17, LAMP2, NFASC, AKR1A1, HSPB1, MGAM, ACTA1 and any combination thereof. According to another embodiment, the kit comprises means for determining a level of at least one biomarker in a biological sample, and instructions for use, wherein the biomarker is selected from SYNE1, MYH14, GPNMB, LGALS3BP, CPA2, RARRES2, SCGB3A2, CRP, GSTT1, CPM, PDGFRB, ANGPTL6, DMKN, CHGB, ADAM9, GAS1, PPBP, LAMP2, NFASC, AKR1A1, HSPB1, MGAM, ACTA, GP1BA, MSLN, SGCE, CGREF1, ERAP01 and any combination thereof. According to some embodiments, the kit comprises means for comparing the level of the biomarker in the biological sample to its level in a control. According to some embodiments, the kit comprises means for comparing the level of the biomarker in the biological sample to its level in another biological sample. According to some embodiments, the kit comprises means for comparing the level of the biomarker in the biological sample to a predefined threshold.

According to some embodiments, the kit is an assay kit. According to any one of the above embodiments, the kit is a diagnostic kit.

According to some embodiments, the instructions comprise instructions for diagnosing a congenital cytomegalovirus (cCMV) infection. According to some embodiments, the instructions comprise instructions for diagnosing a symptomatic congenital cytomegalovirus (cCMV) infection. According to some embodiments, the instructions comprise levels of the at least one biomarker in the control. According to some embodiments, the instructions comprise instructions of comparing the levels in the biological sample to the levels in the control or in another biological sample. According to some embodiments, the instructions comprise instructions of comparing the levels of the biomarkers in the biological sample to a predefined threshold. According to some embodiments, the kit comprises means for determining the levels of the at least one biomarker in the control or in another biological sample. According to a further embodiment, the instructions comprise means to differentiate between symptomatic and asymptomatic infected subjects. According to some embodiments, the cCMV is a symptomatic cCMV. According to some embodiments, the means for determining the level of at least one biomarker comprises an agent specific for determining the level of the at least one biomarker. According to certain embodiments, the agent is an antibody capable of binding to the at least one biomarker or a combination of antibodies. According to some embodiments, the antibodies are selected from monoclonal antibodies, secondary antibody capable of binding an antibody specific to the at least one biomarker, tagged antibody such as fluorescently tagged, and any combination thereof.

According to some embodiments, the means for determining the level of at least one biomarker in a biological sample is an immunoassay kit. According to some embodiments, the means is ELISA kit. According to some embodiments, the means are means for performing ELISA. According to some embodiments, the means are means for performing immunoassay test. Thus, according to some embodiments, the present invention provides a kit comprising at least one ELISA kit for determining the level of at least one biomarker in a biological sample, and instructions for use, wherein the biomarker is selected from a biomarker of Group A, Group B, Group C and Group D. Thus, according to some embodiments, the present invention provides a kit comprising at least one ELISA kit for determining the level of at least one biomarker in a biological sample, and instructions for use, wherein the biomarker is selected from a biomarker of Group C, Group D and Group E.

According to other embodiments, the means is any method capable of determining levels of a plurality of biomarkers, such as Luminex.

According to some embodiments, the present invention provides a kit comprising means for determining a level of at least one biomarker from biomarkers of Group C, D and E in a biological sample, and instructions for use in diagnosis symptomatic congenital CMV infection. According to one embodiment, the present invention provides a kit comprising means for determining the levels of 2, 3, 4, 5, 6, 7 or 8 said biomarkers. According to some embodiments, the present invention provides a kit comprising means for determining a level of at least one biomarker from biomarkers of Group C, D, and E in a biological sample, and instructions for use in diagnosis asymptomatic congenital CMV infection wherein the instructions to diagnose asymptomatic CMV comprise instructions to detect whether the subject is infected with CMV and negating that the subject has a symptomatic CMV. According to some embodiments, the kit of the present invention comprises means for determining the level of RARRES2 in the biological sample. According to other embodiments, the kit of the present invention comprises means for determining the level of LGALS3BP. According to one embodiment, the kit of the present invention comprises means for determining the levels of RARRES2 and LGALS3BP. According to some embodiments, the kit comprises means for determining the level of GPNMB. According to some embodiments, the kit comprises means for determining the levels of RARRES2 and GPNMB or LGALS3BP and GPNMB. According to one embodiment, the kit of the present invention comprises means for determining the levels of RARRES2, LGALS3BP and GPNMB. According to some embodiments, the kit comprises means for determining the level of SYNE1. According to some embodiments, the kit comprises means for determining the level of ANGPTL6. According to some embodiments, the kit comprises means for determining the level of GAS1. According to some embodiments, the kit comprises means for determining the level of CHGB. According to some embodiments, the kit comprises means for determining the level of ADAM9. According to some embodiments, the kit of the present invention further comprises means for determining a level of at least one biomarker selected from SYNE1, MYH14, GPNMB, CPA2, SCGB3A2, CRP, GSTT1, CPM, CPQ, FAM3D, KRT17, PDGFRB, ANGPTL6, DMKN, CHGB, ADAM9, GAS1, PPBP, LAMP2, NFASC, AKR1A1, HSPB1, MGAM, ACTA1, MSLN, SGCE, CGREF1, ERAP01 and GP1BA. Thus, according to some embodiments, the kit of the present invention comprises means for determining levels of RARRES2 and LGALS3BP and further comprises means for determining a level of at least one biomarker selected from SYNE1, MYH14, GPNMB, CRP, GSTT1, CPA2, SCGB3A2, CPM, CPQ, FAM3D, KRT17, PDGFRB, ANGPTL6, DMKN, CHGB, ADAM9, GAS1, PPBP, LAMP2, NFASC, AKR1A1, HSPB1, MGAM, ACTA1, MSLN, SGCE, CGREF1, ERAP01 and GP1BA. According to some embodiments, the means is ELISA kit. Thus, according to some embodiments, the present invention provides a kit comprising at least one ELISA kit for determining the level of at least one biomarker in a biological sample, and instructions for use, wherein the biomarker is selected from RARRES2, LGALS3BP and a combination thereof. According to other embodiments, the kit of the present invention further comprises ELISA kit for determining the level at least one biomarker selected from SYNE1, MYH14, GPNMB, CPA2, SCGB3A2 CRP, GSTT1, CPQ, FAM3D, and KRT17 in the biological sample. According to any one of the above embodiments, the kit comprises any other means to determine the levels of a plurality of biomarkers, instead of ELISA kit.

According to any one of the above embodiments, the kit further comprises reference levels of the biomarkers as in the control or means to determine the reference levels of the biomarkers or numerical values of the levels of the biomarker in the control or the threshold value of the biomarker above or below which the subject is diagnosed as having a cCMV and/or having a symptomatic cCMV. The terms "reference level" and "threshold" are used herein interchangeably and refer to a level of the biomarker in the control above which or below which or in comparison to which a subject is diagnosed according to the teaching of the present invention, i.e. having cCMV infection and/or having a symptomatic cCMV infection.

According to some embodiments, the kit further comprises means for processing the biological sample. According to some embodiments, the processing the biological sample comprises any procedure to allow measurement or improve measurement of the levels of the biomarkers, such as purification, dilution, concentration, separation of biomarkers etc.

According to some embodiment, the kit is for use in diagnosing a congenital CMV infection. According to some embodiments, the cCMV is a symptomatic CMV, thus the kit is for use in diagnosing or detecting a symptomatic congenital CMV infection. According to other embodiments, the cCMV is an asymptomatic CMV, thus the kit is for use in diagnosing or detecting an asymptomatic congenital CMV infection.

According to some embodiment, the present invention provides a use of a kit comprising means for determining the level of at least one biomarker in a biological sample, in the diagnosis of a congenital CMV, wherein the at least one biomarker is selected from a biomarker of Group A, Group B, Group C, Group D and Group E. According to some embodiments, the cCMV is a symptomatic cCMV. According to some embodiments, the at least one biomarker is selected from a biomarker of Group C, Group D and Group E. According to a further embodiment, the instructions comprise means to differentiate between symptomatic and asymptomatic infected subjects.

According to some embodiments, the present invention provides a use of a kit comprising means for determining the level of at least one biomarker in a biological sample, in diagnosis of a symptomatic congenital CMV, wherein the at least one biomarker is selected from a biomarker of Group C and Group D and Group E.

According to some embodiments, the present invention provides a use of a kit for diagnosing symptomatic cCMV, wherein the kit comprises means for determining levels of RARRES2 and/or LGALS3BP in a biological sample. According to yet another embodiment, the kit further comprises means for determining the levels of at least one biomarker selected from SYNE1, MYH14, GPNMB, CPA2, SCGB3A2, CRP, GSTT1, CPQ, FAM3D, and KRT17 CPM, PDGFRB, ANGPTL6, DMKN, CHGB, ADAMS, GAS1, PPBP, LAMP2, NFASC, AKR1A1, HSPB1, MGAM, ACTA1, MSLN, SGCE, CGREF1, ERAP01, and GP1BA. According to yet another embodiment, the means for determining the level of at least one biomarker in a biological sample is ELISA.

The terms "comprising", "comprise(s)", "include(s)", "having", "has" and "contain(s)," are used herein interchangeably and have the meaning of "consisting at least in part of". When interpreting each statement in this specification that includes the term "comprising", features other than that or those prefaced by the term may also be present. Related terms such as "comprise" and "comprises" are to be interpreted in the same manner. The terms "have", "has", "having" and "comprising" may also encompass the meaning of "consisting of" and "consisting essentially of", and may be substituted by these terms. The term "consisting of" excludes any component, step or procedure not specifically delineated or listed. The term "consisting essentially of" means that the composition or component may include additional ingredients, but only if the additional ingredients do not materially alter the basic and novel characteristics of the claimed compositions or methods.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Having now generally described the invention, the same will be more readily understood through reference to the following examples, which are provided by way of illustration and are not intended to be limiting of the present invention.

EXAMPLES

Example 1

Methods

Amniotic fluid samples were obtained from women with primary CMV infection at 21-23 weeks' gestation as part of the routine diagnosis of fetal infection.

We analyzed the proteome of 24 amniotic fluid samples: 14 CMV-positive samples and 10 CMV-negative samples. Of the CMV-positive samples, 8 were samples of asymptomatic fetuses (who were born as asymptomatic neonates and remained asymptomatic for at least one year after birth), and 6 were of CMV-positive symptomatic fetuses who were terminated in view of severe cerebral lesions. At a later stage, the validation cohort was extended to include 21 symptomatic and 28 asymptomatic samples and 15 CMV-negative samples. All samples were analyzed in parallel to avoid assay-to-assay variations.

Sample Preparation

The samples (150 microliters) were loaded onto a specific column for serum depletion, followed by an in-solution tryptic digestion and a desalting step.

Liquid Chromatography Mass Spectrometry

The resulting peptides were analyzed using nanoflow liquid chromatography (nanoAcquity) coupled to high resolution, high mass accuracy mass spectrometry (Q Exactive HFX). Each sample was analyzed on the instrument separately in a random order in discovery mode.

Data Processing

Raw data was processed with MaxQuant v1.6.0.16. The data was searched with the Andromeda search engine against the human and HCMV proteome databases appended with common lab protein contaminants and the following modifications: Carbamidomethylation of C as a fixed modification and oxidation of M, deamidation of N and Q and protein N-terminal acetylation as variable ones.

The LFQ (Label-Free Quantification) intensities were extracted and used for further calculations using Perseus v1.6.0.7. Decoy hits were filtered out, as well as proteins that were identified on the basis of a modified peptide only and GO annotations added. The LFQ intensities were log transformed and only proteins that had at least 7 valid values in at least one experimental group were kept. The remaining missing values were imputed.

Validation assays and panels:

We have validated the proteome findings using specific protein ELISA assays.

We have validated the RARRES2 (chemerin) and LGALS3BP proteome analysis in amniotic fluid samples using a RARRES2 and LGALS3BP protein ELISA assays. The assays used were: Quantikine ELISA assays for Human Galectin-3BP/MAC-2BP Immunoassay and Quantikine ELISA Human Chemerin Immunoassay (R&D systems).

Results

In total, we identified and quantified 1066 proteins in the fluid samples. All proteins were of human origin. We obtained qualitative and quantitative data for each identified protein, along with the relevant relative intensity comparisons between samples. The fold change for each comparison was calculated based on the protein LFQ intensity for each experiment. We grouped the samples into: Uninfected, sick (symptomatic) and not sick (infected asymptomatic)—to compare between all 3 (ANOVA) and the pairs, and p-values for the Infected—sick (symptomatic) to infected—not sick (asymptomatic) comparison were calculated.

Comparison of the amniotic fluid proteins content of the discovery cohort led to the identification of proteins that were differentially excreted between CMV-positive and CMV-negative cases.

Comparison of the amniotic fluid proteins content of the discovery cohort led to the identification of proteins that were differentially excreted between CMV-positive (infected) and CMV-negative (not infected) cases (FIG. 1) and Table 1.

TABLE 1

Proteins that were differentially excreted between CMV-positive (infected) and CMV-negative (not infected) subjects.

| Increased | | Decreased | |
| --- | --- | --- | --- |
| Gene names | Protein names | Gene names | Protein names |
| CTSB | Cathepsin B | MEGF8 | Multiple epidermal growth factor-like domains protein 8 |
| SIRPB1 | Signal-regulatory protein beta-1 | GALNT7 | N-acetyl-galactosaminyl-transferase 7 |

TABLE 1-continued

Proteins that were differentially excreted between CMV-positive (infected) and CMV-negative (not infected) subjects.

| Increased | | Decreased | |
|---|---|---|---|
| Gene names | Protein names | Gene names | Protein names |
| LGALS3BP | Galectin-3-binding protein | FAT4 | Protocadherin Fat 4 |
| AGRN | Agrin | LPHN2 | Latrophilin-2 |
| VCAM1 | Vascular cell adhesion protein 1 | AFM | Afamin |
| COTL1 | Coactosin-like protein | MASP1 | Mannan-binding lectin serine protease 1 |
| CD5L | CD5 antigen-like | SOD3 | Extracellular superoxide dismutase [Cu—Zn] |
| ATP5B | ATP synthase subunit beta, mitochondrial | GALNT2 | Polypeptide N-acetyl-galactosaminyl-transferase 2 |
| KRT6A | Keratin, type II cytoskeletal 6A | LSR | Lipolysis-stimulated lipoprotein receptor |
| SECTM1 | Secreted and transmembrane protein 1 | HGF | Hepatocyte growth factor |
| FABP3 | Fatty acid-binding protein, heart | PRG2 | Bone marrow proteoglycan |
| S100A6 | Calcyclin | QSOX1 | Sulfhydryl oxidase 1 |
| SH3BGRL | SH3 domain-binding glutamic acid-rich-like protein | ERVMER34-1 | Endogenous retrovirus group MER34 member 1 Env polyprotein |
| ISG15 | Interferon-stimulated gene 15 | PAPPA2 | Pappalysin-2 |
| CRTAC1 | Cartilage acidic protein 1 | GOT1 | Aspartate aminotransferase, cytoplasmic |
| RARRES2 | Retinoic acid receptor responder protein 2 | RDX | Radixin |
| BST2 | Bone marrow stromal antigen 2 | IGFBP5 | Insulin-like growth factor-binding protein 5 |
| B2M | Beta-2-microglobulin | AHNAK | Desmoyokin |
| EPYC | Epiphycan | ADAM9 | Disintegrin and metalloproteinase domain-containing protein 9 |
| DKK1 | Dickkopf-related protein 1 | LAMP2 | Lysosome-associated membrane glycoprotein 2 |
| HLA-C | Major Histocompatibility Complex, Class I, C | CPM | Carboxypeptidase M |
| CPQ | Carboxypeptidase Q | SBSN | Suprabasin |
| F5 | Coagulation factor V | CAST | Calpastatin |
| GPNMB | Transmembrane glycoprotein NMB | SPINK5 | Serine protease inhibitor Kazal-type 5 |
| LAMA5 | Laminin subunit alpha-5 | TNMD | Tenomodulin |
| CA3 | Carbonic anhydrase 3 | CDH15 | Cadherin-15 |
| DES | Desmin | KLKB1 | Plasma kallikrein |
| | | PRSS8 | Prostasin |
| | | COL3A1 | Collagen alpha-1(III) chain |
| | | COL1A2 | Collagen alpha-2(I) chain |

Figure 2A:
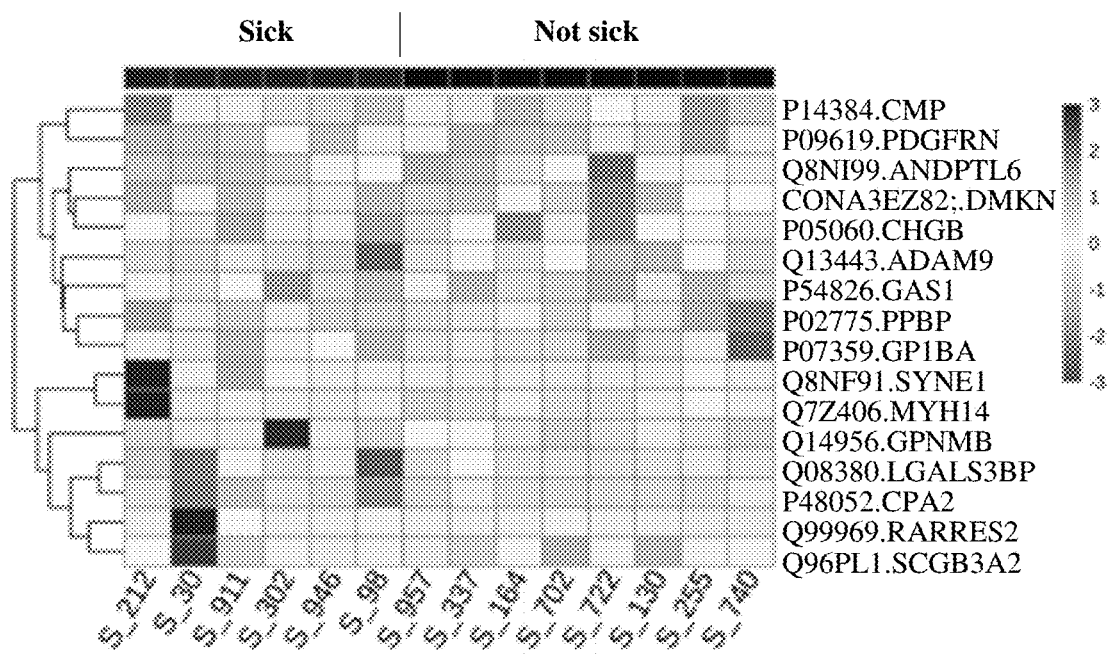
FIG. 2A shows a heatmap showing amniotic fluid proteins differing between severely symptomatic (sick) and asymptomatic (not sick).
Figure 2B:
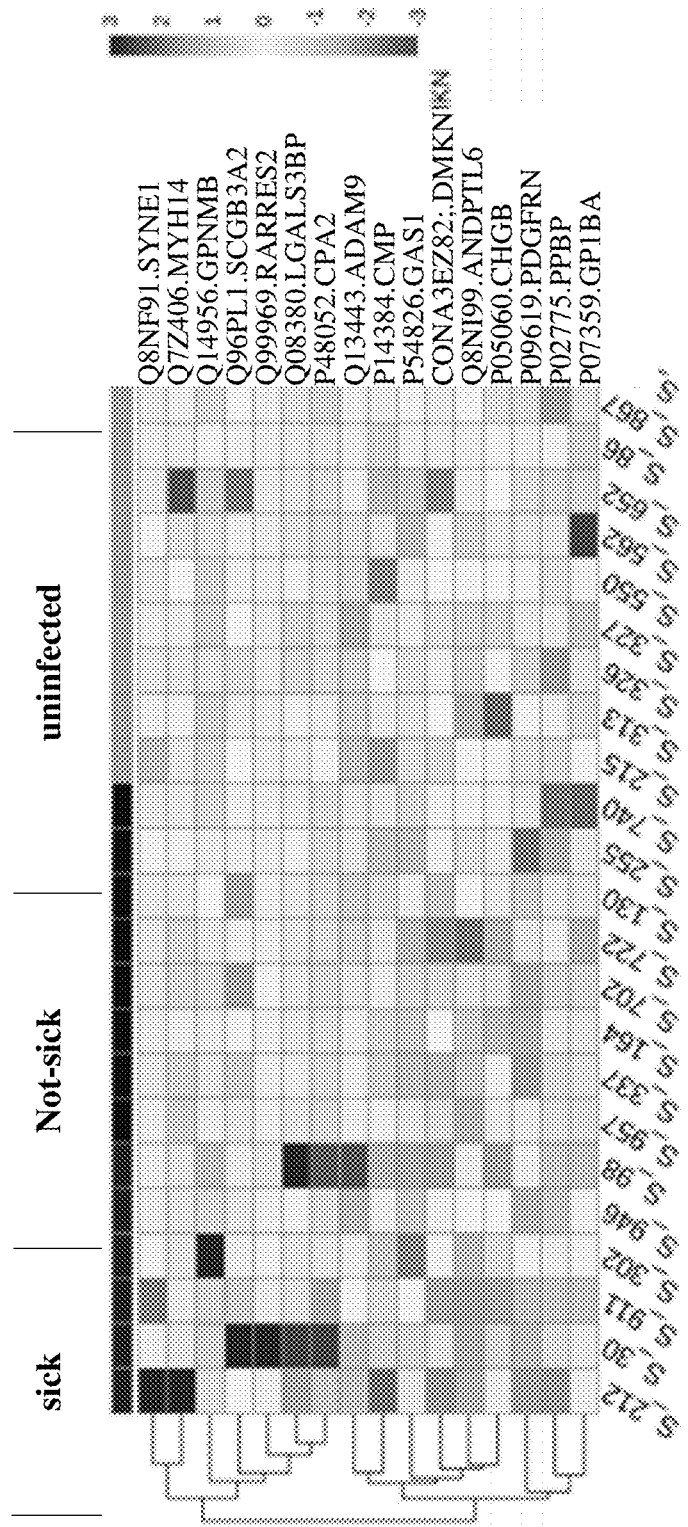
FIG. 2B shows a heatmap showing the same set of proteins shown in FIG. 2A in severely symptomatic (sick) asymptomatic (not sick) and CMV-negative amniotic fluid samples. Heatmaps were drawn using normalized values, after scaling per protein over all drawn samples.

Importantly, we identified a set of proteins which demonstrated a clearly distinct abundance between symptomatic and asymptomatic cases in the amniotic fluid samples of 14 fetuses infected with CMV (FIG. 2A). In fact, the secretion pattern of these identified proteins in infected asymptomatic fetuses appeared to resemble the pattern observed CMV-negative samples (FIG. 2B and Table 2), further supporting their potential role in disease discrimination.

TABLE 2

Proteins that were differentially excreted between symptomatic CMV (infected) and asymptomatic (infected) CMV

| Increased | | Decreased | |
|---|---|---|---|
| Protein names | Gene names | Protein names | Gene names |
| SYNE1 | Nesprin-1 | CPM | Carboxypeptidase M |
| MYH14 | Myosin-14 | PDGFRB | Platelet-derived growth factor receptor beta |
| GPNMB | Transmembrane glycoprotein NMB | ANGPTL6 | Angiopoietin-related protein 6 |
| LGALS3BP | Galectin-3-binding protein | DMKN | Dermokine |
| CPA2 | Carboxypeptidase A2 | CHGB | Secretogranin-1 |
| RARRES2 | Retinoic acid receptor responder protein 2 | ADAM9 | Disintegrin and metalloproteinase domain-containing protein 9 |
| SCGB3A2 | Secretoglobin family 3A member 2 | GAS1 | Growth arrest-specific protein 1 |
| | | PPBP | Platelet basic protein |
| | | GP1BA | Platelet glycoprotein Ib alpha chain |

Figure 3A:
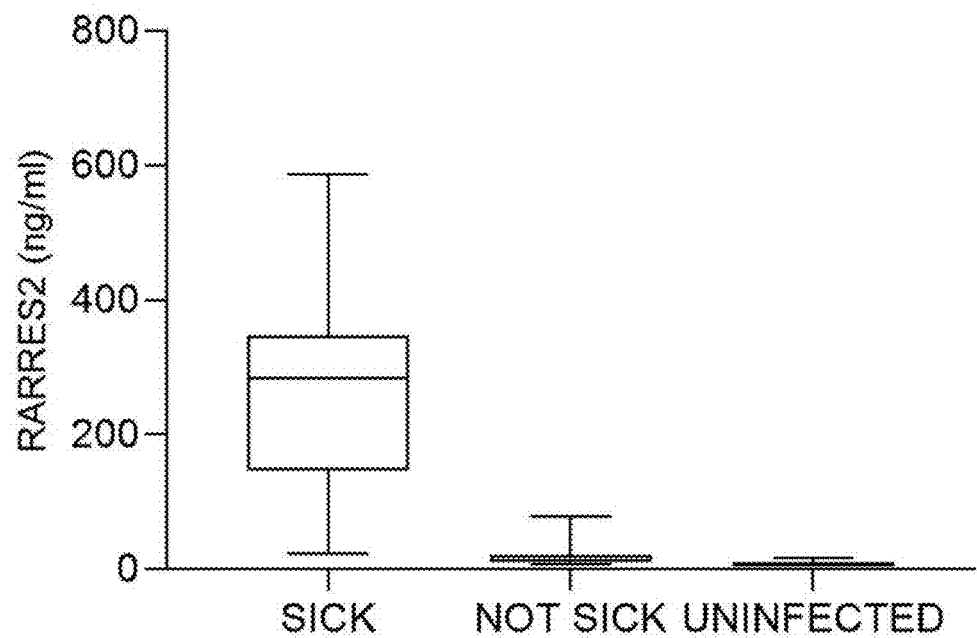
FIG. 3A shows the distribution and median values of RARRES2 protein concentrations, as measured by ELISA immunoassay, in amniotic fluid samples from symptomatic (sick), asymptomatic (not sick), and CMV-negative (uninfected) cCMV cases. Individual amniotic fluid RARRES2 concentration values are shown in FIG. 3B shows RARRES2 protein concentrations, as measured by ELISA, in individual amniotic fluid samples from symptomatic (sick; black), asymptomatic (not sick; grey), and CMV-negative (uninfected; white) cases. Samples which had been pre-analyzed by proteome analysis (the discovery panel) are indicated by + sign.
Figure 3B:
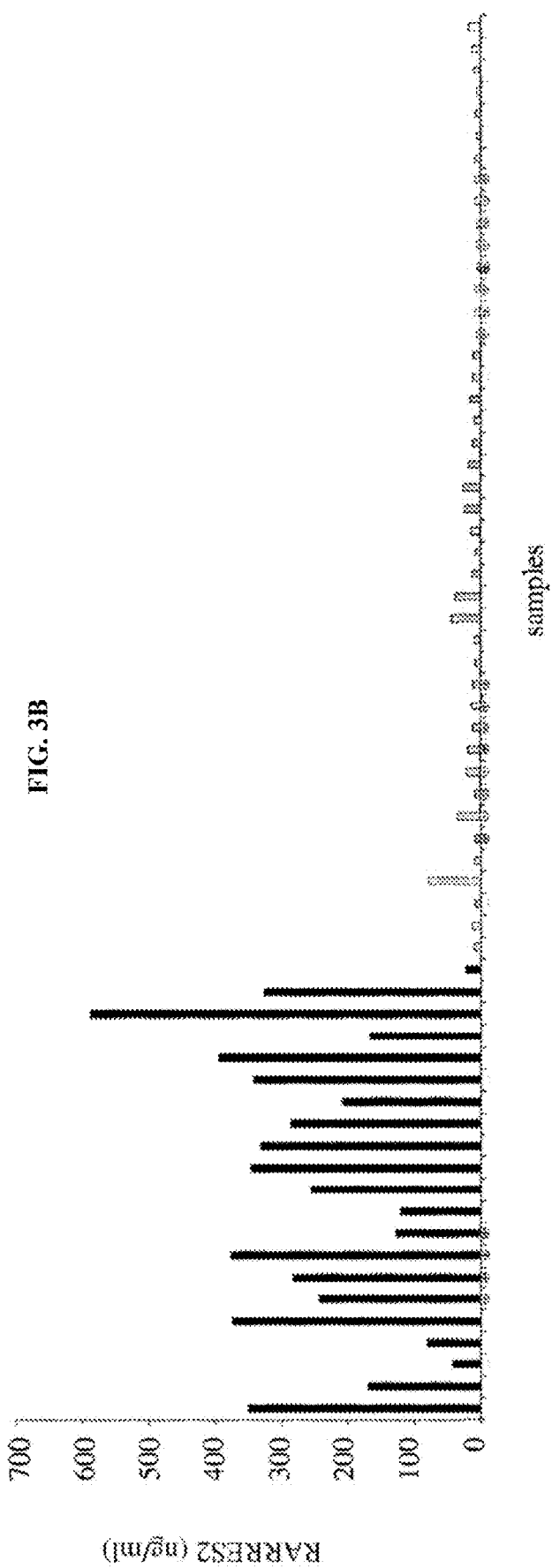

One of the promising markers is RARRES2 protein. First, we have measured the RARRES2 concentrations in the 31 available amniotic fluid samples (14 symptomatic and 17 asymptomatic cases). This assay confirmed the significant differences between the concentrations of RARRES2 in amniotic fluid samples of symptomatic versus asymptomatic cCMV cases. We have further expanded the validation cohort to include additional amniotic fluid samples from the two categories (symptomatic/asymptomatic) to yield a total of 21 symptomatic and 28 asymptomatic cases. This validation cohort of 49 samples from CMV-infected fetuses included 22 external blinded-samples (obtained from Italy) from the 2 categories (10 symptomatic and 12 asymptomatic). The results are presented in FIG. 3.

The combined assay results (performed for a total of 20 symptomatic and 29 asymptomatic cases) confirmed the significant differences between the concentrations of RARRES2 in amniotic fluid samples of symptomatic versus asymptomatic cCMV cases ($p<0.001$; Mann-Whitney test and student T-test), and allowed for the definition of cutoff concentration values for reliable prenatal disease prediction: (for example, sensitivity of 95.2% or 90.5%, specificity of 92.9% or 96.4%, positive predictive value of 90.9% or 95.0%, and negative predictive value of 96.3% or 93.1% for cutoff concentrations of 40 ng/ml or 51 ng/ml, respectively).

We have also validated the LGALS3BP (Galectin-3-binding protein) proteome analysis in amniotic fluid samples using a LGALS3BP protein ELISA assay.

Figure 4A:
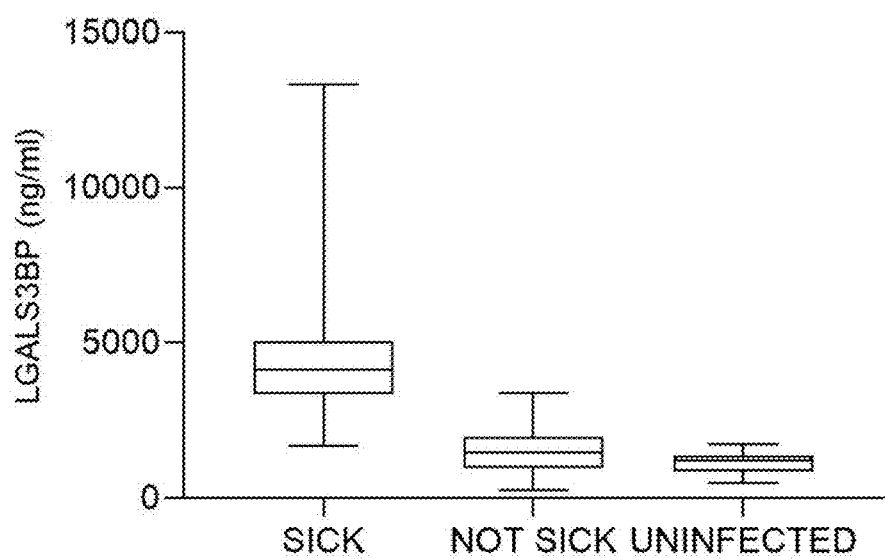
FIG. 4A shows the distribution and median values of LGALS3BP protein concentrations, as measured by ELISA, in amniotic fluid samples from symptomatic (sick), asymptomatic (not sick), and CMV-negative (uninfected) cCMV cases.
Figure 4B:
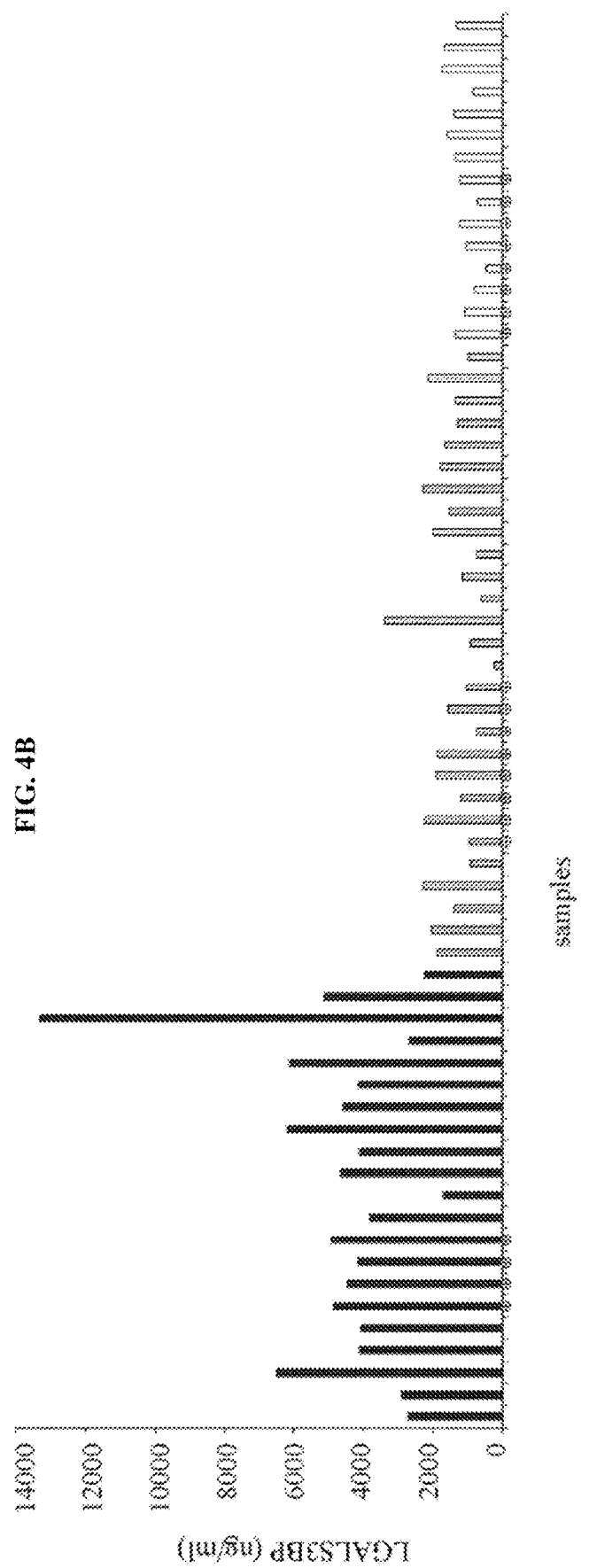
FIG. 4B shows LGALS3BP protein concentrations, as measured by ELISA, shown in individual amniotic fluid samples from symptomatic (sick; black), asymptomatic (not sick; grey), and CMV-negative (uninfected; white) cases. Samples which had been pre-analyzed by proteome analysis (the discovery panel) are indicated by "+" sign.

To this end, first we have measured the LGALS3BP concentrations in the 12 available amniotic fluid samples from the discovery panel (the same samples that had been subjected to proteome analysis: 4 amniotic fluid samples of symptomatic cCMV, 8 amniotic fluid samples of asymptomatic cCMV, and 8 amniotic fluid samples of uninfected fetuses). This assay confirmed the significant differences between the concentrations of LGALS3BP in amniotic fluid samples of symptomatic versus asymptomatic cCMV cases. We have further expanded the validation cohort to include additional amniotic fluid samples from the two categories (symptomatic/asymptomatic) to yield a total of 21 symptomatic and 28 asymptomatic cases. This validation cohort of 49 samples from CMV-infected fetuses included 22 external blinded-samples (obtained from Italy) from the 2 categories (10 symptomatic and 12 asymptomatic). The results are presented in FIG. 4.

The combined assay results (performed for a total of 20 symptomatic and 29 asymptomatic cases) confirmed the significant differences between the concentrations of LGALS3BP in amniotic fluid samples of symptomatic versus asymptomatic cCMV cases (p<0.001; Mann-Whitney test and student T-test), and allowed for the definition of cutoff concentration values for reliable prenatal disease prediction: (for example, sensitivity of 90.5%, specificity of 96.4%, positive predictive value of 95.0%, and negative predictive value of 93.1% for a cutoff concentration of 2475 ng/ml).

Conclusions

Our findings identify novel protein-based biomarkers that allow reliable prenatal discrimination between CMV-infected and uninfected and between moderate-to-severely symptomatic and asymptomatic fetuses and neonates with cCMV infection, and can therefore serve to identify fetuses at risk for cCMV disease. Specifically it was shown that detecting the concentration of RARRES2 above 40 ng/ml in amniotic fluid allows diagnosing a symptomatic cCMV with sensitivity of 95.2%, specificity of 92.9%, positive predictive value of 90.9%, and negative predictive value of 96.3% %. In additional it was shown that detection of LGALS3BP in amniotic fluid above 2475 ng/ml and allowed for reliable prenatal disease prediction with sensitivity of 90.5%, specificity of 96.4%, positive predictive value of 95.0%, and negative predictive value of 93.1%. It is clear that use of both these markers allows even higher levels of specificity and sensitivity. These biomarkers assays would be valuable in prenatal counseling and clinical studies in the setting of intrauterine CMV infection. The findings could also provide new insights into the pathogenesis of cCMV disease, and lead to the development of new therapeutic interventions.

New Example

Example 2

Study Design and Patient Population

Figure 5:
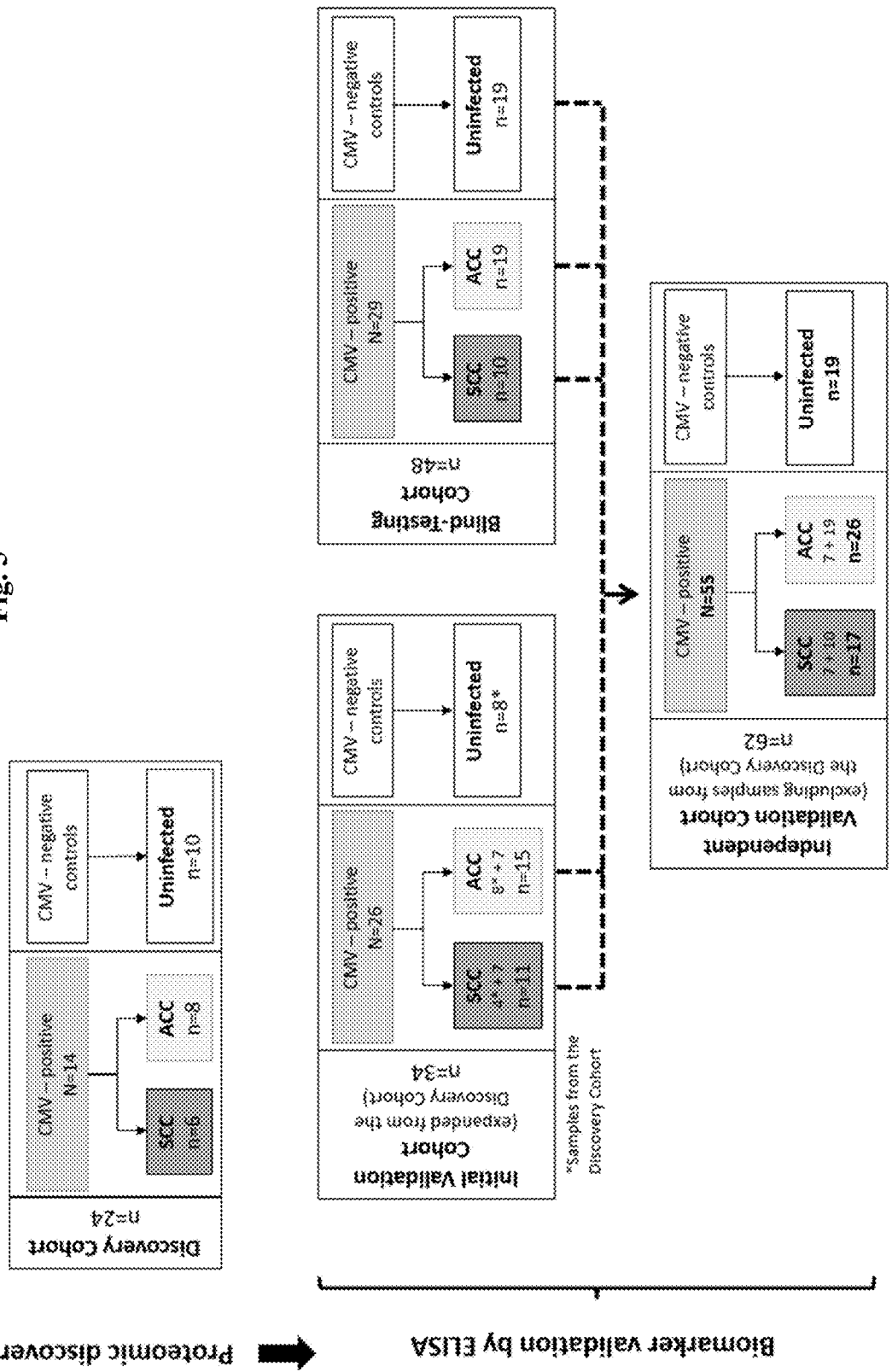
FIG. 5. Shows a schematic presentation of study outline and patient cohorts.

Amniotic fluid samples, obtained at 20-23 weeks of gestation (and at least 6 weeks after the assumed infection) from women diagnosed with primary CMV infection (as part of the routine diagnosis of fetal infection) were retrieved for retrospective analysis. Samples were stored at −800 C until the analysis. Included in the study were amniotic fluid samples of CMV-infected fetuses with characterized cCMV severity, classified as either symptomatic or asymptomatic cCMV infection (see Definition of symptomatic and asymptomatic infection). The classification was based on review of the antenatal data, including fetal imaging, and pathological examination following termination of pregnancy (TOP), and of the neonatal/postnatal follow-up data. Contemporaneous CMV-negative (uninfected) amniotic fluid samples, obtained under the same indications and conditions were analyzed in parallel. The study involved a proteomic discovery phase, carried out in a Discovery cohort (of samples retrieved from the Hadassah Medical Center Clinical Virology Laboratory), and a biomarker validation phase. The biomarker validation phase was performed in: 1) an Initial Validation cohort, which included samples from the Discovery cohort (subjected to the proteome analysis) and additional independent samples (retrieved from the Hadassah Medical Center Clinical Virology Laboratory), and, 2) an outcome-blinded (Blind-Testing) cohort from the Fondazione IRCCS Policlinico San Matteo Virology Laboratory, Pavia, Italy, and the Maccabi Healthcare Services Central Laboratory, Rehovot, Israel (FIG. 5; See appendix pp 2 for detailed cohort description). Together, the 62 independent cases (which were not included in the Discovery cohort:17 symptomatic cCMV, 26 asymptomatic cCMV, and 19 uninfected cases) constituted an Independent Validation cohort (FIG. 5).

The study was approved by the Institutional review boards (Hadassah 0273-18-HMO; Maccabi Healthcare Services ASMC 0069-; Fondazione IRCCS Policlinico San Matteo P-20100035854 and P-20180075214).

Definition of Symptomatic and Asymptomatic cCMV Infection

Fetuses were classified as symptomatic when cerebral anomalies were identified by prenatal ultrasound and/or MRI as previously defined (e.g. head circumference <2 standard deviations of normal, ventriculomegaly, white-matter abnormalities and cavitations, intracerebral hemorrhage, delayed cortical development). 12 After the diagnosis of fetal infection by amniocentesis, fetal scans were repeated monthly until delivery or TOP. Fetal brain MRI was performed at 30-32 weeks of gestation. All scan reports were reviewed again by two independent experts for the purpose of inclusion in the present study. After delivery, all newborns were evaluated for cCMV disease status by blood tests, audiological and ophthalmologic tests, and cerebral ultrasound imaging. Follow-up included periodic cognitive, developmental, and auditory evaluation. Cases were classified in the study as asymptomatic cCMV infection when all clinical and laboratory parameters were normal at birth and upon postnatal follow-up of at least 12 months. Cases with normal or mildly abnormal imaging that underwent TOP were excluded from the study due to insufficient outcome data.

CMV DNA Load Analysis

Viral DNA Load in Amniotic Fluid was Determined by RT-qPCR Assay

Sample Preparation, Liquid Chromatography-Mass Spectrometry (LC-MS), and Data Processing Amniotic fluid (150 microliters) was loaded onto a serum depletion column, followed by an in-solution tryptic digestion and a desalting step. The resulting peptides were analyzed using nanoflow liquid chromatography (nanoAcquity) coupled to high resolution, high mass accuracy mass spectrometry (Q Exactive HFX). For detailed description— see appendix pp 2-3. The Label-Free Quantification (LFQ) intensities were extracted and used for further calculations using Perseus v1.6.0.7. Decoy hits were filtered out, as well as proteins that were identified on the basis of a modified peptide only and GO annotations added. The LFQ intensities were log transformed and only proteins that had at least three valid values in at least one experimental group were kept. The remaining missing values were imputed. The t-test was performed to identify significant differential protein expression between the groups, and a p-value of 0.05 or less was considered statistically significant. To be defined as a differential protein expression we also required a minimal fold-change of >1.5 between the groups. The mass spectrometry proteomics data have been deposited to the ProteomeXchange Consortium via the PRIDE partner repository with the dataset identifier PXD029105.

Chemerin and Galectin-3 Binding Protein (Gal-3BP) Immunoassays

Amniotic fluid chemerin and Gal-3BP protein levels were determined using commercially-available quantitative sandwich enzyme immunoassays (Quantikine® ELISA; R&D Systems, Inc., Minneapolis, MN, USA; Catalog numbers DCHM00 and DGBP30B for chemerin and Gal-3BP, respectively), according to the manufacturer's instructions. Serial dilutions of amniotic fluid samples were initially tested to determine the dilution required to maintain the linearity of the assay within the expected dynamic range. All amniotic fluid samples were tested in duplicates. Four samples (two CMV-negative and two CMV-positive) were included in each run along with the appropriate calibrators and controls provided by the manufacturer, to monitor potential variability among assays. Protein concentrations were interpolated from the calibration curve using a four-parameter logistic curve fit.

Statistical Analysis

Statistical analysis was performed using SPSS version 26.0. Comparisons of chemerin and Gal-3BP levels and of CMV DNA load between amniotic fluid samples of fetuses with symptomatic cCMV and asymptomatic CMV-infected fetuses, and CMV-negative fetuses, were analyzed using the t-test or the non-parametric Mann-Whitney test (the latter used for non-normally distributed variables) for quantitative continuous variables. The identification of an intersection point with high specificity and sensitivity in order to distinguish between cases with symptomatic and asymptomatic infection based on chemerin, Gal-3BP, or viral DNA levels (cutoff values) was performed using ROC analysis. All tests applied were two-tailed, and a p-value of 0.05 or less was considered statistically significant.

Results

Identification of Amniotic Fluid Proteins Associated with the Severity of cCMV

Towards unbiased identification of amniotic fluid proteins associated with cCMV severity, we analyzed the amniotic fluid proteome of six fetuses with symptomatic and eight fetuses with asymptomatic cCMV (the latter were found to be asymptomatic neonates at birth and remained asymptomatic for at least 24 months after birth), and ten CMV-negative (uninfected) fetuses (FIG. 5). In total, 1174 human-origin proteins were identified and quantified in the amniotic fluid samples. Qualitative and quantitative data were obtained for each identified protein, along with the relevant relative intensity comparisons between samples. The fold-change for each comparison (i.e., infected versus uninfected; symptomatic versus asymptomatic cCMV) was calculated based on the protein LFQ intensity. We identified 59 proteins that were significantly differentially-excreted between infected and uninfected cases (Table 3), and 29 proteins that were significantly differentially-excreted between the symptomatic- and asymptomatic infected fetuses (Table 4) (see Table 5 for the list of proteins differentially-excreted by >two-fold and their basic characteristics, and appendix table S3 pp 12-13 for the full list of differentially-excreted proteins).

TABLE 3

Amniotic fluid proteins differentially-excreted between CMV-infected (n = 14) and uninfected (n = 10) fetuses

| Protein | Gene Symbol | Protein ID (Accession number) | p value | Fold Change | Group |
| --- | --- | --- | --- | --- | --- |
| Epiphycan | EPYC | Q99645 | <0.0001 | 9.1 | F |
| Carbonic anhydrase 3 | CA3 | P07451 | <0.01 | 7.1 | F |
| Retinoic acid receptor responder 2 (Chemerin) | RARRES2 | Q99969 | <0.01 | 6.7 | F |
| Signal-regulatory protein beta-1 | SIRPB1 | O00241 | <0.0001 | 5.9 | F |
| Bone marrow stromal antigen 2 | BST2 | Q10589 | 0.01 | 3.0 | F |
| BPI fold-containing family B member 4 | BPIFB4 | P59827 | 0.02 | 2.9 | F |
| Ubiquitin-like protein ISG15 | ISG15 | P05161 | 0.01 | 2.8 | F |
| HLA class 1 histocompatibility antigen, Cw-2 alpha chain | HLA-C | P30501 | <0.01 | 2.7 | F |
| Glycoprotein nmb | GPNMB | Q14956 | 0.01 | 2.7 | F |
| Keratin, type II cytoskeletal 6A | KRT6A | P02538; P50446 | 0.02 | 2.6 | F |
| Dickkopf-related protein 1 | DKK1 | O94907 | 0.04 | 2.4 | F |
| Fatty acid-binding protein, heart | FABP3 | P05413 | <0.01 | 2.4 | F |
| ATP synthase subunit beta, mitochondrial | ATP5B | P06576 | 0.02 | 2.4 | F |
| CD5 antigen-like | CD5L | O43866 | 0.04 | 2.4 | F |
| Secreted and transmembrane protein 1 | SECTM1 | Q8WVN6 | <0.0001 | 2.2 | F |
| SH3 domain-binding glutamic acid-rich-like protein | SH3BGRL | O75368 | <0.01 | 2.0 | F |
| Carboxypeptidase Q | CPQ | Q9Y646 | <0.01 | 2.0 | F |
| Protein S100-A6 | S100A6 | P06703 | 0.01 | 2.0 | F |
| Coagulation factor V; (heavy chain; light chain) | F5 | P12259 | 0.02 | 2.0 | F |

TABLE 3-continued

Amniotic fluid proteins differentially-excreted between CMV-infected (n = 14) and uninfected (n = 10) fetuses

| Protein | Gene Symbol | Protein ID (Accession number) | p value | Fold Change | Group |
|---|---|---|---|---|---|
| Desmin | DES | P17661 | 0.02 | 2.0 | F |
| Transmembrane emp24 domain-containing protein 7 | TMED7 | Q9Y3B3 | 0.03 | 2.0 | F |
| Chitotriosidase-1 | CHIT1 | Q13231 | 0.03 | 2.0 | F |
| Collagen alpha-1(IX) chain | COL9A1 | P20849 | 0.02 | 1.9 | F |
| Immunoglobulin J chain | IGJ | P01591 | 0.05 | 1.8 | F |
| Galectin 3 binding protein (Gal-3BP) | LGALS3BP | Q08380 | 0.03 | 1.7 | F |
| Receptor-type tyrosine-protein phosphatase S | PTPRS | Q13332 | 0.02 | 1.7 | F |
| Cellular retinoic acid-binding protein 2 | CRABP2 | P29373 | 0.04 | 1.7 | F |
| Cathepsin B; Cathepsin B light chain; Cathepsin B heavy chain | CTSB | P07858 | <0.0001 | 1.7 | F |
| Laminin subunit alpha-5 | LAMA5 | O15230 | 0.02 | 1.6 | F |
| Acidic leucine-rich nuclear phosphoprotein 32 family member A | ANP32A | P39687 | 0.04 | 1.6 | F |
| Apoptosis-associated speck-like protein containing a CARD | PYCARD | Q9ULZ3 | 0.04 | 1.6 | F |
| Low affinity immunoglobulin gamma Fc region receptor III-A | FCGR3A | P08637 | 0.04 | 1.6 | F |
| Beta-2-microglobulin; Beta-2-microglobulin form pI 5.3 | B2M | P61769 | <0.0001 | 1.5 | F |
| Cartilage acidic protein 1 | CRTAC1 | Q9NQ79 | 0.02 | 1.5 | F |
| Pappalysin-2 | PAPPA2 | Q9BXP8 | 0.03 | −1.5 | G |
| WAP four-disulfide core domain protein 2 | WFDC2 | Q14508 | 0.05 | −1.5 | G |
| Collagen alpha-2(I) chain | COL1A2 | P08123 | 0.02 | −1.5 | G |
| Vascular endothelial growth factor receptor 1 | FLT1 | P17948 | 0.03 | −1.6 | G |
| Lipolysis-stimulated lipoprotein receptor | LSR | Q86X29 | 0.01 | −1.6 | G |
| Kin of IRRE-like protein 1 | KIRREL | Q96J84 | 0.05 | −1.7 | G |
| Collagen alpha-1(III) chain | COL3A1 | P02461 | 0.01 | −1.7 | G |
| Palmitoleoyl-protein carboxylesterase NOTUM | NOTUM | Q6P988 | 0.03 | −1.7 | G |
| Insulin-like growth factor-binding protein 5 | IGFBP5 | P24593 | 0.01 | −1.7 | G |
| Isthmin-2 | ISM2 | Q6H9L7 | 0.03 | −1.7 | G |
| Glia-derived nexin | SERPINE2 | P07093 | 0.03 | −1.8 | G |
| Protein HEG homolog 1 | HEG1 | Q9ULI3 | 0.04 | −1.8 | G |
| Bone marrow proteoglycan; Eosinophil granule major basic protein | PRG2 | P13727 | 0.02 | −1.8 | G |
| Endogenous retrovirus group MER34 member 1 Env polyprotein | ERVMER34-1 | Q9H9K5 | 0.02 | −1.8 | G |
| Aspartate aminotransferase, cytoplasmic | GOT1 | P17174 | 0.02 | −2.0 | G |
| Amiloride-sensitive amine oxidase [copper-containing] | AOC1 | P19801 | 0.02 | −2.0 | G |
| Serine protease 23 | PRSS23 | O95084 | 0.04 | −2.1 | G |
| Angiopoietin-related protein 6 | ANGPTL6 | Q8NI99 | 0.04 | −2.1 | G |
| Alpha-1,6-mannosylglycoprotein 6-beta-N-acetylglucosaminyltransferase A | MGAT5 | Q09328 | 0.05 | −2.2 | G |
| Radixin | RDX | P35241 | <0.01 | −2.4 | G |
| Protocadherin Fat 4 | FAT4 | Q6V0I7 | <0.01 | −2.6 | G |
| N-acetylgalactosaminyltransferase 7 | GALNT7 | Q86SF2 | 0.01 | −2.6 | G |
| Immunoglobulin superfamily member 1 | IGSF1 | Q8N6C5 | 0.03 | −2.6 | G |

TABLE 3-continued

Amniotic fluid proteins differentially-excreted between CMV-infected (n = 14) and uninfected (n = 10) fetuses

| Protein | Gene Symbol | Protein ID (Accession number) | p value | Fold Change | Group |
|---|---|---|---|---|---|
| Latrophilin-2 | LPHN2 | O95490 | 0.01 | −2.7 | G |
| Hepatocyte growth factor; Hepatocyte growth factor alpha chain; Hepatocyte growth factor beta chain | HGF | P14210 | <0.01 | −4.0 | G |

Included in the table are proteins diferentially-excreted by >.5-fold; Sign (−) before the fold-change value indicates decreased expression; The upper and lower bold horizontal lines mark proteins (shown above the upper line and below the lower line) differentially-excreted by >2-fold.

TABLE 4

Amniotic fluid proteins differentially-excreted between fetuses with symptomatic (n = 6) and asymptomatic (n = 8) cCMV

| Protein | Gene Symbol | Protein ID (Accession number) | p value | Fold-Change |
|---|---|---|---|---|
| Spectrin repeat containing nuclear envelope protein 1 | SYNE1 | Q8NF91 | 0.01 | 8.7 |
| Sarboxypeptidase A2 | CPA2 | P48052 | 0.05 | 5.3 |
| Retinoic acid receptor responder 2 (Chemerin) | RARRES2 | Q99969 | 0.04 | 3.6 |
| Glutathione S-transferase theta-1 | GSTT1 | P30711 | 0.04 | 3.0 |
| C-reactive protein | CRP | P02741 | 0.05 | 2.5 |
| Glycoprotein nmb | GPNMB | Q14956 | 0.03 | 2.5 |
| Galectin 3 binding protein | LGALS3BP | Q08380 | 0.02 | 2.4 |
| Myosin heavy chain 14 | MYH14 | Q7Z406 | 0.03 | 2.1 |
| Secretoglobin family 3A member 2 | SCGB3A2 | Q96PL1 | 0.06 | 2.1 |
| Carboxypeptidase Q | CPQ | Q9Y646 | 0.05 | 1.7 |
| Protein FAM3D (Family with sequence similarity 3 member D) | FAM3D | Q96BQ1 | 0.03 | 1.7 |
| Keratin 17 | KRT17 | Q04695; | 0.04 | 1.7 |
| Platelet derived growth factor receptor beta | PDGFRB | P09619 | 0.05 | −1.5 |
| ADAM metallopeptidase domain 9 | ADAM9 | Q13443 | 0.02 | −1.5 |
| Mesothelin; Megakaryocyte-potentiating factor; Mesothelin, cleaved form | MSLN | Q13421 | 0.05 | −1.5 |
| Sarcoglycan epsilon | SGCE | O43556 | <0.01 | −1.5 |
| Growth arrest specific 1 | GAS1 | P54826 | 0.02 | −1.6 |
| Cell growth regulator with EF hand domain protein 1 | CGREF1 | Q99674 | 0.04 | −1.6 |
| Endoplasmic reticulum aminopeptidase 1 | ERAP1 | Q9NZ08 | 0.01 | −1.9 |
| Glycoprotein Ib platelet subunit alpha | GP1BA | P07359 | 0.02 | −2.1 |
| Actin alpha 1, skeletal muscle | ACTA1 | P68133; P68032; P63267; P62736 | 0.05 | −2.1 |
| Alcohol dehydrogenase [NADP(+)] | AKR1A1 | P14550 | 0.01 | −2.5 |
| Neurofascin | NFASC | O94856 | 0.04 | −2.6 |
| Chromogranin B | CHGB | P05060 | 0.03 | −3.0 |
| Pro-platelet basic protein | PPBP | P02775 | 0.01 | −3.1 |
| Lysosome-associated membrane glycoprotein 2 | LAMP2 | P13473 | 0.05 | −3.3 |
| Maltase-glucoamylase | MGAM | O43451 | 0.02 | −3.6 |
| Heat shock protein beta-1 | HSPB1 | P04792 | 0.04 | −3.7 |
| Angiopoietin like 6 | ANGPTL6 | Q8NI99 | <0.01 | −4.0 |

Included in the table are proteins differentially-excreted by >1.5-fold; sign (−) before the fold-change value indicates decreased expression; the upper and lower bold horizontal lines mark proteins (shown above the upper line and below the lower line) differentially-excreted by >2-fold.

TABLE 5

Amniotic fluid proteins differentially-excreted between fetuses with symptomatic (n = 6) and asymptomatic cCMV (n = 8)

| Protein | Gene Symbol | Protein ID (Accession number) | p value | Fold-Change |
|---|---|---|---|---|
| Spectrin repeat containing nuclear envelope protein 1 | SYNE1 | Q8NF91 | 0.01 | 8.7 |
| Carboxypeptidase A2 | CPA2 | P48052 | 0.05 | 5.3 |
| Retinoic acid receptor responder 2 (Chemerin) | RARRES2 | Q99969 | 0.04 | 3.6 |
| Glutathione S-transferase theta-1 | GSTT1 | P30711 | 0.04 | 3.0 |
| C-reactive protein | CRP | P02741 | 0.05 | 2.5 |
| Glycoprotein nmb | GPNMB | Q14956 | 0.03 | 2.5 |
| Galectin 3 binding protein (Gal-3BP) | LGALS3BP | Q08380 | 0.02 | 2.4 |
| Myosin heavy chain 14 | MYH14 | Q7Z406 | 0.03 | 2.1 |
| Secretoglobin family 3A member 2 | SCGB3A2 | Q96PL1 | 0.05 | 2.1 |
| Glycoprotein Ib platelet subunit alpha | GP1BA | P07359 | 0.02 | −2.1 |
| Actin alpha 1, skeletal muscle | ACTA1 | P68133; P68032; P63267; P62736 | 0.05 | −2.1 |
| Aldo-keto reductase family 1 member A1 | AKR1A1 | P14550 | 0.01 | −2.5 |
| Neurofascin | NFASC | O94856 | 0.04 | −2.6 |
| Chromogranin B | CHGB | P05060 | 0.03 | −3.0 |
| Pro-platelet basic protein | PPBP | P02775 | 0.01 | −3.1 |
| Lysosome-associated membrane glycoprotein 2 | LAMP2 | P13473 | 0.05 | −3.3 |
| Maltase-glucoamylase | MGAM | O43451 | 0.02 | −3.6 |
| Heat shock protein beta-1 | HSPB1 | P04792 | 0.04 | −3.7 |
| Angiopoietin like 6 | ANGPTL6 | Q8NI99 | <0.001 | −4.0 |

Figure 6A:
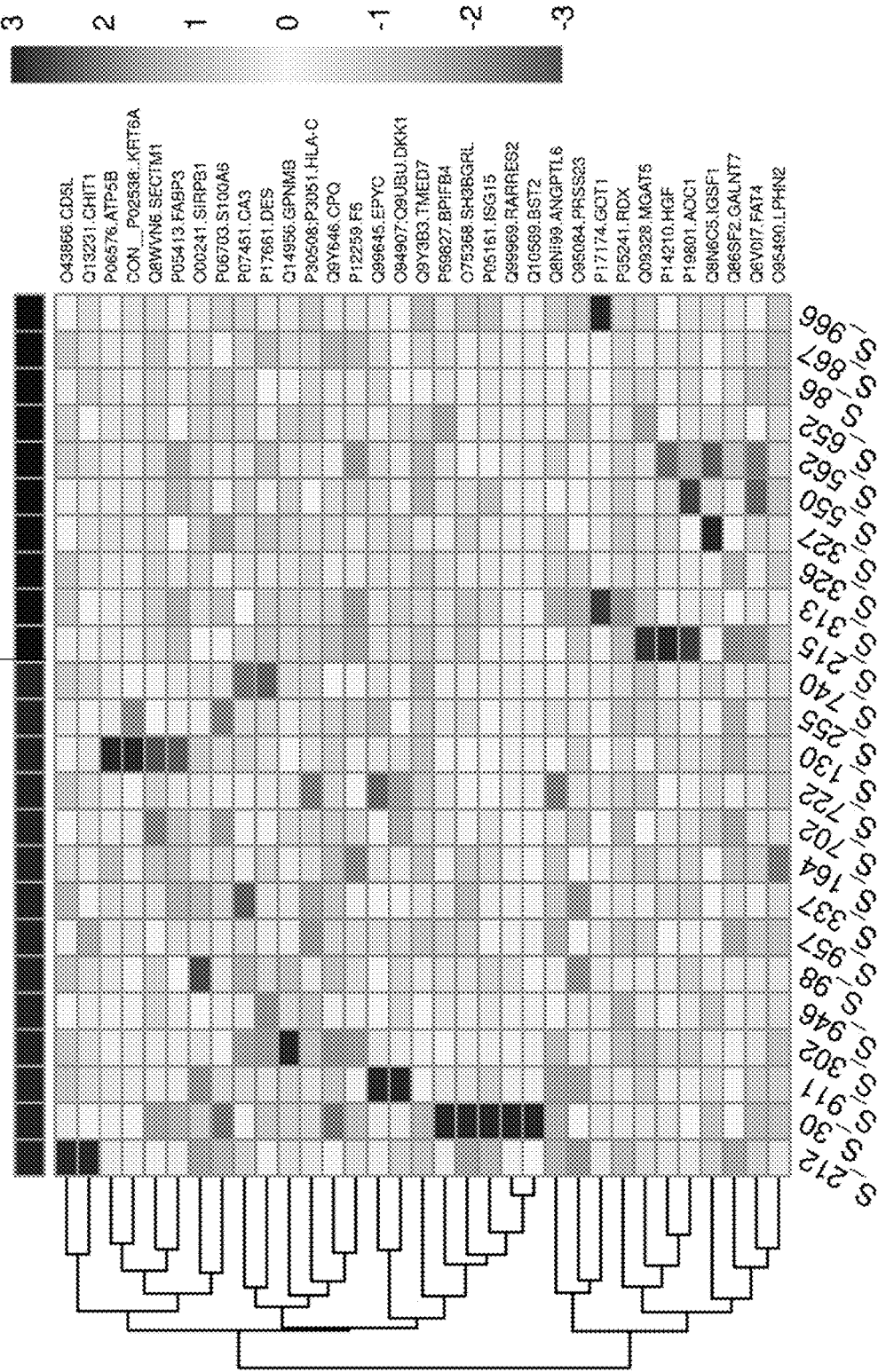
FIGS. 6A and 6B shows heatmaps of differentially-excreted amniotic fluid proteins between CMV-infected and uninfected fetuses (FIG. 6A) and between fetuses with symptomatic and asymptomatic cCMV (FIG. 6B). Heatmaps were drawn using normalized Label-Free Quantification intensity values of the differentially-excreted (>2-fold) proteins (indicated by symbols and accession numbers) after scaling per protein (rows) over all drawn samples (columns). In panel B, the relative signals of the proteins which were differentially-excreted between fetuses with symptomatic and asymptomatic cCMV are also shown for the uninfected fetuses. S_number stands for sample number; SCC=symptomatic congenital CMV infection; ACC=asymptomatic congenital CMV infection; RARRES2=Retinoic acid receptor responder 2 (Chemerin); LGALS3BP=Galectin 3 binding protein (Gal-3BP).
Figure 6B:
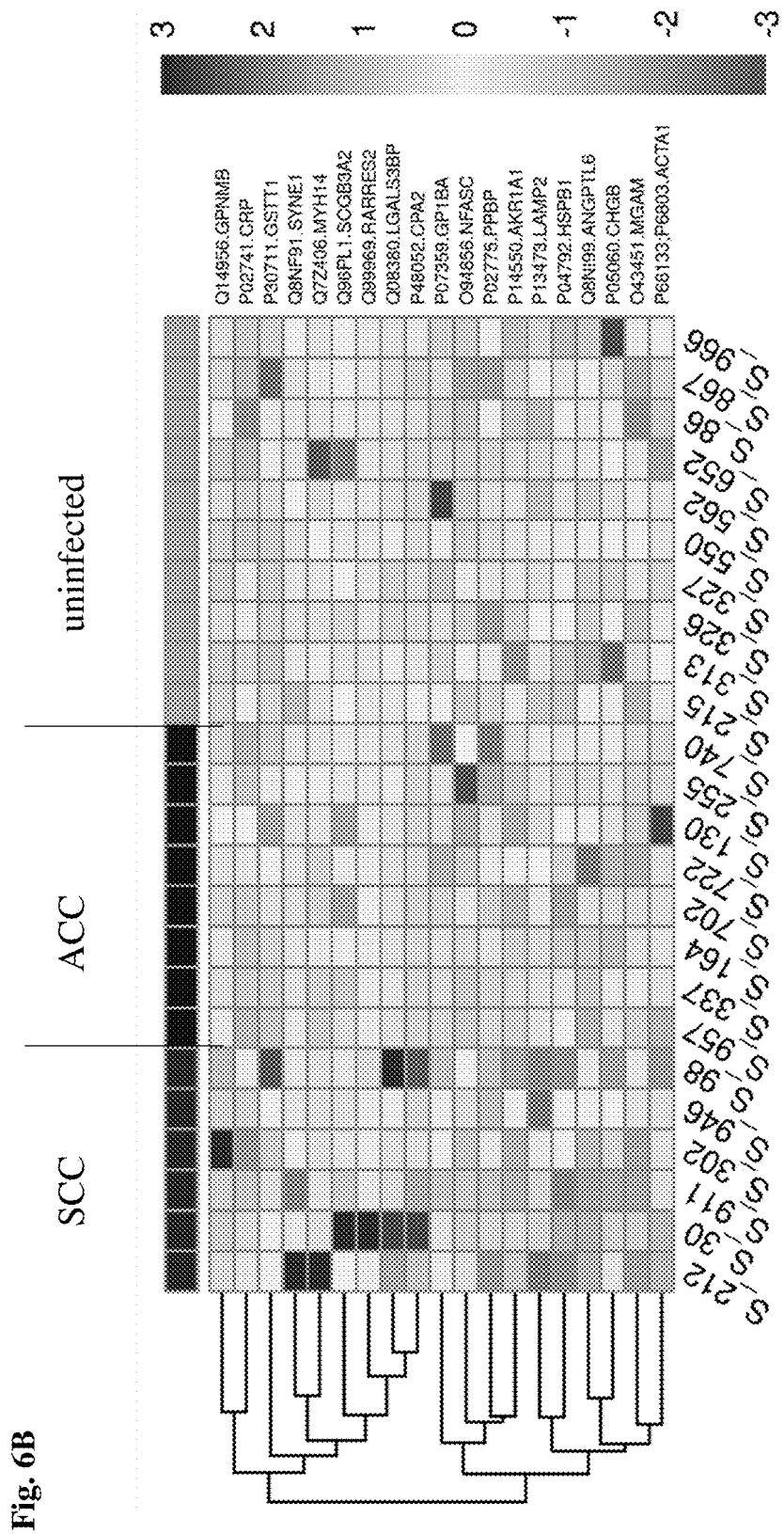

To better delineate the distribution of the differentially-excreted proteins among the compared groups and individual cases, their normalized LFQ intensity signals were visualized in heatmaps. FIGS. 6A and 6B shows the case-to-case variability, yet clearly demonstrates the distinct protein patterns distinguishing between infected and uninfected fetuses (FIG. 6A) and between fetuses with symptomatic and asymptomatic cCMV (FIG. 6A).

Notably, the amniotic fluid proteins which differentiated between fetuses with symptomatic and asymptomatic cCMV appeared to be relatively close between fetuses with asymptomatic cCMV and uninfected fetuses (FIG. 6B), suggesting their specific association with cCMV severity (and not with cCMV infection by itself).

Ingenuity Pathway Analysis (IPA) of the Differentially-Excreted Proteins

To gain insight into the biological pathways and predicted functions of the identified differentially-excreted amniotic fluid proteins, we have employed IPA. Focusing on pathways related to diseases and bio-functions, the top relevant categories enriched in infected versus uninfected fetuses included Inflammatory Response, Cellular Compromise, and Organismal Injury and Abnormalities (see FIG. 7A for additional enriched pathways). These findings reflected pathways enriched by both symptomatic and asymptomatic infection. Interestingly, when we specifically compared between the symptomatic and asymptomatic cCMV infection groups, the top enriched categories included Inflammatory Response, Cellular Compromise, Immunological Disease, and Organismal Injury and Abnormalities (FIG. 7B). Among the enriched categories were also Neurological Disease, and Nervous System Development and Function. These findings could be linked to the dominant neurological abnormalities of cCMV, and could further imply on the immune/inflammatory-mediated pathogenesis of symptomatic cCMV.

Amniotic Fluid Retinoic Acid Receptor Responder 2 (Chemerin; RARRES2) and Galectin-3-Binding Protein (Gal-3BP; LGALS3BP) Levels Distinguish Symptomatic from Asymptomatic cCMV Having identified a group of proteins differentially excreted in infected fetuses with symptomatic cCMV, we selected two of the identified proteins for validation using ELISA measurement: Chemerin—a chemoattractant protein with regulatory roles in immune and metabolic processes, and Gal-3BP—a multifunctional immunomodulating glycoprotein. These two candidate biomarkers stood out, and were thus chosen for further analysis, due to their significant and consistent relative abundance in the symptomatic group (Table 4; FIG. 6B), their involvement in the enriched disease-related pathways (as revealed by IPA), and the availability of specific quantitative ELISA assays (reportedly used in clinical body fluids).

The ability of chemerin and Gal-3BP levels to separate between fetuses with symptomatic and asymptomatic cCMV was evaluated in: 1) An Initial Validation cohort (extended from the Discovery cohort), aimed to confirm the differential excretion of the proteins by ELISA assays, and, 2) A blind (outcome-blinded) Testing cohort from two unrelated centers. Gestational age at amniocentesis was 20-23 weeks (except for one symptomatic case who underwent amniocentesis at week 27). Mean gestational age at amniocentesis was 21 weeks for fetuses with symptomatic and asymptomatic cCMV, and uninfected fetuses. All symptomatic cCMV cases except one underwent TOP due to the appearance of severe findings by prenatal imaging. Nine of them had an autopsy, which confirmed the severe fetal pathology. Gestational age at the appearance of severe imaging findings ranged from 16 to 31 weeks. In seven cases, severe imaging findings appeared for the first time at gestational age 25-31 weeks, 4 to 9 weeks after the amniocentesis. The median postnatal follow-up period of asymptomatic cases was 36 months (range 12-68 months).

Figure 8A:
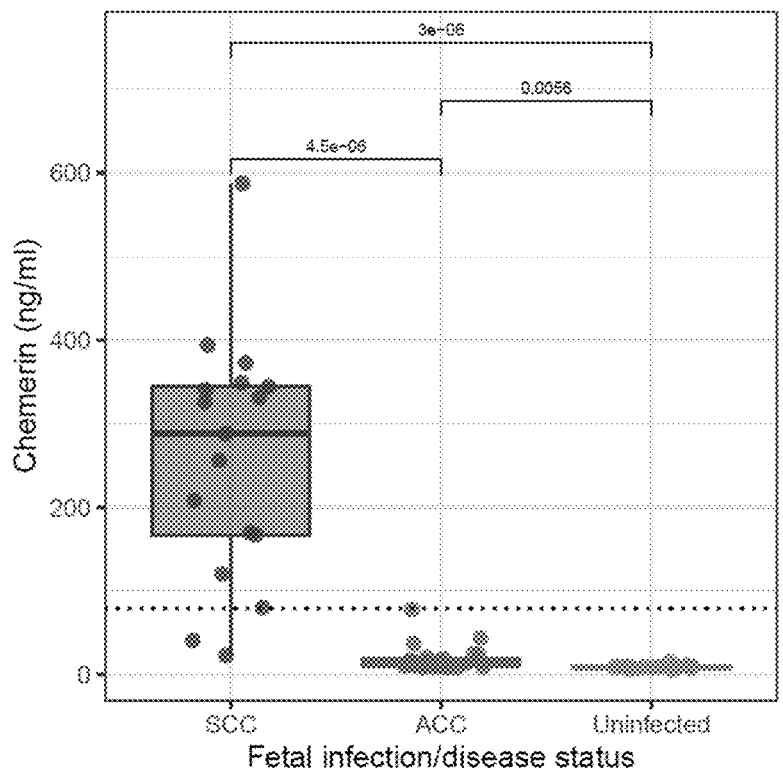
FIGS. 8A and 8B show amniotic fluid chemerin (FIG. 8A) and Gal-3BP (FIG. 8B) levels in fetuses with symptomatic cCMV (SCC), asymptomatic cCMV (ACC), and in uninfected fetuses. The levels shown were analyzed in an Independent Validation cohort of 17 SCC, 26 ACC, and 19 control uninfected cases. The dotted horizontal lines represent optimal predictive cutoff values derived by ROC analysis.
Figure 8B:
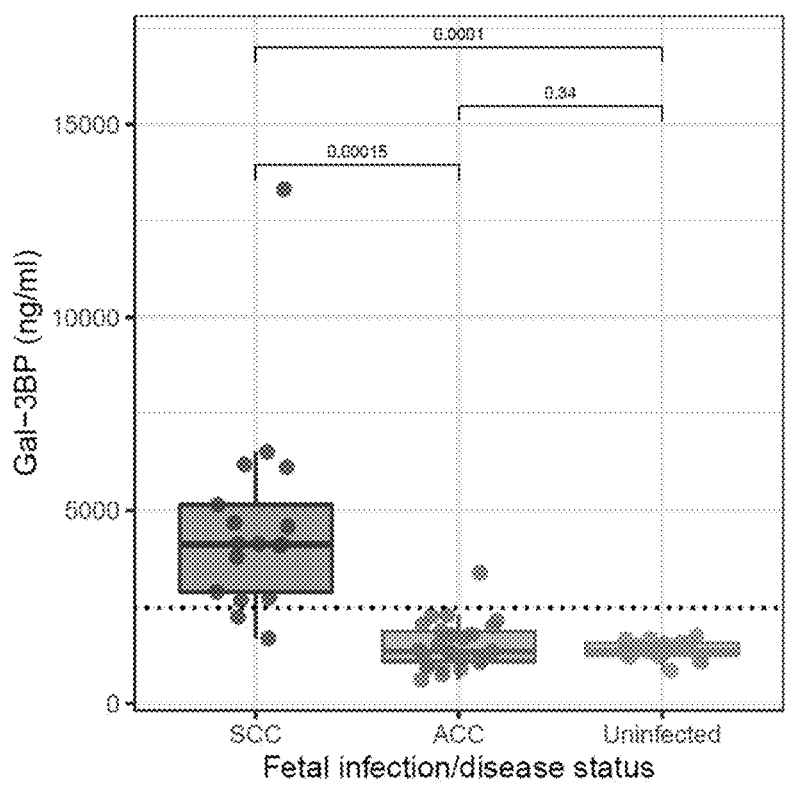
Figure 9B:
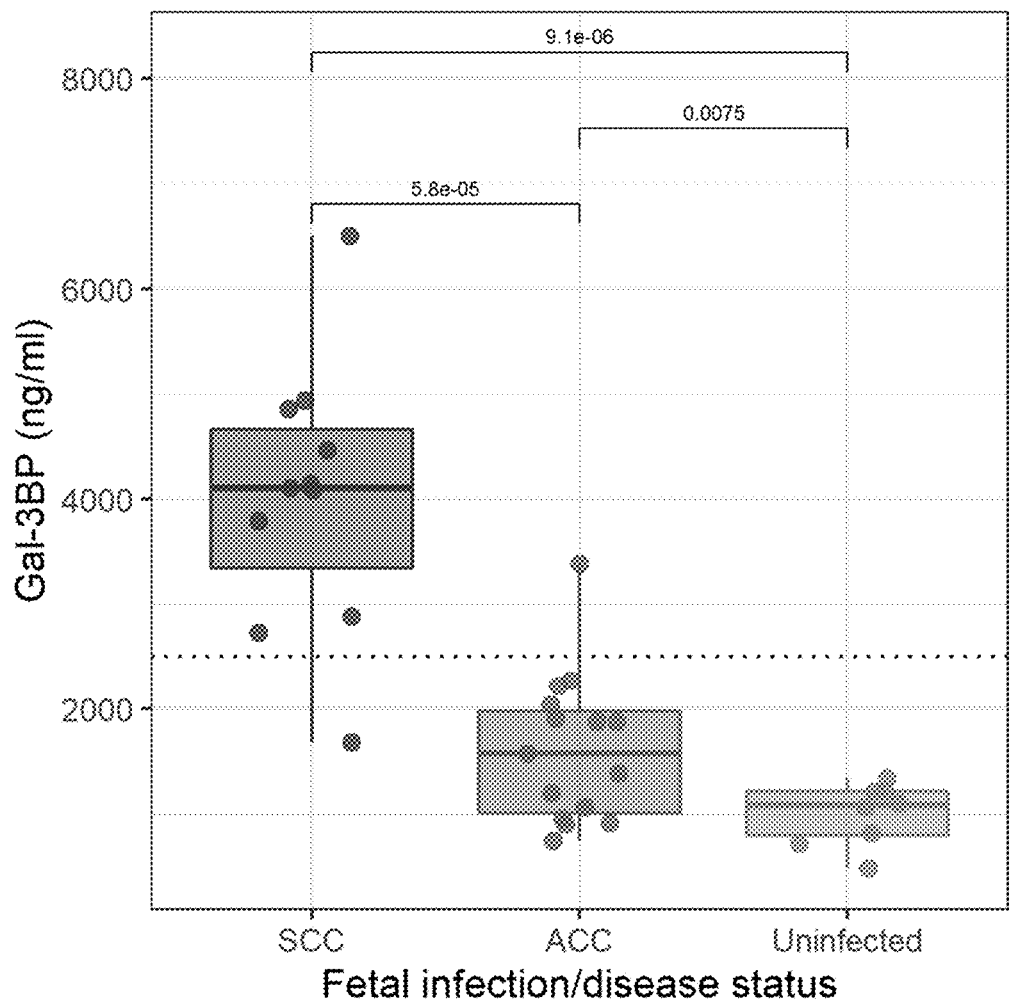
Figure 10A:
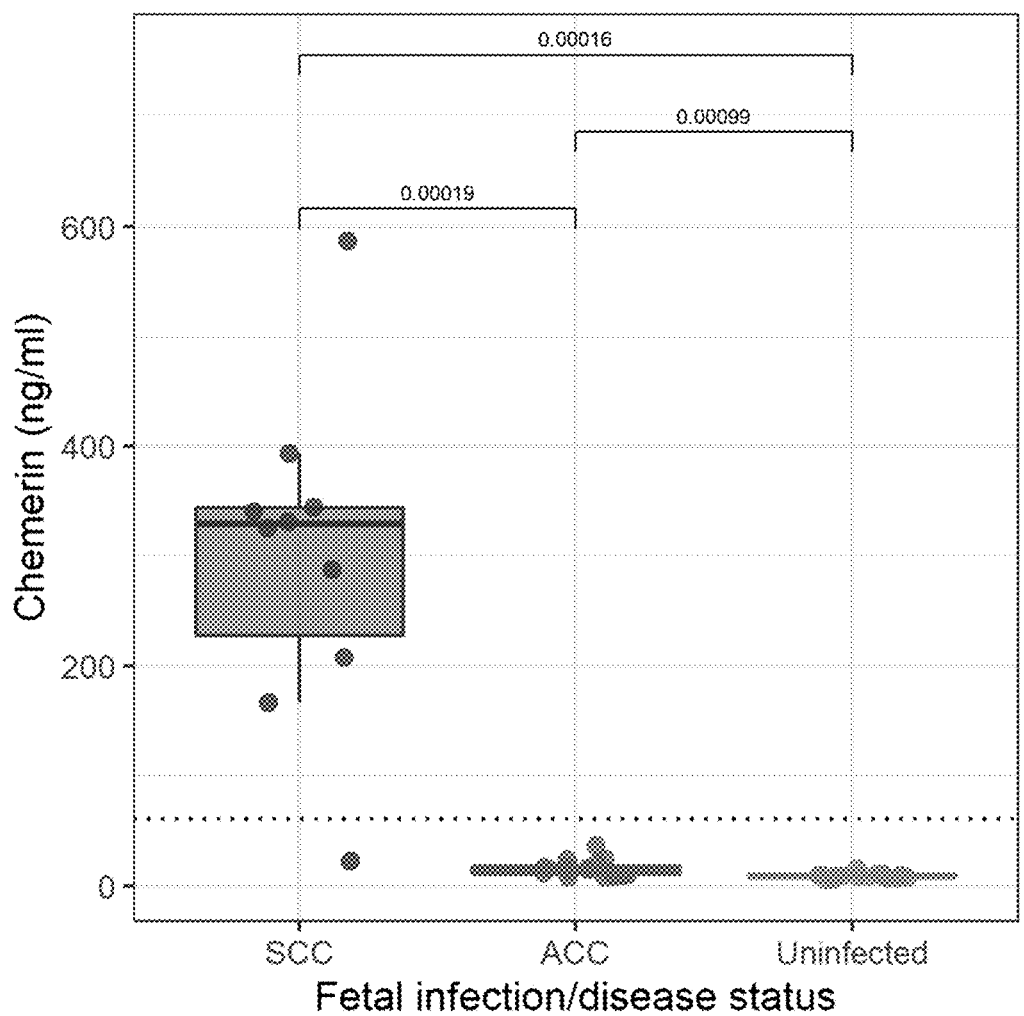
FIGS. 10A and 10B show amniotic fluid chemerin (FIG. 10A) and Gal-3BP (FIG. 10B) levels in a Blind-Testing cohort of fetuses with symptomatic cCMV (SCC; n=10), asymptomatic cCMV (ACC; n=19), and in uninfected fetuses (n=19). The dotted horizontal lines represent optimal predictive cutoff values derived by ROC analysis from an unrelated Initial Validation cohort.
Figure 10B:
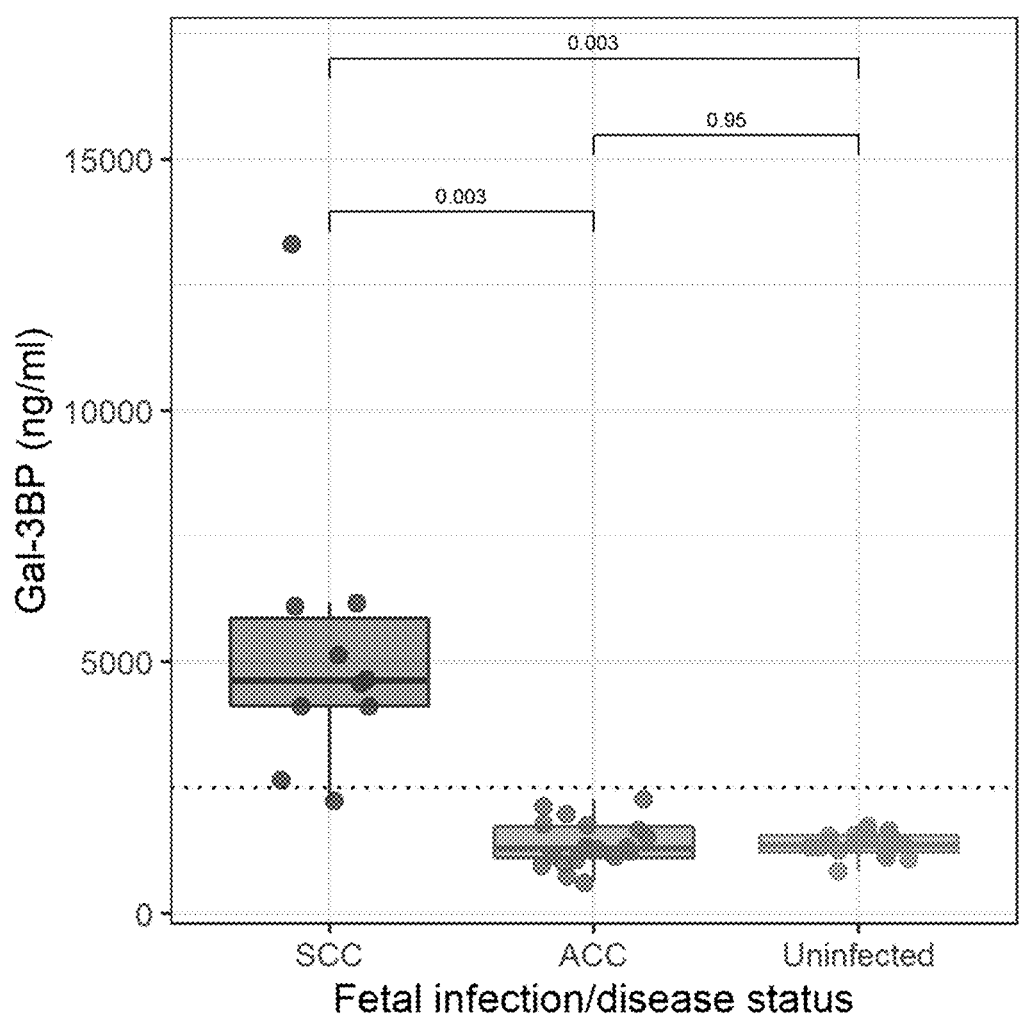

The results clearly demonstrated the significantly higher levels of chemerin and Gal-3BP in fetuses with symptomatic-compared to asymptomatic cCMV (FIGS. 8A and 8B; FIGS. 9A and 9B and FIGS. 10A and 10B) Of note, chemerin and Gal-3BP levels were also mildly elevated in infected-asymptomatic compared to uninfected fetuses, suggesting their initial triggering by infection per se. The high accuracy of both chemerin and Gal-3BP in differentiating between fetuses with symptomatic and asymptomatic cCMV was first shown by ROC analysis in the Initial Validation cohort, which also served to define primary threshold values for the two proteins, that would discriminate between symptomatic and asymptomatic cCMV. Strikingly, the defined cutoff levels of each of the two proteins predicted the severity of cCMV in the Blind-Testing cohort, with 90% sensitivity, 100% specificity, 100% positive predictive value (PPV), and 95% negative predictive value (NPV) (Table 6).

TABLE 6

AUC, sensitivity, specificity, and predictive values of chemerin
and gal-3bp amniotic fluid levels in relation to cCMV severity

| | | | AUC [95% CI] | Cutoff values (ng/ml)* | Sensitivity (%) | Specificity (%) | PPV (%) | NPV (%) |
|---|---|---|---|---|---|---|---|---|
| Initial Validation cohort | SCC (n = 11) vs. ACC (n = 15) | Chemerin Gal-3BP | 0.988 [0.957-1.0] 0.945 [0.855-1.0] | 61.1 2500 | 90.9 90.9 | 93.3 93.3 | 90.9 90.9 | 93.3 93.3 |
| Blind Testing cohort | SCC (n = 10) vs. ACC (n = 19) | Chemerin Gal-3BP | — — | 61.1 2500 | 90.0 90.0 | 100 100 | 100 100 | 95.0 95.0 |

It should be noted that in the one severe cCMV case which was wrongly predicted (by the biomarkers) to be asymptomatic, severe imaging findings appeared for the first time at gestational week 28, seven weeks after the amniocentesis. Additionally, one fetus in the Blind-Testing cohort, who was classified as symptomatic cCMV (based on the biomarkers' levels), was categorized as symptomatic cCMV based on the presence of severe cerebral MRI abnormalities and on fetal blood parameters (measured at the Italian center). The child was subsequently diagnosed as symptomatic at birth, received 6 months of oral valganciclovir therapy, and at 12 months of age his developmental and hearing examinations were normal.

In an overall analysis of an Independent Validation cohort (including cases unrelated to the Discovery cohort; FIG. 5), chemerin and Gal-3BP levels demonstrated 88.2% sensitivity (each), 100-96.2% specificity, 100-93.8% PPV, and 92.9-92.6% NPV, with 0.98-0.97 AUC (for chemerin—Gal-3BP, respectively), in differentiating 17 fetuses with symptomatic from 26 fetuses with asymptomatic cCMV (table 3). By comparison, amniotic fluid viral DNA levels, although significantly higher in symptomatic compared to asymptomatic cases (6.50±0.60 vs. 5.17±1.10 log DNA copies/ml; p<0.001), demonstrated an inferior prognostic performance with much lower specificity and PPV (Table 7).

TABLE 7

Predictive values of amniotic fluid chemerin, Gal-3BP,
and CMV DNA load in distinguishing between fetuses with
symptomatic (n = 17) and asymptomatic (n = 26) cCMV

| | AUC [95% CI] | Cutoff values | Sensitivity (%) | Specificity (%) | PPV (%) | NPV (%) |
|---|---|---|---|---|---|---|
| Chemerin | 0.984 [0.956-1.0] | 79.3 (ng/ml) | 88.2 | 100 | 100 | 92.9 |
| Gal-3BP | 0.966 [0.918-1.0] | 2476 (ng/ml) | 88.2 | 96.2 | 93.8 | 92.6 |
| CMV DNA load | 0.871 [0.768-0.974] | 5.4 ($\log_{10}$ copies/ml) | 100 | 57.7 | 56.7 | 100 |

Gal-3BP = Galectin 3 binding protein; AUC = area under the curve; PPV = positive predictive value; NPV = negative predictive value.

Moreover, in six cases, high levels of chemerin and Gal-3BP preceded the appearance of symptomatic brain lesions by 4-9 weeks.

Together, these data reveal distinct amniotic fluid protein patterns in amniotic fluid of symptomatic fetuses compared to asymptomatic cCMV, and identify chemerin and Gal-3BP as new highly predictive biomarkers of cCMV severity. Importantly, we demonstrated the high predictive accuracy of these two newly-identified biomarkers in distinguishing 17 symptomatic fetuses from 26 fetuses with asymptomatic cCMV (included in an Independent Validation cohort from three unrelated centers), showing 88.2% sensitivity (for each), 100-96.2% specificity, 100-93.8% PPV, and 92.9-92.6% NPV, with 0.98-0.97 AUC (for chemerin—Gal-3BP, respectively). By comparison, and in accordance with previous reports, amniotic fluid viral load levels showed considerably lower predictive values (table 6).1-3 Notably, the presence of high levels of amniotic fluid chemerin and Gal-3BP preceded the appearance of symptomatic imaging findings by four to nine weeks in six cases further highlighting their potential prognostic value.

In summary, the data presented here identify the immunomodulatory proteins chemerin and Gal-3BP and optionally other identified markers as new, highly predictive, amniotic fluid biomarkers of cCMV infection severity, which could guide early prognostic stratification and potential personalized treatment of cCMV-infected fetuses. The findings provide insights for further mechanistic studies of inflammatory pathways and treatable targets involved in the progression of cytomegalovirus-related fetal brain damage.

Although the present invention has been described herein above by way of preferred embodiments thereof, it can be modified, without departing from the spirit and nature of the subject invention as defined in the appended claims.

The invention claimed is:

1. A method of treating a symptomatic congenital human cytomegalovirus (cCMV) infection in a fetus in need thereof, the method comprising:

administering to the fetus or its mother an anti-CMV active agent selected from valacyclovir and letermovir or administering valganciclovir to the fetus upon its birth, wherein the fetus has been indicated as having a symptomatic cCMV infection by a method comprising:

(i) determining via an enzyme-linked immunosorbent assay (ELISA) or mass spectrometry a level of at least one biomarker in a biological sample selected from an amniotic fluid; blood, plasma or serum of the fetus; blood, plasma or serum of an umbilical cord of the fetus; a biopsy of a placenta of the fetus' mother; and blood or serum of the fetus' mother; and (ii) comparing the level of the at least one biomarker from the biological sample to its level in a control, wherein a difference in the level of the biomarker in the biological sample compared to the control is indicative of the presence of the symptomatic cCMV infection, wherein the at least one biomarker is selected from Retinoic acid receptor responder protein 2 (RARRES2), Galectin-3-binding protein (LGALS3BP), Transmembrane glycoprotein NMB (GPNMB), Nesprin-1 (SYNE1), Myosin-14 (MYH14), Carboxypeptidase A2 (CPA2), Secretoglobin family 3A member 2 (SCGB3A2)C-reactive protein (CRP), Glutathione S-transferase theta-1 (GSTT1),; Carboxypeptidase Q Protein (CPQ); Family with sequence similarity 3 member D (FAM3D);, Keratin 17 (KRT17), Carboxypeptidase M (CPM), Platelet-derived growth factor receptor beta (PDGFRB), Angiopoietin-related protein 6 (ANGPTL6), Dermokine (DMKN), Secretogranin-1 (CHGB), A Disintegrin and metalloproteinase domain-containing protein 9 (ADAM9), Growth arrest-specific protein 1 (GAS1), Platelet basic protein (PPBP), Platelet glycoprotein Ib alpha chain (GP1BA), Lysosome-associated membrane glycoprotein 2 (LAMP2), Neurofascin (NFASC), Alcohol dehydrogenase [NADP (+)] (AKR1A1), Heat shock protein beta-1 (HSPB1), Maltase-glucoamylase (MGAM), LAMP2 and Actin alpha 1, skeletal muscle (ACTA1), Mesothelin (MSLN);, Sarcoglycan epsilon (SGCE);, Cell growth regulator with EF hand domain protein 1 (CGREF1);, and Endoplasmic reticulum aminopeptidase 1 (ERAP1).

2. The method of claim 1, wherein:
(a) the at least one biomarker comprises RARRES2, and an increase in the level of RARRES2 compared to the control is indicative of the presence of the symptomatic cCMV infection;
(b) the at least one biomarker comprises LGALS3BP and an increase in the level of LGALS3BP compared to the control is indicative of the presence of the symptomatic cCMV infection;
(c) the at least one biomarker comprises RARRES2 and LGALS3BP and an increase in the levels of RARRES2 and LGALS3BP compared to the control is indicative of the presence of the symptomatic cCMV infection;
(d) the at least one biomarker comprises RARRES2 and GPNMB and an increase in the levels of RARRES2 and GPNMB compared to the control is indicative of the presence of the symptomatic cCMV infection; or
(e) the at least one biomarker comprises LGALS3BP and GPNMB and an increase in the levels of LGALS3BP and GPNMB compared to the control is indicative of the presence of the symptomatic cCMV infection.

3. The method of claim 2, wherein the at least one biomarker comprises RARRES2.

4. The method of claim 2, wherein the at least one biomarker comprises LGALS3BP.

5. The method of claim 2, wherein the at least one biomarker comprises RARRES2 and LGALS3BP.

6. The method of claim 5, wherein the at least one biomarker further comprises one or more of SYNE1, MYH14, GPNMB, CPA2, SCGB3A2, CRP, GSTT1, CPM, CPQ, FAM3D, KRT17, PDGFRB, ANGPTL6, DMKN, CHGB, ADAMS, GAS1, PPBP, GP1BA, LAMP2, NFASC, AKR1A1, HSPB1, MGAM, ACTA1, MSLN, SGCE, CGREF1, and ERAP1.

7. The method of claim 6, wherein the at least one biomarker further comprises one or more of SYNE1, MYH14, GPNMB, CPA2, SCGB3A2, CRP, GSTT1, CPQ, FAM3D, and KRT17; and wherein in an increase in the level of one or more of SYNE1, MYH14, GPNMB, CPA2, SCGB3A2, CRP, GSTT1, CPQ, FAM3D, and KRT17 compared to the control is indicative of the presence of the symptomatic cCMV infection.

8. The method of claim 6, wherein the at least one biomarker further comprises one or more of CPM, PDGFRB, ANGPTL6, DMKN, CHGB, ADAMS, GAS1, PPBP, GP1BA, LAMP2, NFASC, AKR1A1, HSPB1, MGAM, ACTA1, MSLN, SGCE, CGREF1, and ERAP1; and wherein a decrease in the level of one or more of CPM, PDGFRB, ANGPTL6, DMKN, CHGB, ADAMS, GAS1, PPBP, GP1BA, LAMP2, NFASC, AKR1A1, HSPB1, MGAM, ACTA1, MSLN, SGCE, CGREF1, and ERAP1 compared to the control is indicative of the presence of the symptomatic cCMV infection.

9. The method of claim 6, wherein the at least one biomarker further comprises one or more of ANGPTL6, GP1BA, ACTA1, AKR1A1, NFASC, CHGB, PPBP, LAMP2, MGAM, HSPB1, CPQ, FAM3D, and KRT17; and wherein a decrease in the level of one or more of ANGPTL6, GP1BA, ACTA1, AKR1A1, NFASC, CHGB, PPBP, LAMP2, MGAM, HSPB1, CPQ, FAM3D, and KRT17 compared to the control is indicative of the presence of the symptomatic cCMV infection.

10. The method of claim 1, wherein the control comprises samples selected from infected asymptomatic humans or non-infected humans, or a combination thereof.

11. The method of claim 1, wherein the method comprises administering to the fetus or its mother the anti-CMV active agent.

12. A method of treating a symptomatic congenital human cytomegalovirus (cCMV) infection in a fetus in need thereof, the method comprising:
(a) determining via an enzyme-linked immunosorbent assay (ELISA) or mass spectrometry a level of at least one biomarker in a biological sample selected from an amniotic fluid; blood, plasma or serum of the fetus; blood, plasma or serum of an umbilical cord of the fetus; a biopsy of a placenta of the fetus' mother; or blood or serum of the fetus' mother;
(b) comparing the level of at least one biomarker from the biological sample to its level in a control, wherein a difference in the level of the biomarker in the biological sample compared to the control is indicative of the presence of the symptomatic cCMV infection, wherein the at least one biomarker is selected from Retinoic acid receptor responder protein 2 (RARRES2), Galectin-3-binding protein (LGALS3BP), Transmembrane glycoprotein NMB (GPNMB), Nesprin-1 (SYNE1), Myosin-14 (MYH14), Carboxypeptidase A2 (CPA2), Secretoglobin family 3A member 2 (SCGB3A2)C-reactive protein (CRP), Glutathione S-transferase theta-1 (GSTT1), Carboxypeptidase Q Protein (CPQ), Family with sequence similarity 3 member D (FAM3D), Keratin 17 (KRT17), Carboxypeptidase M (CPM), Platelet-derived growth factor receptor beta (PDGFRB), Angiopoietin-related protein 6 (ANGPTL6), Dermokine (DMKN), Secretogranin-1 (CHGB), A Disintegrin and metalloproteinase domain-containing protein 9 (ADAM9), Growth arrest-specific protein 1 (GAS1), Platelet basic protein (PPBP), Platelet glycoprotein Ib alpha chain (GP1BA), Lysosome-associated membrane glycoprotein 2 (LAMP2), Neurofascin (NFASC), Alcohol dehydrogenase [NADP (+)] (AKR1A1), Heat shock protein beta-1 (HSPB1), Maltase-glucoamylase (MGAM), LAMP2 and Actin alpha 1, skeletal muscle (ACTA1), Mesothelin (MSLN), Sarcoglycan epsilon (SGCE), Cell growth regulator with EF hand domain protein 1 (CGREF1), and Endoplasmic reticulum aminopeptidase 1 (ERAP1); and (c) administering to the fetus or its mother an anti-CMV active agent selected from valacyclovir and letermovir or administering valganciclovir to the fetus upon its birth, wherein the comparing in step (b) indicates that the fetus has a symptomatic cCMV infection.

13. The method of claim 12, wherein:
(a) the at least one biomarker comprises RARRES2, and an increase in the level of RARRES2 compared to the control is indicative of the presence of the symptomatic cCMV infection;
(b) the at least one biomarker comprises LGALS3BP and an increase in the level of LGALS3BP compared to the control is indicative of the presence of the symptomatic cCMV infection;
(c) the at least one biomarker comprises RARRES2 and LGALS3BP and an increase in the levels of RARRES2 and LGALS3BP compared to the control is indicative of the presence of the symptomatic cCMV infection;
(d) the at least one biomarker comprises RARRES2 and GPNMB and an increase in the levels of RARRES2 and GPNMB compared to the control is indicative of the presence of the symptomatic cCMV infection; or
(e) the at least one biomarker comprises LGALS3BP and GPNMB and an increase in the levels of LGALS3BP and GPNMB compared to the control is indicative of the presence of the symptomatic cCMV infection.

14. The method of claim 13, wherein the at least one biomarker comprises RARRES2.

15. The method of claim 13, wherein the at least one biomarker comprises LGALS3BP.

16. The method of claim 13, wherein the at least one biomarker comprises RARRES2 and LGALS3BP.

17. The method of claim 16, wherein the at least one biomarker further comprises one or more of SYNE1, MYH14, GPNMB, CPA2, SCGB3A2, CRP, GSTT1, CPM, CPQ, FAM3D, KRT17, PDGFRB, ANGPTL6, DMKN, CHGB, ADAMS, GAS1, PPBP, GP1BA, LAMP2, NFASC, AKR1A1, HSPB1, MGAM, ACTA1, MSLN, SGCE, CGREF1, and ERAP1.

18. The method of claim 17, wherein the at least one biomarker further comprises one or more of SYNE1, MYH14, GPNMB, CPA2, SCGB3A2, CRP, GSTT1, CPQ, FAM3D, and KRT17; and wherein in an increase in the level of one or more of SYNE1, MYH14, GPNMB, CPA2, SCGB3A2, CRP, GSTT1, CPQ, FAM3D, and KRT17 compared to the control is indicative of the presence of the symptomatic cCMV infection.

19. The method of claim 17, wherein the at least one biomarker further comprises one or more of CPM, PDGFRB, ANGPTL6, DMKN, CHGB, ADAMS, GAS1, PPBP, GP1BA, LAMP2, NFASC, AKR1A1, HSPB1, MGAM, ACTA1, MSLN, SGCE, CGREF1, and ERAP1; and wherein a decrease in the level of one or more of CPM, PDGFRB, ANGPTL6, DMKN, CHGB, ADAMS, GAS1, PPBP, GP1BA, LAMP2, NFASC, AKR1A1, HSPB1, MGAM, ACTA1, MSLN, SGCE, CGREF1, and ERAP1 compared to the control is indicative of the presence of the symptomatic cCMV infection.

20. The method of claim 17, wherein the at least one biomarker further comprises one or more of ANGPTL6, GP1BA, ACTA1, AKR1A1, NFASC, CHGB, PPBP, LAMP2, MGAM, HSPB1, CPQ, FAM3D, and KRT17; and wherein a decrease in the level of one or more of ANGPTL6, GP1BA, ACTA1, AKR1A1, NFASC, CHGB, PPBP, LAMP2, MGAM, HSPB1, CPQ, FAM3D, and KRT17 compared to the control is indicative of the presence of the symptomatic cCMV infection.

21. The method of claim 13, wherein the method comprises administering to the fetus or its mother the anti-CMV active agent.

* * * * *